(12) United States Patent
Garthwaite

(10) Patent No.: US 7,092,978 B2
(45) Date of Patent: Aug. 15, 2006

(54) SPACE-EFFICIENT, DEPTH-FIRST PARALLEL COPYING COLLECTION TECHNIQUE MAKING USE OF WORK—STEALING ON THE SAME STRUCTURES THAT MAINTAIN THE STACK OF ITEMS TO BE SCANNED

(75) Inventor: Alexander T. Garthwaite, Beverly, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 458 days.

(21) Appl. No.: 10/373,147

(22) Filed: Feb. 24, 2003

(65) Prior Publication Data

US 2004/0167947 A1    Aug. 26, 2004

(51) Int. Cl.
*G06F 17/30* (2006.01)
(52) U.S. Cl. .................. 707/206; 707/205; 711/173; 711/209
(58) Field of Classification Search .............. 707/1–10, 707/100–104.1, 200–206; 711/170–173, 711/200–209, 160–162; 719/312–315
See application file for complete search history.

(56) References Cited

U.S. PATENT DOCUMENTS

| | | | |
|---|---|---|---|
| 4,695,949 | A | 9/1987 | Thatte et al. |
| 5,848,423 | A | 12/1998 | Ebrahim et al. |
| 5,987,628 | A | 11/1999 | Von Bokern et al. |
| 6,148,309 | A | 11/2000 | Azagury et al. |
| 6,148,310 | A | 11/2000 | Azagury et al. |
| 6,173,294 | B1 | 1/2001 | Azagury et al. |
| 6,185,581 | B1 * | 2/2001 | Garthwaite .................. 707/206 |
| 6,339,779 | B1 | 1/2002 | Houldsworth |

(Continued)

FOREIGN PATENT DOCUMENTS

WO    WO 01/88713 A2 * 11/2001

OTHER PUBLICATIONS

Harris, Timothy L., Dynamic adaptive pre-tenuring, Oct. 2000, ACM SIGPLAN, 1-10.*

(Continued)

*Primary Examiner*—Shahid Alam
*Assistant Examiner*—Jean Bolte Fleurantin
(74) *Attorney, Agent, or Firm*—Kudirka & Jobse, LLP

(57) ABSTRACT

A copying-type garbage collector operates in multiple concurrent threads. Each thread evacuates potentially reachable objects from the from space to the to space in a depth-first manner: if a thread has evacuated an object containing references to any from-space objects, it evacuates all of that object's descendants before it evacuates any other reachable objects. To keep track of descendants that must be evacuated before non-descendants can be, the thread places objects containing references to non-evacuated objects into a linked list maintained by pointers that it installs in the from-space locations from which the objects on the list were evacuated. Additionally, it divides the to space into local-allocation buffers ("LABs") to which respective threads exclusively evacuate objects, and each thread maintains a LAB stack representing all the LABs it has filled that still contain references to unevacuated from-space objects. When a thread has completed evacuating the descendants of evacuees in all of its LABs, it "steals" work from other threads. It may do so, for instance, by processing a reference in an object belonging to another thread's list, by transferring to its own list one or more objects from another thread's list, or by transferring to its own LAB stack one or more LABs from another thread's LAB stack.

47 Claims, 32 Drawing Sheets

U.S. PATENT DOCUMENTS

| | | | |
|---|---|---|---|
| 6,363,403 B1 | 3/2002 | Roy et al. | |
| 6,415,302 B1* | 7/2002 | Garthwaite et al. | 707/206 |
| 6,421,690 B1 | 7/2002 | Kirk | |
| 6,424,977 B1* | 7/2002 | Garthwaite | 707/206 |
| 6,434,576 B1* | 8/2002 | Garthwaite | 707/206 |
| 6,434,577 B1* | 8/2002 | Garthwaite | 707/206 |
| 6,449,626 B1* | 9/2002 | Garthwaite et al. | 707/206 |
| 6,529,919 B1* | 3/2003 | Agesen et al. | 707/206 |
| 6,567,905 B1 | 5/2003 | Otis | |
| 6,574,720 B1 | 6/2003 | Hopeman et al. | |
| 6,581,077 B1 | 6/2003 | Sokolov et al. | |
| 6,594,702 B1 | 7/2003 | Fischer et al. | |
| 6,654,773 B1 | 11/2003 | Hills | |
| 6,823,351 B1* | 11/2004 | Flood et al. | 707/206 |
| 6,826,583 B1* | 11/2004 | Flood et al. | 707/206 |
| 6,868,488 B1* | 3/2005 | Garthwaite | 711/173 |

OTHER PUBLICATIONS

Jones and Lins, "Garbage Collection: Algorithms for Automatic Dynamic Memory Management," 1996, pp. 165-179, Wiley, New York.

Paul Wilson, "Uniprocessor Garbage Collection Techniques," Technical Report, University of Texas, 1994.

Hudson and Moss, "Incremental Collection of Mature Objects," Proceedings of International Workshop on Memory Management, 1992, Springer-Verlag.

Grarup and Seligmann, "Incremental Mature Garbage Collection," M.Sc. Thesis, Available a http://www.daimi.au.dk/~jacobse/Papers/.

Seligmann and Grarup, "Incremental Mature Garbage Collection Using the Train Algorithm," Proceedings of ECOOP '95, Ninth European Conference on Object-Oriented Programming, 1995, http://www.daimi.au.dk/~jacobse/Papers/.

Clark and Mason, "Compacting Garbage Collection can be Fast and Simple," Software—Practice and Experience, Feb. 1996, pp. 177-194, vol. 26, No. 2.

Henry Baker, "List Processing in Real Time on Serial Computer," Communications of the ACM 21, 4, Apr. 1978, pp. 280-294.

Appel, Ellis, and Li, "Real-time Concurrent Collection on Stock Multiprocessors," ACM SIGPLAN Notices, 1998.

Rodney A. Brooks, "Trading Data Space for Reduced Time and Code Space in Real-Time Garbage Collection on Stock Hardware," Proceedings of the 1984 ACM Symposium on Lisp and Functional Programming, pp. 108-113, Aug. 1984. Austin, Texas.

Herlihy and Moss, "Lock-Free Garbage Collection for Multiprocessors," ACM SPAA, 1991, pp. 229-236.

Bacon, Attanasio, Lee, Rajan, and Smith, "Java without the Coffee Breaks: A Nonintrusive Multiprocessor Garbage Collector," SIGPLAN Conference on Programming Language Design and Implementation, Snowbird, Utah, Jun. 2001.

James Stamos, "Static Grouping of Small Objects to Enhance Performance of a Paged Virtual Memory," ACM Transactions on Computer Systems, vol. 2, No. 2, pp. 155-180, May 1984.

David A. Moon, "Garbage Collection in a Large Lisp System," Conference Record of the 1984 ACM Symposium on LISP and Functional Programming, Austin, Texas, Aug. 1984, pp. 235-246.

Robert Courts, "Improving Locality of Reference in a Garbage-Collecting Memory Management System," Communications of the ACM, Sep. 1988, pp. 1128-1138, vol. 31, No. 9.

Wilson, Lam, and Moher, "Effective Static-Graph Reorganization to Improve Locality in Garbage Collected Systems," Proceedings of ACM SIGPLAN Conference on Programming Language Design and Implementation, Jun. 1991, Toronto, Ontario, Canada.

Lam, Wilson, and Moher, "Object Type Directed Garbage Collection to Improve Locality," Proceedings of the International Workshop on Memory Management '92, St. Malo, France, Sep. 1992, pp. 404-425.

Chilimbi and Larus, "Using Generational Garbage Collection to Implement Cache-Conscious Data Placement,"International Symposium on Memory Management, Oct. 1998.

Lieberman and Hewitt, "A real-time garbage collector based on the lifetimes of objects," Communications of the ACM, 1983, pp. 419-429, vol. 26, No. 6.

David Ungar, "Generation Scavenging: A Non-Disruptive High Performance Storage Reclamation Algorithm," ACM SIGPLAN Notices, Apr. 1984, pp. 157-167, vol. 19, No. 5.

Andrew W. Appel, "Simple Generational Garbage Collection and Fast Allocation," Software Practice and Experience, 1989, pp. 171-183, vol. 19, No. 2.

Hudson and Diwan, "Adaptive Garbage Collection for Modula-3 and Smalltalk," in OOPSLA/ECOOP Workshop on Garbage Collection in Object-Oriented Systems, Oct. 1990, Edited by Eric Jul and Niels-Cristial Juul.

Hudson and Hosking, "Remembered sets can also play cards," in OOPSLA/ECOOP Workshop on Garbage Collection in Object-Oriented Systems, Oct. 1993, Edited by Moss, Wilson, and Zorn.

Hosking and Moss, "Protection traps and alternatives for memory management of an object-oriented language," ACM Proceedings of the Fourteenth ACM Symposium on Operating Systems Principles, Dec. 1993, pp. 106-119, vol. 27, No. 5.

Hosking, Moss, and Stefanovic, "A Comparative Performance Evaluation of Write Barrier Implementation," in OOPSLA ACM Conference on Object-Oriented Programming, Systems, Languages, and Applications, Oct. 1992, pp. 92-109, vol. 27, No. 10, ACM SIGPLAN Notices, Vancouver, BC, ACM Press.

Patrick G. Sobalvarro, "A Lifetime-based Garbage Collector for LISP Systems on General-Purpose Computers," Massachusetts Institute of Technology, AITR-1417, 1988.

Arora, Blumofe, and Plaxton, "Thread Scheduling for Multiprogrammed Multiprocessors," Proceedings of the Tenth Annual ACM Symposium on Parallel Algorithms and Architectures, Jun. 1998.

Douglas W. Clark, "An Efficient List-Moving Algorithm Using Constant Workspace," Communications of the ACM, Jun. 1976, pp. 352-354, vol. 19, No. 6.

C. J. Cheney, "A Nonrecursive List Compacting Algorithm," Communications of the ACM, Nov. 1970, pp. 677-678, vol. 13, No. 11.

Goldstein, Schauser, and Culler, "Lazy Threads: Implementing a Fast parallel Call," Journal of Parallel and Distributed Computing, Aug. 1996, pp. 5-20, vol. 37, No. 1.

Hudson, et al., "Sapphire: Copying GC Without Stopping the World", Java Grande/ISCOPE, 2001.

Nettles, Scott, "Real-Time Replication Garbage Collection", Avionics Lab, Wright Research and Development Center, 1993, PDDI.

Lam, et al., "Object Type Directed Garbage Collection to Improve Locality", Proceedings of the International Workshop on Memory Management, Sep. 1992, 404-425, St. Malo, France.

* cited by examiner

SPACE-EFFICIENT, DEPTH-FIRST PARALLEL COPYING COLLECTION TECHNIQUE MAKING USE OF WORK—STEALING ON THE SAME STRUCTURES THAT MAINTAIN THE STACK OF ITEMS TO BE SCANNED

CROSS-REFERENCE TO RELATED APPLICATION

This application is related to U.S. patent application Ser. No. 10/372,890 of Alexander T. Garthwaite for Efficient Collocation of Evacuated Objects in a Copying Garbage Collector Using Variably Filled Local Allocation Buffers, which was filed on the same date as the instant application.

BACKGROUND OF THE INVENTION

1. Field of the Invention

The present invention is directed to memory management. It particularly concerns what has come to be known as "garbage collection."

2. Background Information

In the field of computer systems, considerable effort has been expended on the task of allocating memory to data objects. For the purposes of this discussion, the term object refers to a data structure represented in a computer system's memory. Other terms sometimes used for the same concept are record and structure. An object may be identified by a reference, a relatively small amount of information that can be used to access the object. A reference can be represented as a "pointer" or a "machine address," which may require, for instance, only sixteen, thirty-two, or sixty-four bits of information, although there are other ways to represent a reference.

In some systems, which are usually known as "object oriented," objects may have associated methods, which are routines that can be invoked by reference to the object. They also may belong to a class, which is an organizational entity that may contain method code or other information shared by all objects belonging to that class. In the discussion that follows, though, the term object will not be limited to such structures; it will additionally include structures with which methods and classes are not associated.

The invention to be described below is applicable to systems that allocate memory to objects dynamically. Not all systems employ dynamic allocation. In some computer languages, source programs must be so written that all objects to which the program's variables refer are bound to storage locations at compile time. This storage-allocation approach, sometimes referred to as "static allocation," is the policy traditionally used by the Fortran programming language, for example.

Even for compilers that are thought of as allocating objects only statically, of course, there is often a certain level of abstraction to this binding of objects to storage locations. Consider the typical computer system 10 depicted in FIG. 1, for example. Data, and instructions for operating on them, that a microprocessor 11 uses may reside in on-board cache memory or be received from further cache memory 12, possibly through the mediation of a cache controller 13. That controller 13 can in turn receive such data from system read/write memory ("RAM") 14 through a RAM controller 15 or from various peripheral devices through a system bus 16. The memory space made available to an application program may be "virtual" in the sense that it may actually be considerably larger than RAM 14 provides. So the RAM contents will be swapped to and from a system disk 17.

Additionally, the actual physical operations performed to access some of the most-recently visited parts of the process's address space often will actually be performed in the cache 12 or in a cache on board microprocessor 11 rather than on the RAM 14, with which those caches swap data and instructions just as RAM 14 and system disk 17 do with each other.

A further level of abstraction results from the fact that an application will often be run as one of many processes operating concurrently with the support of an underlying operating system. As part of that system's memory management, the application's memory space may be moved among different actual physical locations many times in order to allow different processes to employ shared physical memory devices. That is, the location specified in the application's machine code may actually result in different physical locations at different times because the operating system adds different offsets to the machine-language-specified location.

Despite these expedients, the use of static memory allocation in writing certain long-lived applications makes it difficult to restrict storage requirements to the available memory space. Abiding by space limitations is easier when the platform provides for dynamic memory allocation, i.e., when memory space to be allocated to a given object is determined only at run time.

Dynamic allocation has a number of advantages, among which is that the run-time system is able to adapt allocation to run-time conditions. For example, the programmer can specify that space should be allocated for a given object only in response to a particular run-time condition. The C-language library function malloc( ) is often used for this purpose. Conversely, the programmer can specify conditions under which memory previously allocated to a given object can be reclaimed for reuse. The C-language library function free( ) results in such memory reclamation.

Because dynamic allocation provides for memory reuse, it facilitates generation of large or long-lived applications, which over the course of their lifetimes may employ objects whose total memory requirements would greatly exceed the available memory resources if they were bound to memory locations statically.

Particularly for long-lived applications, though, allocation and reclamation of dynamic memory must be performed carefully. If the application fails to reclaim unused memory—or, worse, loses track of the address of a dynamically allocated segment of memory—its memory requirements will grow over time to exceed the system's available memory. This kind of error is known as a "memory leak."

Another kind of error occurs when an application reclaims memory for reuse even though it still maintains a reference to that memory. If the reclaimed memory is reallocated for a different purpose, the application may inadvertently manipulate the same memory in multiple inconsistent ways. This kind of error is known as a "dangling reference," because an application should not retain a reference to a memory location once that location is reclaimed. Explicit dynamic-memory management by using interfaces like malloc( )/free( ) often leads to these problems.

A way of reducing the likelihood of such leaks and related errors is to provide memory-space reclamation in a more-automatic manner. Techniques used by systems that reclaim memory space automatically are commonly referred to as "garbage collection." Garbage collectors operate by reclaiming space that they no longer consider "reachable." Statically allocated objects represented by a program's global variables are normally considered reachable throughout a program's life. Such objects are not ordinarily stored in the garbage collector's managed memory space, but they may contain references to dynamically allocated objects that are, and such objects are considered reachable. Clearly, an object referred to in the processor's call stack is reachable, as is an object referred to by register contents. And an object referred to by any reachable object is also reachable.

The use of garbage collectors is advantageous because, whereas a programmer working on a particular sequence of code can perform his task creditably in most respects with only local knowledge of the application at any given time, memory allocation and reclamation require a global knowledge of the program. Specifically, a programmer dealing with a given sequence of code does tend to know whether some portion of memory is still in use for that sequence of code, but it is considerably more difficult for him to know what the rest of the application is doing with that memory. By tracing references from some conservative notion of a "root set," e.g., global variables, registers, and the call stack, automatic garbage collectors obtain global knowledge in a methodical way. By using a garbage collector, the programmer is relieved of the need to worry about the application's global state and can concentrate on local-state issues, which are more manageable. The result is applications that are more robust, having no dangling references and fewer memory leaks.

Garbage-collection mechanisms can be implemented by various parts and levels of a computing system. One approach is simply to provide them as part of a batch compiler's output. Consider FIG. 2's simple batch-compiler operation, for example. A computer system executes in accordance with compiler object code and therefore acts as a compiler 20. The compiler object code is typically stored on a medium such as FIG. 1's system disk 17 or some other machine-readable medium, and it is loaded into RAM 14 to configure the computer system to act as a compiler. In some cases, though, the compiler object code's persistent storage may instead be provided in a server system remote from the machine that performs the compiling. The electrical signals that carry the digital data by which the computer systems exchange that code are examples of the kinds of electromagnetic signals by which the computer instructions can be communicated. Others are radio waves, microwaves, and both visible and invisible light.

The input to the compiler is the application source code, and the end product of the compiler process is application object code. This object code defines an application 21, which typically operates on input such as mouse clicks, etc., to generate a display or some other type of output. This object code implements the relationship that the programmer intends to specify by his application source code. In one approach to garbage collection, the compiler 20, without the programmer's explicit direction, additionally generates code that automatically reclaims unreachable memory space.

Even in this simple case, though, there is a sense in which the application does not itself provide the entire garbage collector. Specifically, the application will typically call upon the underlying operating system's memory-allocation functions. And the operating system may in turn take advantage of various hardware that lends itself particularly to use in garbage collection. So even a very simple system may disperse the garbage-collection mechanism over a number of computer-system layers.

To get some sense of the variety of system components that can be used to implement garbage collection, consider FIG. 3's example of a more complex way in which various levels of source code can result in the machine instructions that a processor executes. In the FIG. 3 arrangement, the human applications programmer produces source code 22 written in a high-level language. A compiler 23 typically converts that code into "class files." These files include routines written in instructions, called "byte codes" 24, for a "virtual machine" that various processors can be software-configured to emulate. This conversion into byte codes is almost always separated in time from those codes' execution, so FIG. 3 divides the sequence into a "compile-time environment" 25 separate from a "run-time environment" 26, in which execution occurs. One example of a high-level language for which compilers are available to produce such virtual-machine instructions is the Java™ programming language. (Java is a trademark or registered trademark of Sun Microsystems, Inc., in the United States and other countries.)

Most typically, the class files' byte-code routines are executed by a processor under control of a virtual-machine process 27. That process emulates a virtual machine from whose instruction set the byte codes are drawn. As is true of the compiler 23, the virtual-machine process 27 may be specified by code stored on a local disk or some other machine-readable medium from which it is read into FIG. 1's RAM 14 to configure the computer system to implement the garbage collector and otherwise act as a virtual machine. Again, though, that code's persistent storage may instead be provided by a server system remote from the processor that implements the virtual machine, in which case the code would be transmitted electrically or optically to the virtual-machine-implementing processor.

In some implementations, much of the virtual machine's action in executing these byte codes is most like what those skilled in the art refer to as "interpreting," so FIG. 3 depicts the virtual machine as including an "interpreter" 28 for that purpose. In addition to or instead of running an interpreter, many virtual-machine implementations actually compile the byte codes concurrently with the resultant object code's execution, so FIG. 3 depicts the virtual machine as additionally including a "just-in-time" compiler 29. We will refer to the just-in-time compiler and the interpreter together as "execution engines" since they are the methods by which byte code can be executed.

Now, some of the functionality that source-language constructs specify can be quite complicated, requiring many machine-language instructions for their implementation. One quite-common example is a source-language instruction that calls for 64-bit arithmetic on a 32-bit machine. More germane to the present invention is the operation of dynamically allocating space to a new object; the allocation of such objects must be mediated by the garbage collector.

In such situations, the compiler may produce "inline" code to accomplish these operations. That is, all object-code instructions for carrying out a given source-code-prescribed operation will be repeated each time the source code calls for the operation. But inlining runs the risk that "code bloat" will result if the operation is invoked at many source-code locations.

The natural way of avoiding this result is instead to provide the operation's implementation as a procedure, i.e., a single code sequence that can be called from any location in the program. In the case of compilers, a collection of procedures for implementing many types of source-code-specified operations is called a runtime system for the language. The execution engines and the runtime system of a virtual machine are designed together so that the engines "know" what runtime-system procedures are available in the virtual machine (and on the target system if that system provides facilities that are directly usable by an executing virtual-machine program.) So, for example, the just-in-time compiler 29 may generate native code that includes calls to memory-allocation procedures provided by the virtual machine's runtime system. These allocation routines may in turn invoke garbage-collection routines of the runtime system when there is not enough memory available to satisfy an allocation. To represent this fact, FIG. 3 includes block 30 to show that the compiler's output makes calls to the runtime system as well as to the operating system 31, which consists of procedures that are similarly system-resident but are not compiler-dependent.

Although the FIG. 3 arrangement is a popular one, it is by no means universal, and many further implementation types can be expected. Proposals have even been made to implement the virtual machine 27's behavior in a hardware processor, in which case the hardware itself would provide some or all of the garbage-collection function.

The arrangement of FIG. 3 differs from FIG. 2 in that the compiler 23 for converting the human programmer's code does not contribute to providing the garbage-collection function; that results largely from the virtual machine 27's operation. Those skilled in that art will recognize that both of these organizations are merely exemplary, and many modem systems employ hybrid mechanisms, which partake of the characteristics of traditional compilers and traditional interpreters both.

The invention to be described below is applicable independently of whether a batch compiler, a just-in-time compiler, an interpreter, or some hybrid is employed to process source code. In the remainder of this application, therefore, we will use the term compiler to refer to any such mechanism, even if it is what would more typically be called an interpreter.

In short, garbage collectors can be implemented in a wide range of combinations of hardware and/or software. As is true of most of the garbage-collection techniques described in the literature, the invention to be described below is applicable to most such systems.

By implementing garbage collection, a computer system can greatly reduce the occurrence of memory leaks and other software deficiencies in which human programming frequently results. But it can also have significant adverse performance effects if it is not implemented carefully. To distinguish the part of the program that does "useful" work from that which does the garbage collection, the term mutator is sometimes used in discussions of these effects; from the collector's point of view, what the mutator does is mutate active data structures' connectivity.

Some garbage-collection approaches rely heavily on interleaving garbage-collection steps among mutator steps. In one type of garbage-collection approach, for instance, the mutator operation of writing a reference is followed immediately by garbage-collector steps used to maintain a reference count in that object's header, and code for subsequent new-object storage includes steps for finding space occupied by objects whose reference count has fallen to zero. Obviously, such an approach can slow mutator operation significantly.

Other approaches therefore interleave very few garbage-collector-related instructions into the main mutator process but instead interrupt it from time to time to perform garbage-collection cycles, in which the garbage collector finds unreachable objects and reclaims their memory space for reuse. Such an approach will be assumed in discussing FIG. 4's depiction of a simple garbage-collection operation. Within the memory space allocated to a given application is a part 40 managed by automatic garbage collection. In the following discussion, this will be referred to as the "heap," although in other contexts that term refers to all dynamically allocated memory. During the course of the application's execution, space is allocated for various objects 42, 44, 46, 48, and 50. Typically, the mutator allocates space within the heap by invoking the garbage collector, which at some level manages access to the heap. Basically, the mutator asks the garbage collector for a pointer to a heap region where it can safely place the object's data. The garbage collector keeps track of the fact that the thus-allocated region is occupied. It will refrain from allocating that region in response to any other request until it determines that the mutator no longer needs the region allocated to that object.

Garbage collectors vary as to which objects they consider reachable and unreachable. For the present discussion, though, an object will be considered "reachable" if it is referred to, as object 42 is, by a reference in the root set 52. The root set consists of reference values stored in the mutator's threads' call stacks, the CPU registers, and global variables outside the garbage-collected heap. An object is also reachable if it is referred to, as object 46 is, by another reachable object (in this case, object 42). Objects that are not reachable can no longer affect the program, so it is safe to re-allocate the memory spaces that they occupy.

A typical approach to garbage collection is therefore to identify all reachable objects and reclaim any previously allocated memory that the reachable objects do not occupy. A typical garbage collector may identify reachable objects by tracing references from the root set 52. For the sake of simplicity, FIG. 4 depicts only one reference from the root set 52 into the heap 40. (Those skilled in the art will recognize that there are many ways to identify references, or at least data contents that may be references.) The collector notes that the root set points to object 42, which is therefore reachable, and that reachable object 42 points to object 46, which therefore is also reachable. But those reachable objects point to no other objects, so objects 44, 48, and 50 are all unreachable, and their memory space may be reclaimed. This may involve, say, placing that memory space in a list of free memory blocks.

To avoid excessive heap fragmentation, some garbage collectors additionally relocate reachable objects. FIG. 5 shows a typical approach. The heap is partitioned into two halves, hereafter called "semi-spaces." For one garbage-collection cycle, all objects are allocated in one semi-space 54, leaving the other semi-space 56 free. When the garbage-collection cycle occurs, objects identified as reachable are "evacuated" to the other semi-space 56, so all of semi-space 54 is then considered free. Once the garbage-collection cycle has occurred, all new objects are allocated in the lower semi-space 56 until yet another garbage-collection cycle occurs, at which time the reachable objects are evacuated back to the upper semi-space 54.

Although this relocation requires the extra steps of copying the reachable objects and updating references to them, it tends to be quite efficient, since most new objects quickly become unreachable, so most of the current semi-space is actually garbage. That is, only a relatively few, reachable objects need to be relocated, after which the entire semi-space contains only garbage and can be pronounced free for reallocation.

Now, a collection cycle can involve following all reference chains from the basic root set—i.e., from inherently reachable locations such as the call stacks, class statics and other global variables, and registers—and reclaiming all space occupied by objects not encountered in the process. And the simplest way of performing such a cycle is to interrupt the mutator to provide a collector interval in which the entire cycle is performed before the mutator resumes. For certain types of applications, this approach to collection-cycle scheduling is acceptable and, in fact, highly efficient.

For many interactive and real-time applications, though, this approach is not acceptable. The delay in mutator operation that the collection cycle's execution causes can be annoying to a user and can prevent a real-time application from responding to its environment with the required speed. In some applications, choosing collection times opportunistically can reduce this effect. Collection intervals can be inserted when an interactive mutator reaches a point at which it awaits user input, for instance.

So it may often be true that the garbage-collection operation's effect on performance can depend less on the total collection time than on when collections actually occur. But another factor that often is even more determinative is the duration of any single collection interval, i.e., how long the mutator must remain quiescent at any one time. In an interactive system, for instance, a user may never notice hundred-millisecond interruptions for garbage collection, whereas most users would find interruptions lasting for two seconds to be annoying.

To limit the resultant pause times, a cycle may be divided up among a plurality of collector intervals. If so, it will only be after a number of intervals that the collector will have followed all reference chains and be able to identify as garbage any objects not thereby reached. This approach is more complex than completing the cycle in a single collection interval; the mutator will usually modify references between collection intervals, so the collector must repeatedly update its view of the reference graph in the midst of the collection cycle. To make such updates practical, the mutator must communicate with the collector to let it know what reference changes are made between intervals.

An even more complex approach, which some systems use to eliminate discrete pauses or maximize resource-use efficiency, is to execute the mutator and collector in concurrent execution threads. Most systems that use this approach use it for most but not all of the collection cycle; the mutator is usually interrupted for a short collector interval, in which a part of the collector cycle takes place without mutation.

Independent of whether the collection cycle is performed concurrently with mutator operation, is completed in a single interval, or extends over multiple intervals is the question of whether the cycle is complete, as has tacitly been assumed so far, or is instead "incremental." In incremental collection, a collection cycle constitutes only an increment of collection: the collector does not follow all reference chains from the basic root set completely. Instead, it concentrates on only a portion, or collection set, of the heap. Specifically, it identifies every collection-set object referred to by a reference chain that extends into the collection set from outside of it, and it reclaims the collection-set space not occupied by such objects, possibly after evacuating them from the collection set.

By thus culling objects referenced by reference chains that do not necessarily originate in the basic root set, the collector can be thought of as expanding the root set to include as roots some locations that may not be reachable. Although incremental collection thereby leaves "floating garbage," it can result in relatively low pause times even if entire collection increments are completed during respective single collection intervals.

Most collectors that employ incremental collection operate in "generations" although this is not necessary in principle. Different portions, or generations, of the heap are subject to different collection policies. New objects are allocated in a "young" generation, and older objects are promoted from younger generations to older or more "mature" generations. Collecting the younger generations more frequently than the others yields greater efficiency because the younger generations tend to accumulate garbage faster; newly allocated objects tend to "die," while older objects tend to "survive."

But generational collection greatly increases what is effectively the root set for a given generation. Consider FIG. 6, which depicts a heap as organized into three generations 58, 60, and 62. Assume that generation 60 is to be collected. The process for this individual generation may be more or less the same as that described in connection with FIGS. 4 and 5 for the entire heap, with one major exception. In the case of a single generation, the root set must be considered to include not only the call stack, registers, and global variables represented by set 52 but also objects in the other generations 58 and 62, which themselves may contain references to objects in generation 60. So pointers must be traced not only from the basic root set 52 but also from objects within the other generations.

One could perform this tracing by simply inspecting all references in all other generations at the beginning of every collection interval, and it turns out that this approach is actually feasible in some situations. But it takes too long in other situations, so workers in this field have employed a number of approaches to expediting reference tracing. One approach is to include so-called write barriers in the mutator process. A write barrier is code added to a write operation to record information from which the collector can determine where references were written or may have been since the last collection interval. A reference list can then be maintained by taking such a list as it existed at the end of the previous collection interval and updating it by inspecting only locations identified by the write barrier as having possibly been modified since that interval.

One of the many write-barrier implementations commonly used by workers in this art employs what has been referred to as the "card table." FIG. 6 depicts the various generations as being divided into smaller sections, known for this purpose as "cards." Card tables 64, 66, and 68 associated with respective generations contain an entry for each of their cards. When the mutator writes a reference in a card, it makes an appropriate entry in the card-table location associated with that card (or, say, with the card in which the object containing the reference begins). Most write-barrier implementations simply make a Boolean entry indicating that the write operation has been performed, although some may be more elaborate. The mutator having thus left a record of where new or modified references may be, the collector can thereafter prepare appropriate summaries of that information, as will be explained in due course. For the sake of concreteness, we will assume that the summaries are maintained by steps that occur principally at the beginning of each collection interval.

Of course, there are other write-barrier approaches, such as simply having the write barrier add to a list of addresses where references where written. Also, although there is no reason in principle to favor any particular number of generations, and although FIG. 6 shows three, most generational garbage collectors have only two generations, of which one is the young generation and the other is the mature generation. Moreover, although FIG. 6 shows the generations as being of the same size, a more-typical configuration is for the young generation to be considerably smaller. Finally, although we assumed for the sake of simplicity that collection during a given interval was limited to only one generation, a more-typical approach is actually to collect the whole young generation at every interval but to collect the mature one less frequently.

Some collectors collect the entire young generation in every interval and may thereafter perform mature-generation collection in the same interval. It may therefore take relatively little time to scan all young-generation objects remaining after young-generation collection to find references into the mature generation. Even when such collectors do use card tables, therefore, they often do not use them for finding young-generation references that refer to mature-generation objects. On the other hand, laboriously scanning the entire mature generation for references to young-generation (or mature-generation) objects would ordinarily take too long, so the collector uses the card table to limit the amount of memory it searches for mature-generation references.

Now, although it typically takes very little time to collect the young generation, it may take more time than is acceptable within a single garbage-collection interval to collect the entire mature generation. So some garbage collectors may collect the mature generation incrementally; that is, they may perform only a part of the mature generation's collection during any particular collection cycle. Incremental collection presents the problem that, since the generation's unreachable objects outside the "collection set" of objects processed during that cycle cannot be recognized as unreachable, collection-set objects to which they refer tend not to be, either.

To reduce the adverse effect this would otherwise have on collection efficiency, workers in this field have employed the "train algorithm," which FIG. 7 depicts. A generation to be collected incrementally is divided into sections, which for reasons about to be described are referred to as "car sections." Conventionally, a generation's incremental collection occurs in fixed-size sections, and a car section's size is that of the generation portion to be collected during one cycle.

The discussion that follows will occasionally employ the nomenclature in the literature by using the term car instead of car section. But the literature seems to use that term to refer variously not only to memory sections themselves but also to data structures that the train algorithm employs to manage them when they contain objects, as well as to the more-abstract concept that the car section and managing data structure represent in discussions of the algorithm. So the following discussion will more frequently use the expression car section to emphasize the actual sections of memory space for whose management the car concept is employed.

According to the train algorithm, the car sections are grouped into "trains," which are ordered, conventionally according to age. For example, FIG. 7 shows an oldest train 73 consisting of a generation 74's three car sections described by associated data structures 75, 76, and 78, while a second train 80 consists of only of a single car section, represented by structure 82, and the youngest train 84 (referred to as the "allocation train") consists of car sections that data structures 86 and 88 represent. As will be seen below, car sections' train memberships can change, and any car section added to a train is typically added to the end of a train.

Conventionally, the car collected in an increment is the one added earliest to the oldest train, which in this case is car 75. All of the generation's cars can thus be thought of as waiting for collection in a single long line, in which cars are ordered in accordance with the order of the trains to which they belong and, within trains, in accordance with the order in which they were added to those trains.

As is usual, the way in which reachable objects are identified is to determine whether there are references to them in the root set or in any other object already determined to be reachable. In accordance with the train algorithm, the collector additionally performs a test to determine whether there are any references at all from outside the oldest train to objects within it. If there are not, then all cars within the train can be reclaimed, even though not all of those cars are in the collection set. And the train algorithm so operates that inter-car references tend to be grouped into trains, as will now be explained.

To identify references into the car from outside of it, train-algorithm implementations typically employ "remembered sets." As card tables are, remembered sets are used to keep track of references. Whereas a card-table entry contains information about references that the associated card contains, though, a remembered set associated with a given region contains information about references into that region from locations outside of it. In the case of the train algorithm, remembered sets are associated with car sections. Each remembered set, such as car 75's remembered set 90, lists locations in the generation that contain references into the associated car section.

The remembered sets for all of a generation's cars are typically updated at the start of each collection interval. To illustrate how such updating and other collection operations may be carried out, FIG. 8 depicts an operational sequence in a system of the typical type mentioned above. That is, it shows a sequence of operations that may occur in a system in which the entire garbage-collected heap is divided into two generations, namely, a young generation and an old generation, and in which the young generation is much smaller than the old generation. FIG. 8 is also based on the assumption and that the train algorithm is used only for collecting the old generation.

Block 102 represents a period of the mutator's operation. As was explained above, the mutator makes a card-table entry to identify any card that it has "dirtied" by adding or modifying a reference that the card contains. At some point, the mutator will be interrupted for collector operation. Different implementations employ different events to trigger such an interruption, but we will assume for the sake of concreteness that the system's dynamic-allocation routine causes such interruptions when no room is left in the young generation for any further allocation. A dashed line 103 represents the transition from mutator operation and collector operation.

In the system assumed for the FIG. 8 example, the collector collects the (entire) young generation each time such an interruption occurs. When the young generation's collection ends, the mutator operation usually resumes, without the collector's having collected any part of the old generation. Once in a while, though, the collector also collects part of the old generation, and FIG. 8 is intended to illustrate such an occasion.

When the collector's interval first starts, it first processes the card table, in an operation that block 104 represents. As was mentioned above, the collector scans the "dirtied" cards for references into the young generation. If a reference is found, that fact is memorialized appropriately. If the reference refers to a young-generation object, for example, an expanded card table may be used for this purpose. For each card, such an expanded card table might include a multi-byte array used to summarize the card's reference contents. The summary may, for instance, be a list of offsets that indicate the exact locations within the card of references to young-generation objects, or it may be a list of fine-granularity "sub-cards" within which references to young-generation objects may be found. If the reference refers to an old-generation object, the collector often adds an entry to the remembered set associated with the car containing that old-generation object. The entry identifies the reference's location, or at least a small region in which the reference can be found. For reasons that will become apparent, though, the collector will typically not bother to place in the remembered set the locations of references from objects in car sections farther forward in the collection queue than the referred-to object, i.e., from objects in older trains or in cars added earlier to the same train.

The collector then collects the young generation, as block 105 indicates. (Actually, young-generation collection may be interleaved with the dirty-region scanning, but the drawing illustrates it for purpose of explanation as being separate.) If a young-generation object is referred to by a reference that card-table scanning has revealed, that object is considered to be potentially reachable, as is any young-generation object referred to by a reference in the root set or in another reachable young-generation object. The space occupied by any young-generation object thus considered reachable is withheld from reclamation. For example, it may be evacuated to a young-generation semi-space that will be used for allocation during the next mutator interval. It may instead be promoted into the older generation, where it is placed into a car containing a reference to it or into a car in the last train. Or some other technique may be used to keep the memory space it occupies off the system's free list. The collector then reclaims any young-generation space occupied by any other objects, i.e., by any young-generation objects not identified as transitively reachable through references located outside the young generation.

The collector then performs the train algorithm's central test, referred to above, of determining whether there are any references into the oldest train from outside of it. As was mentioned above, the actual process of determining, for each object, whether it can be identified as unreachable is performed for only a single car section in any cycle. In the absence of features such as those provided by the train algorithm, this would present a problem, because garbage structures may be larger than a car section. Objects in such structures would therefore (erroneously) appear reachable, since they are referred to from outside the car section under consideration. But the train algorithm additionally keeps track of whether there are any references into a given car from outside the train to which it belongs, and trains' sizes are not limited. As will be apparent presently, objects not found to be unreachable are relocated in such a way that garbage structures tend to be gathered into respective trains into which, eventually, no references from outside the train point. If no references from outside the train point to any objects inside the train, the train can be recognized as containing only garbage. This is the test that block 106 represents. All cars in a train thus identified as containing only garbage can be reclaimed.

The question of whether old-generation references point into the train from outside of it is (conservatively) answered in the course of updating remembered sets; in the course of updating a car's remembered set, it is a simple matter to flag the car as being referred to from outside the train. The step-106 test additionally involves determining whether any references from outside the old generation point into the oldest train. Various approaches to making this determination have been suggested, including the conceptually simple approach of merely following all reference chains from the root set until those chains (1) terminate, (2) reach an old-generation object outside the oldest train, or (3) reach an object in the oldest train. In the two-generation example, most of this work can be done readily by identifying references into the collection set from live young-generation objects during the young-generation collection. If one or more such chains reach the oldest train, that train includes reachable objects. It may also include reachable objects if the remembered-set-update operation has found one or more references into the oldest train from outside of it. Otherwise, that train contains only garbage, and the collector reclaims all of its car sections for reuse, as block 107 indicates. The collector may then return control to the mutator, which resumes execution, as FIG. 8B's block 108 indicates.

If the train contains reachable objects, on the other hand, the collector turns to evacuating potentially reachable objects from the collection set. The first operation, which block 110 represents, is to remove from the collection set any object that is reachable from the root set by way of a reference chain that does not pass through the part of the old generation that is outside of the collection set. In the illustrated arrangement, in which there are only two generations, and the young generation has previously been completely collected during the same interval, this means evacuating from a collection set any object that (1) is directly referred to by a reference in the root set, (2) is directly referred to by a reference in the young generation (in which no remaining objects have been found unreachable), or (3) is referred to by any reference in an object thereby evacuated. All of the objects thus evacuated are placed in cars in the youngest train, which was newly created during the collection cycle. Certain of the mechanics involved in the evacuation process are described in more detail in connection with similar evacuation performed, as blocks 112 and 114 indicate, in response to remembered-set entries.

FIG. 9 illustrates how the processing represented by block 114 proceeds. The entries identify heap regions, and, as block 116 indicates, the collector scans the thus-identified heap regions to find references to locations in the collection-set. As blocks 118 and 120 indicate, that entry's processing continues until the collector finds no more such references. Every time the collector does find such a reference, it checks to determine whether, as a result of a previous entry's processing, the referred-to object has already been evacuated. If it has not, the collector evacuates the referred-to object to a (possibly new) car in the train containing the reference, as blocks 122 and 124 indicate.

As FIG. 10 indicates, the evacuation operation includes more than just object relocation, which block 126 represents. Once the object has been moved, the collector places a forwarding pointer in the collection-set location from which it was evacuated, for a purpose that will become apparent presently. Block 128 represents that step. (Actually, there are some cases in which the evacuation is only a "logical" evacuation: the car containing the object is simply re-linked to a different logical place in the collection sequence, but its address does not change. In such cases, forwarding pointers are unnecessary.) Additionally, the reference in response to which the object was evacuated is updated to point to the evacuated object's new location, as block 130 indicates. And, as block 132 indicates, any reference contained in the evacuated object is processed, in an operation that FIGS. 11A and 11B (together, "FIG. 11") depict.

For each one of the evacuated object's references, the collector checks to see whether the location that it refers to is in the collection set. As blocks 134 and 136 indicate, the reference processing continues until all references in the evacuated object have been processed. In the meantime, if a reference refers to a collection-set location that contains an object not yet evacuated, the collector evacuates the referred-to object to the train to which the evacuated object containing the reference was evacuated, as blocks 138 and 140 indicate. If the reference refers to a location in the collection set from which the object has already been evacuated, then the collector uses the forwarding pointer left in that location to update the reference, as block 142 indicates. Before the processing of FIG. 11, the remembered set of the referred-to object's car will have an entry that identifies the evacuated object's old location as one containing a reference to the referred-to object. But the evacuation has placed the reference in a new location, for which the remembered set of the referred-to object's car may not have an entry. So, if that new location is not as far forward as the referred-to object, the collector adds to that remembered set an entry identifying the reference's new region, as blocks 144 and 146 indicate. As the drawings show, the same type of remembered-set update is performed if the object referred to by the evacuated reference is not in the collection set.

Now, some train-algorithm implementations postpone processing of the references contained in evacuated collection-set objects until after all directly reachable collection-set objects have been evacuated. In the implementation that FIG. 10 illustrates, though, the processing of a given evacuated object's references occurs before the next object is evacuated. So FIG. 11's blocks 134 and 148 indicate that the FIG. 11 operation is completed when all of the references contained in the evacuated object have been processed. This completes FIG. 10's object-evacuation operation, which FIG. 9's block 124 represents.

As FIG. 9 indicates, each collection-set object referred to by a reference in a remembered-set-entry-identified location is thus evacuated if it has not been already. If the object has already been evacuated from the referred-to location, the reference to that location is updated to point to the location to which the object has been evacuated. If the remembered set associated with the car containing the evacuated object's new location does not include an entry for the reference's location, it is updated to do so if the car containing the reference is younger than the car containing the evacuated object. Block 150 represents updating the reference and, if necessary, the remembered set.

As FIG. 8's blocks 112 and 114 indicate, this processing of collection-set remembered sets is performed initially only for entries that do not refer to locations in the oldest train. Those that do are processed only after all others have been, as blocks 152 and 154 indicate.

When this process has been completed, the collection set's memory space can be reclaimed, as block 164 indicates, since no remaining object is referred to from outside the collection set: any remaining collection-set object is unreachable. The collector then relinquishes control to the mutator.

FIGS. 12A–12J illustrate results of using the train algorithm. FIG. 12A represents a generation in which objects have been allocated in nine car sections. The oldest train has four cars, numbered 1.1 through 1.4. Car 1.1 has two objects, A and B. There is a reference to object B in the root set (which, as was explained above, includes live objects in the other generations). Object A is referred to by object L, which is in the third train's sole car section. In the generation's remembered sets 170, a reference in object L has therefore been recorded against car 1.1.

Processing always starts with the oldest train's earliest-added car, so the garbage collector refers to car 1.1's remembered set and finds that there is a reference from object L into the car being processed. It accordingly evacuates object A to the train that object L occupies. The object being evacuated is often placed in one of the selected train's existing cars, but we will assume for present purposes that there is not enough room. So the garbage collector evacuates object A into a new car section and updates appropriate data structures to identify it as the next car in the third train. FIG. 12B depicts the result: a new car has been added to the third train, and object A is placed in it.

FIG. 12B also shows that object B has been evacuated to a new car outside the first train. This is because object B has an external reference, which, like the reference to object A, is a reference from outside the first train, and one goal of the processing is to form trains into which there are no further references. Note that, to maintain a reference to the same object, object L's reference to object A has had to be rewritten, and so have object B's reference to object A and the inter-generational pointer to object B. In the illustrated example, the garbage collector begins a new train for the car into which object B is evacuated, but this is not a necessary requirement of the train algorithm. That algorithm requires only that externally referenced objects be evacuated to a newer train.

Since car 1.1 no longer contains live objects, it can be reclaimed, as FIG. 12B also indicates. Also note that the remembered set for car 2.1 now includes the address of a reference in object A, whereas it did not before. As was stated before, remembered sets in the illustrated embodiment include only references from cars further back in the order than the one with which the remembered set is associated. The reason for this is that any other cars will already be reclaimed by the time the car associated with that remembered set is processed, so there is no reason to keep track of references from them.

The next step is to process the next car, the one whose index is 1.2. Conventionally, this would not occur until some collection cycle after the one during which car 1.1 is collected. For the sake of simplicity we will assume that the mutator has not changed any references into the generation in the interim.

FIG. 12B depicts car 1.2 as containing only a single object, object C, and that car's remembered set contains the address of an inter-car reference from object F. The garbage collector follows that reference to object C. Since this identifies object C as possibly reachable, the garbage collector evacuates it from car set 1.2, which is to be reclaimed. Specifically, the garbage collector removes object C to a new car section, section 1.5, which is linked to the train to which the referring object F's car belongs. Of course, object F's reference needs to be updated to object C's new location. FIG. 12C depicts the evacuation's result.

FIG. 12C also indicates that car set 1.2 has been reclaimed, and car 1.3 is next to be processed. The only address in car 1.3's remembered set is that of a reference in object G. Inspection of that reference reveals that it refers to object F. Object F may therefore be reachable, so it must be evacuated before car section 1.3 is reclaimed. On the other hand, there are no references to objects D and E, so they are clearly garbage. FIG. 12D depicts the result of reclaiming car 1.3's space after evacuating possibly reachable object F.

In the state that FIG. 12D depicts, car 1.4 is next to be processed, and its remembered set contains the addresses of references in objects K and C. Inspection of object K's reference reveals that it refers to object H, so object H must be evacuated. Inspection of the other remembered-set entry, the reference in object C, reveals that it refers to object G, so that object is evacuated, too. As FIG. 12E illustrates, object H must be added to the second train, to which its referring object K belongs. In this case there is room enough in car 2.2, which its referring object K occupies, so evacuation of object H does not require that object K's reference to object H be added to car 2.2's remembered set. Object G is evacuated to a new car in the same train, since that train is where referring object C resides. And the address of the reference in object G to object C is added to car 1.5's remembered set.

FIG. 12E shows that this processing has eliminated all references into the first train, and it is an important part of the train algorithm to test for this condition. That is, even though there are references into both of the train's cars, those cars' contents can be recognized as all garbage because there are no references into the train from outside of it. So all of the first train's cars are reclaimed.

The collector accordingly processes car 2.1 during the next collection cycle, and that car's remembered set indicates that there are two references outside the car that refer to objects within it. Those references are in object K, which is in the same train, and object A, which is not. Inspection of those references reveals that they refer to objects I and J, which are evacuated.

The result, depicted in FIG. 12F, is that the remembered sets for the cars in the second train reveal no inter-car references, and there are no inter-generational references into it, either. That train's car sections therefore contain only garbage, and their memory space can be reclaimed.

So car 3.1 is processed next. Its sole object, object L, is referred to inter-generationally as well as by a reference in the fourth train's object M. As FIG. 12G shows, object L is therefore evacuated to the fourth train. And the address of the reference in object L to object A is placed in the remembered set associated with car 3.2, in which object A resides.

The next car to be processed is car 3.2, whose remembered set includes the addresses of references into it from objects B and L. Inspection of the reference from object B reveals that it refers to object A, which must therefore be evacuated to the fifth train before car 3.2 can be reclaimed. Also, we assume that object A cannot fit in car section 5.1, so a new car 5.2 is added to that train, as FIG. 12H shows, and object A is placed in its car section. All referred-to objects in the third train having been evacuated, that (single-car) train can be reclaimed in its entirety.

A further observation needs to be made before we leave FIG. 12G. Car 3.2's remembered set additionally lists a reference in object L, so the garbage collector inspects that reference and finds that it points to the location previously occupied by object A. This brings up a feature of copying-collection techniques such as the typical train-algorithm implementation. When the garbage collector evacuates an object from a car section, it marks the location as having been evacuated and leaves the address of the object's new location. So, when the garbage collector traces the reference from object L, it finds that object A has been removed, and it accordingly copies the new location into object L as the new value of its reference to object A.

In the state that FIG. 12H illustrates, car 4.1 is the next to be processed. Inspection of the fourth train's remembered sets reveals no inter-train references into it, but the inter-generational scan (possibly performed with the aid of FIG. 6's card tables) reveals inter-generational references into car 4.2. So the fourth train cannot be reclaimed yet. The garbage collector accordingly evacuates car 4.1's referred-to objects in the normal manner, with the result that FIG. 12I depicts.

In that state, the next car to be processed has only inter-generational references into it. So, although its referred-to objects must therefore be evacuated from the train, they cannot be placed into trains that contain references to them. Conventionally, such objects are evacuated to a train at the end of the train sequence. In the illustrated implementation, a new train is formed for this purpose, so the result of car 4.2's processing is the state that FIG. 12J depicts.

Processing continues in this same fashion. Of course, subsequent collection cycles will not in general proceed, as in the illustrated cycles, without any reference changes by the mutator and without any addition of further objects. But reflection reveals that the general approach just described still applies when such mutations occur.

The evacuation process described above for the train algorithm is but one example of the copying performed by copying collectors generally. It is apparent from the nature of this task that it lends itself to parallel execution in multi-threaded (typically, multi-processor) systems. The system's parallel nature can be used to advantage if each parallel thread is given a subset of the evacuations to be performed. Therefore, this aspect of the collection process has been the subject of considerable efforts at scheduling the work to be done.

A typical way of dividing up the work is to assign the different execution threads different subsets of the references into the "from" space that are located outside that space. In the case of a train-algorithm-type collector that employs remembered sets, those subsets would typically be the references identified by various subsets of the collection-set remembered sets. References located outside the generation may be divided similarly.

But that division of labor alone is not usually adequate. Because of the evacuation process's recursive nature—i.e., because the evacuation of any collection-set object that includes references to other collection-set objects will necessitate those other objects' evacuation, too—the amount of work spawned by one equal subset of, say, a remembered set can be many times the amount spawned by all other subsets combined. Therefore, if no mechanism is provided for enabling other threads to "steal" another thread's work, a lot of processor idle time can result. So workers in this field have developed ways of implementing work "stealing."

The approach employed most widely in this regard is for each execution thread to be allocated memory for a data structure, called a deque (a double-ended queue). A thread pushes identifiers of tasks that its processing has shown need to be performed onto its deque, and it pops tasks from that deque as previous tasks are completed. When a given thread has completed not only all of the tasks initially assigned but all of those that its performance of those tasks reveal need to be performed, its deque becomes empty, and it then scans the other threads' deque to find further work to do. Typically, it pops work items from the end of the deque opposite the one from which the deque's "owner" thread pops work and onto which it pushes work. This approach to load balancing has attracted a wide following for a number of reasons, not the least of which is that there are ways in which the owner thread can push task identifiers onto the deque and in most cases pop them from the deque without explicit synchronization with the other threads.

SUMMARY OF THE INVENTION

I have recognized, though, that load balancing in a copying collector can be performed at a memory cost that is much less than the cost that conventional approaches exact. The memory required by a deque is unbounded, so it requires some type of overflow mechanism and potentially requires more memory than the collection set itself. In contrast, the memory cost exacted by my approach can be essentially negligible and require no overflow mechanism. Additionally, it can be implemented in such a manner as to minimize the number of stealing operations and thus the amount of synchronization they require.

I have achieved this by adapting to the work-sharing problem a list-moving approach described by Clark, "An Efficient List-Moving Algorithm Using Constant Work Space," *Communications of the ACM*, June 1976, vol. 19, Issue 6. In that approach, when an object in from space is evacuated to to space and contains references to more than one from-space object that will also require evacuation, part of the from-space memory that was occupied by the evacuated reference-containing object receives a "next" pointer by which a linked list of such evacuated regions is maintained. The collector can then proceed with the (possibly recursive) evacuation of the first object referred to from the evacuee object and then return to the linked list to find references to objects not yet evacuated. By using such a structure for stealing, I am able to support load balancing at essentially no memory cost; the list of work to be done is supported by the from space itself.

In accordance with another aspect of the invention, stealing is facilitated by grouping the stack objects into groups that stealers can steal easily as a unit. The to space is divided into local-allocation buffers ("LABs"), and each of the threads claims respective LABs for its exclusive use in placing evacuated objects. When a thread has filled a LAB but has not yet evacuated all of the from-space objects referred to by objects in that LAB, it places that LAB in a respective LAB list that it maintains. It also associates with that LAB the list of objects in that LAB that contain references to unevacuated from-space objects, and it starts a new object stack. When it has no more objects on its object stack, it pops a LAB from its LAB stack and adopts the objects associated with that LAB as its object stack. When its object stack and its LAB stack are both exhausted but other threads still have unexhausted LAB stacks, it steals one or more LABs from other stacks and thereby acquires one or more entire object stacks without having to perform a steal operation for each stolen object.

BRIEF DESCRIPTION OF THE DRAWINGS

The invention description below refers to the accompanying drawings, of which.

DETAILED DESCRIPTION OF AN ILLUSTRATIVE EMBODIMENT

Figure 9:
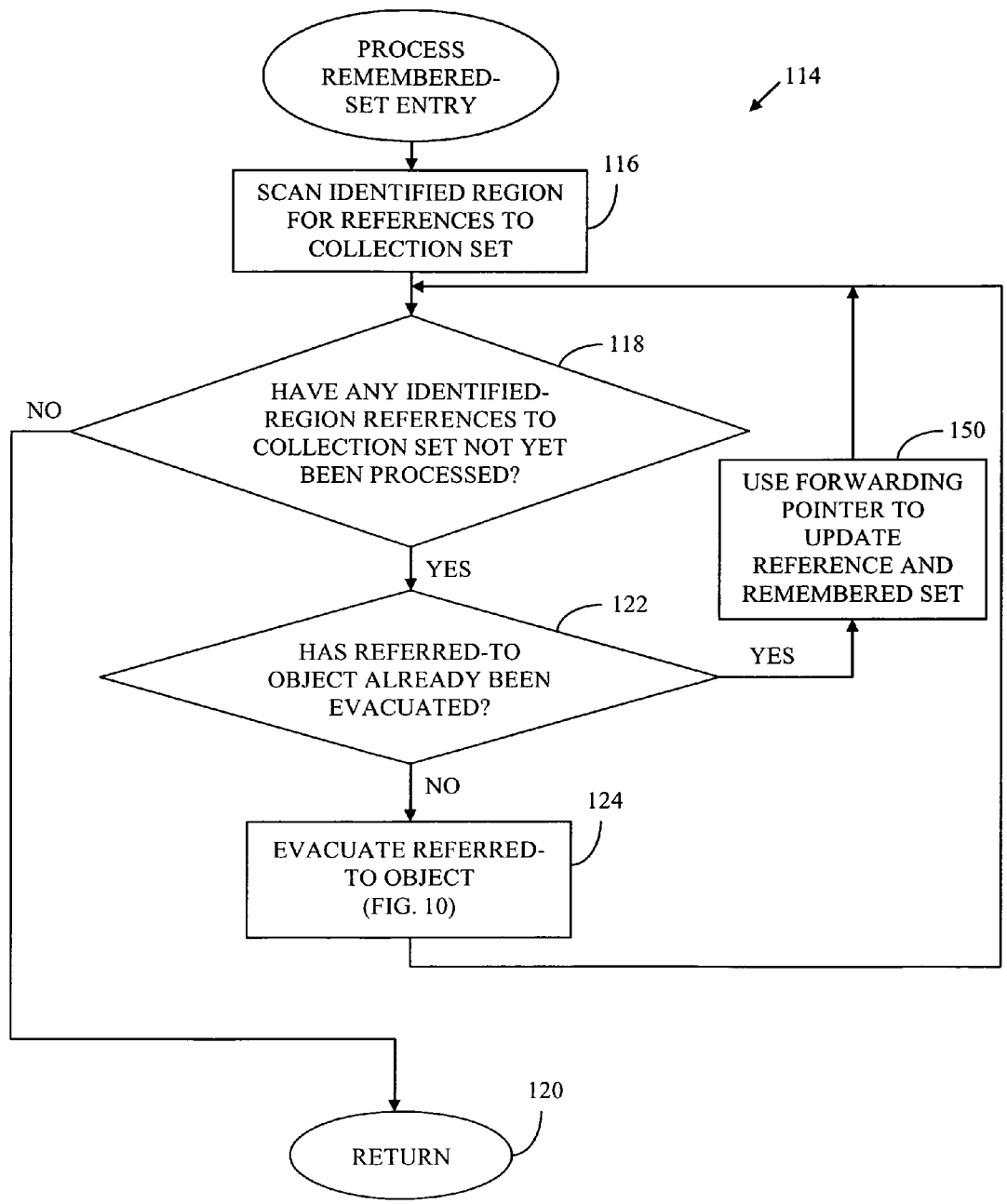
FIG. 9, discussed above, is a flow chart that illustrates in more detail the remembered-set processing included in FIG. 8A.
Figure 10:
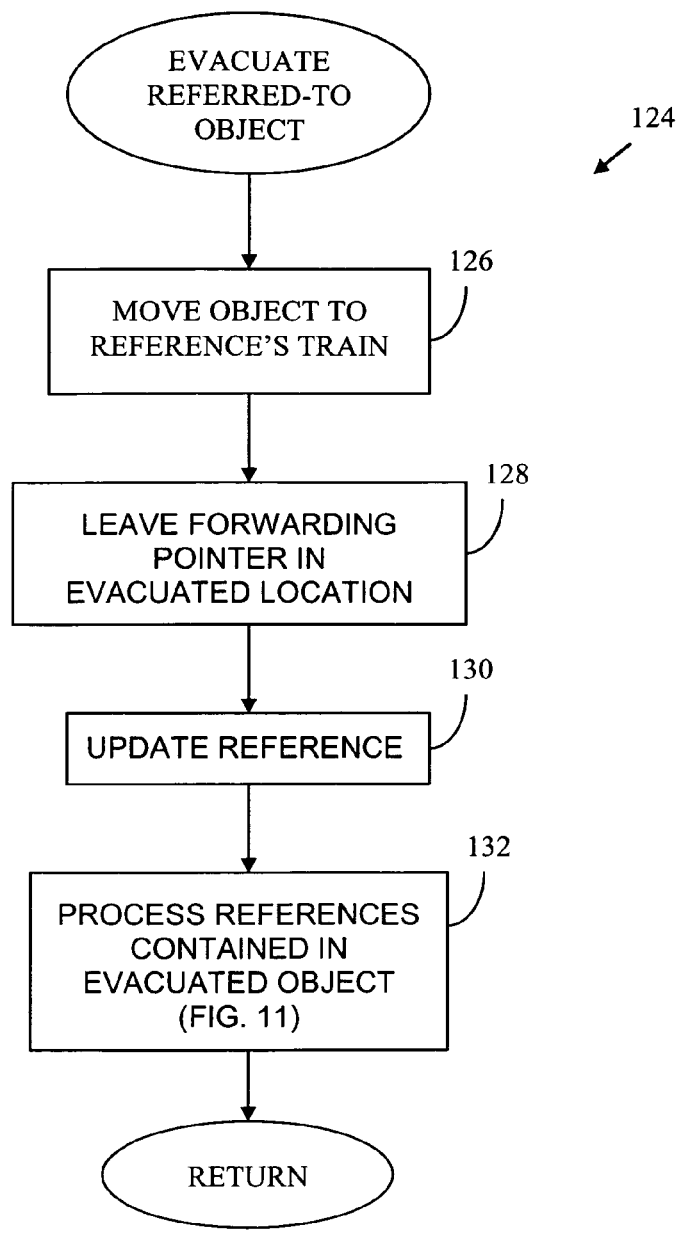
FIG. 10, discussed above, is a block diagram that illustrates in more detail the referred-to-object evacuation that FIG. 9 includes.
Figure 11A:
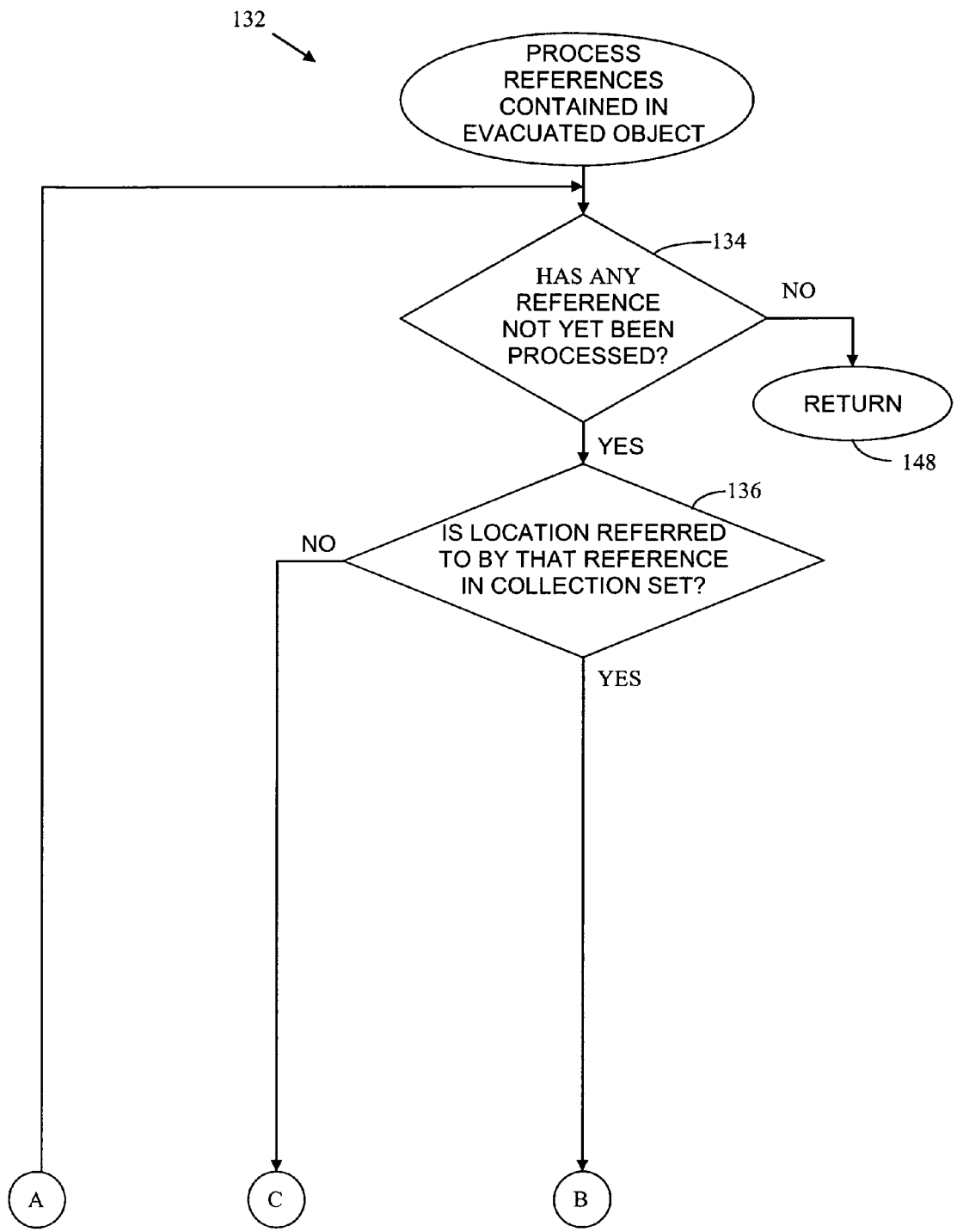
FIGS. 11A and 11B, discussed above, together form a flow chart that illustrates in more detail the FIG. 10 flow chart's step of processing evacuated objects' references.
Figure 11B:
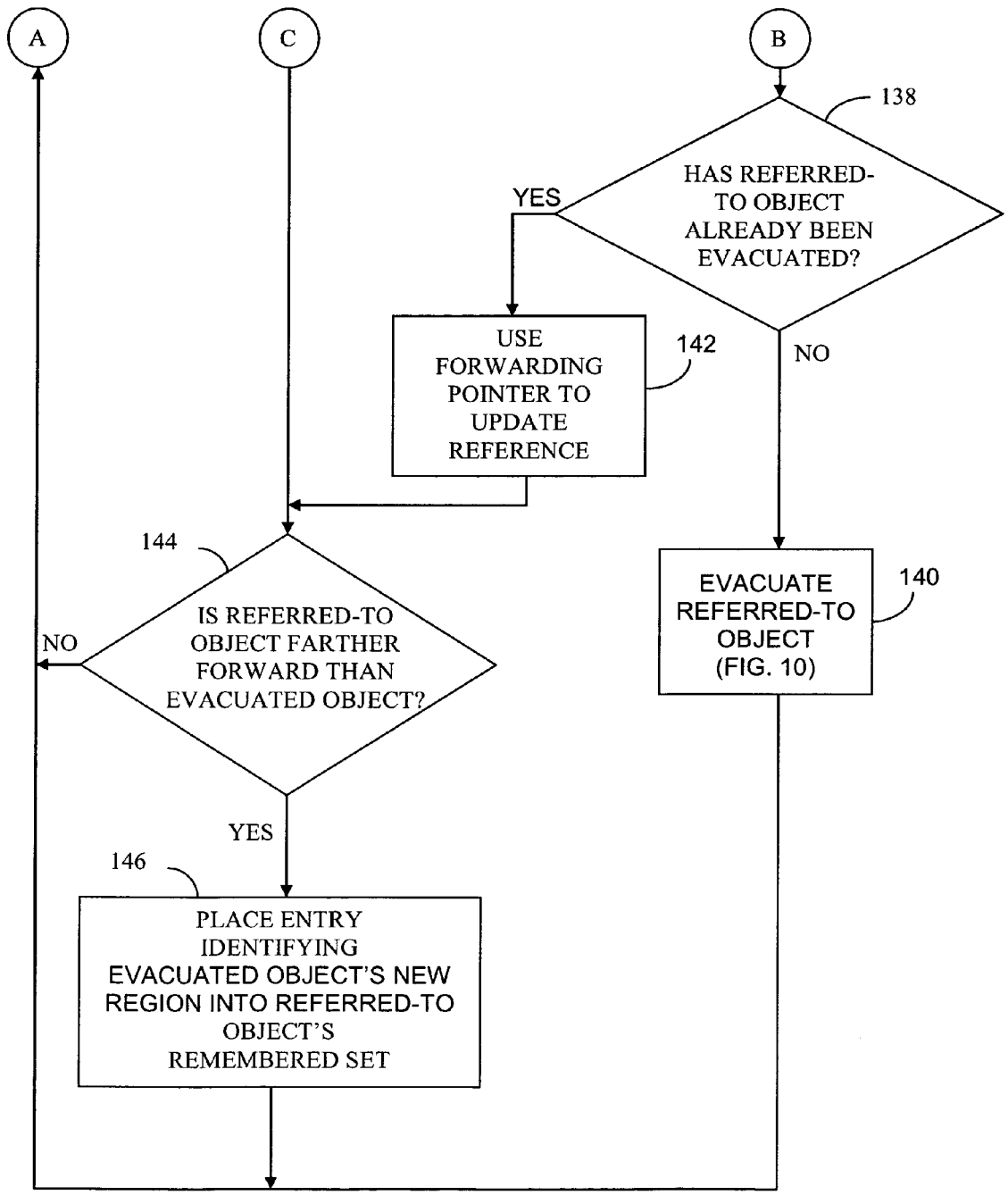
Figure 12A:
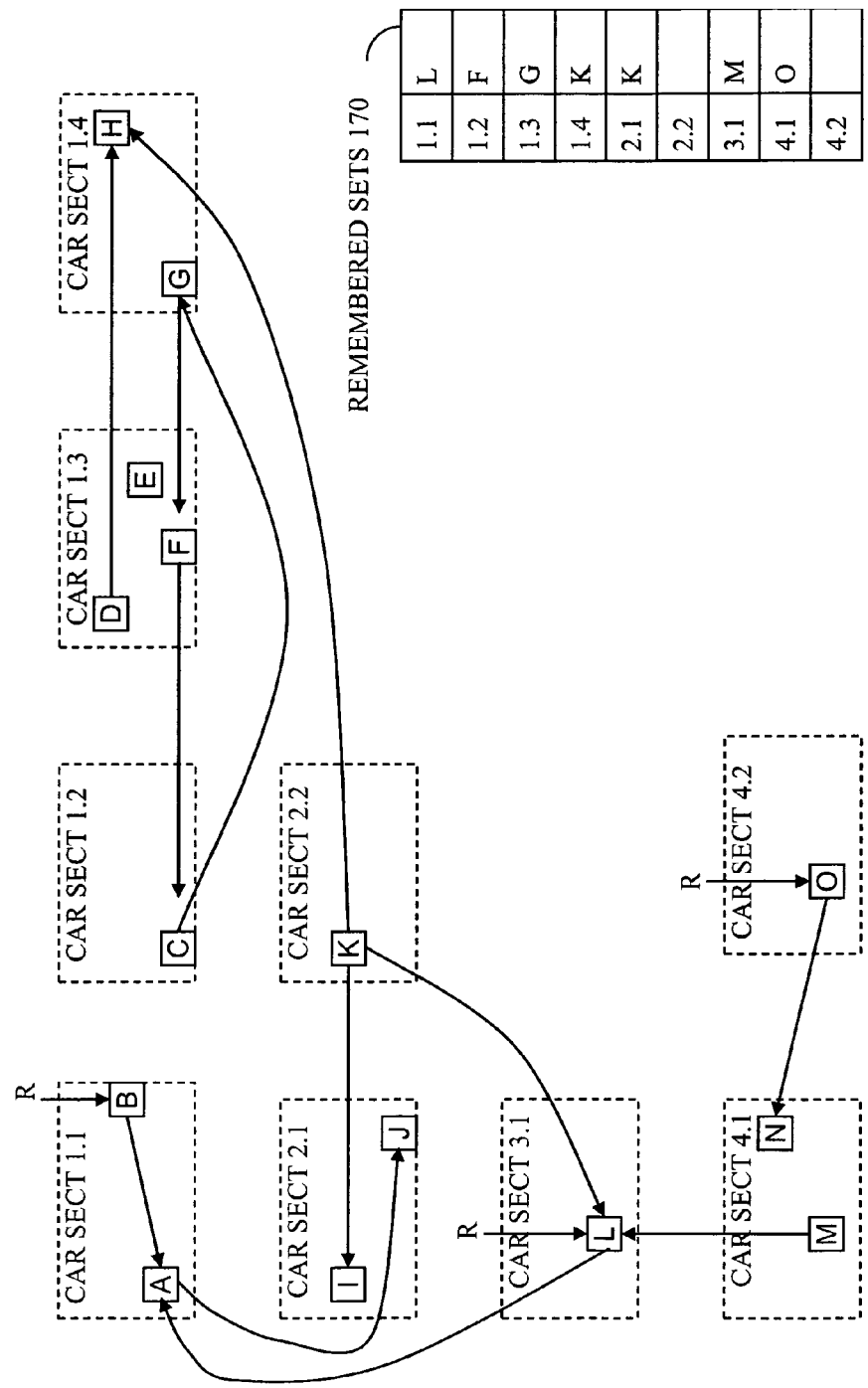
FIGS. 12A–12J, discussed above, are diagrams that illustrate a collection scenario that can result from using the train algorithm.
Figure 12B:
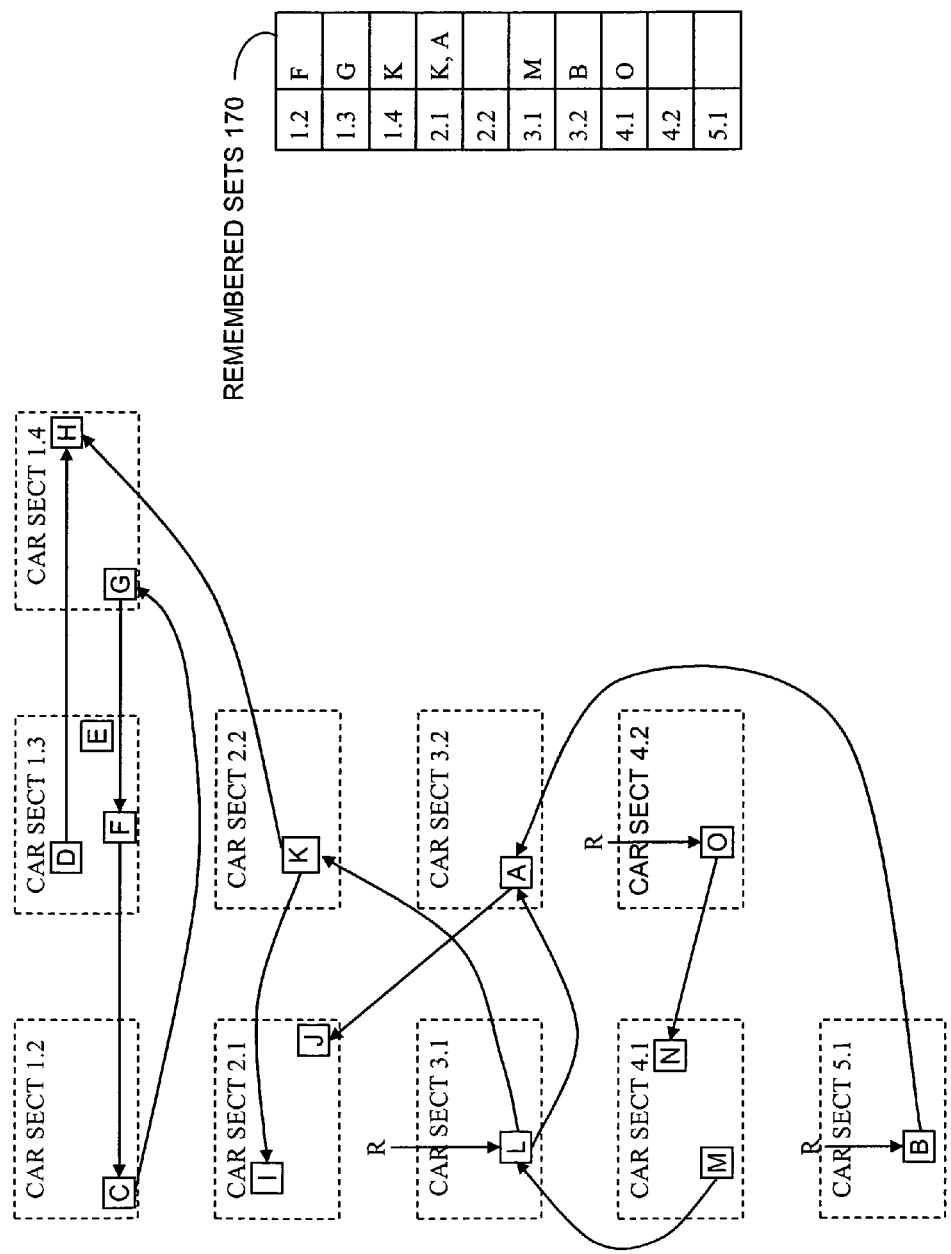
Figure 12C:
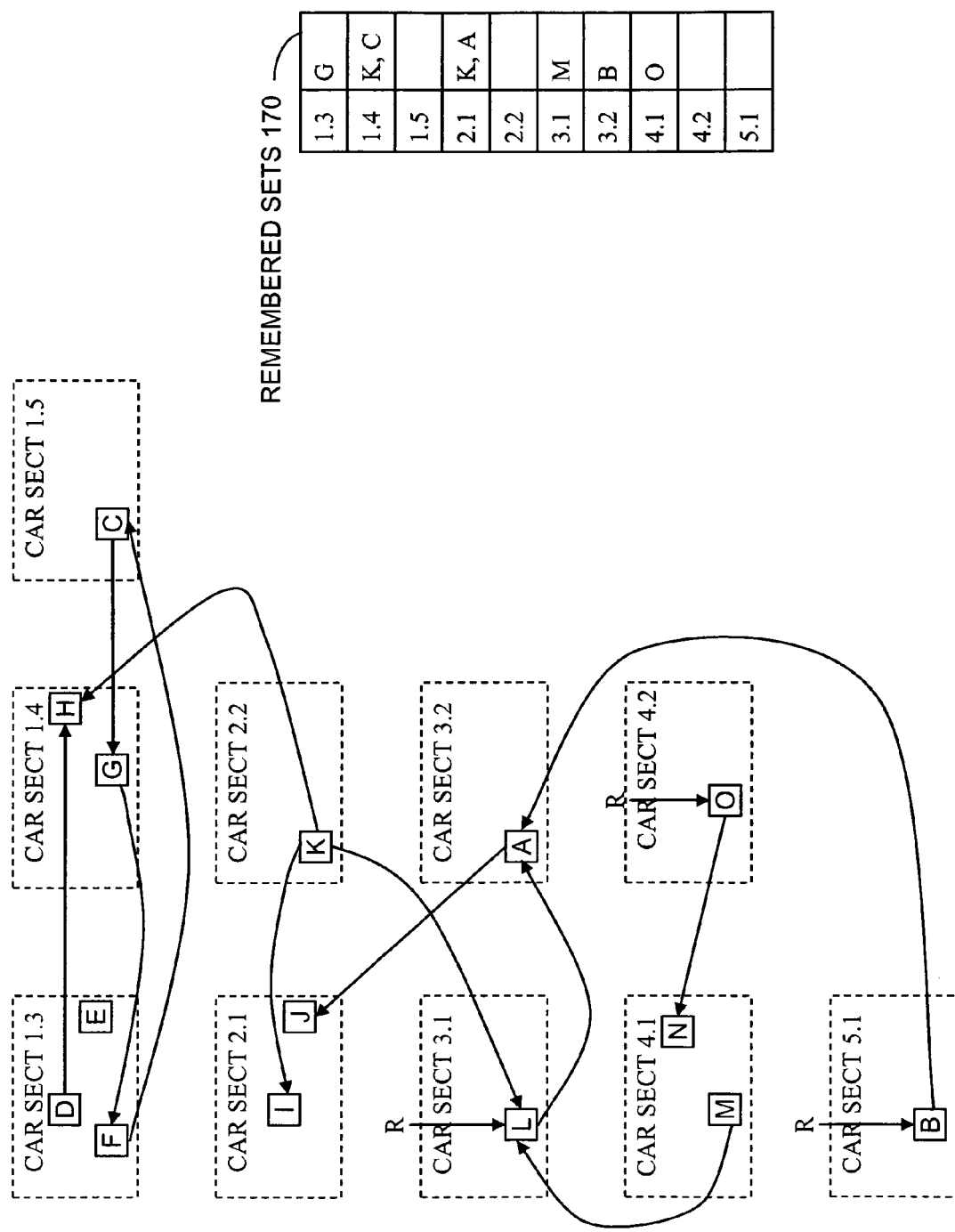
Figure 12D:
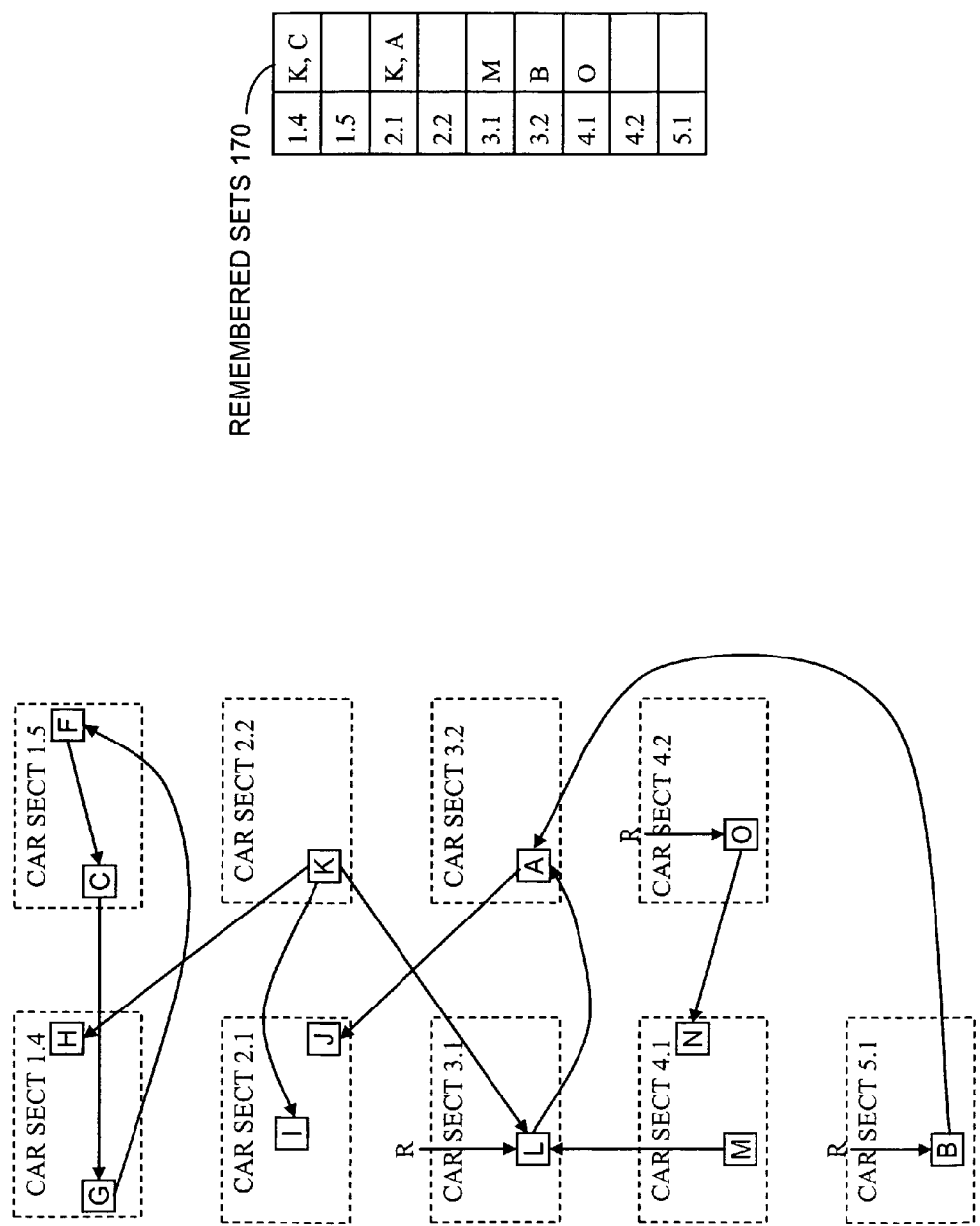
Figure 12E:
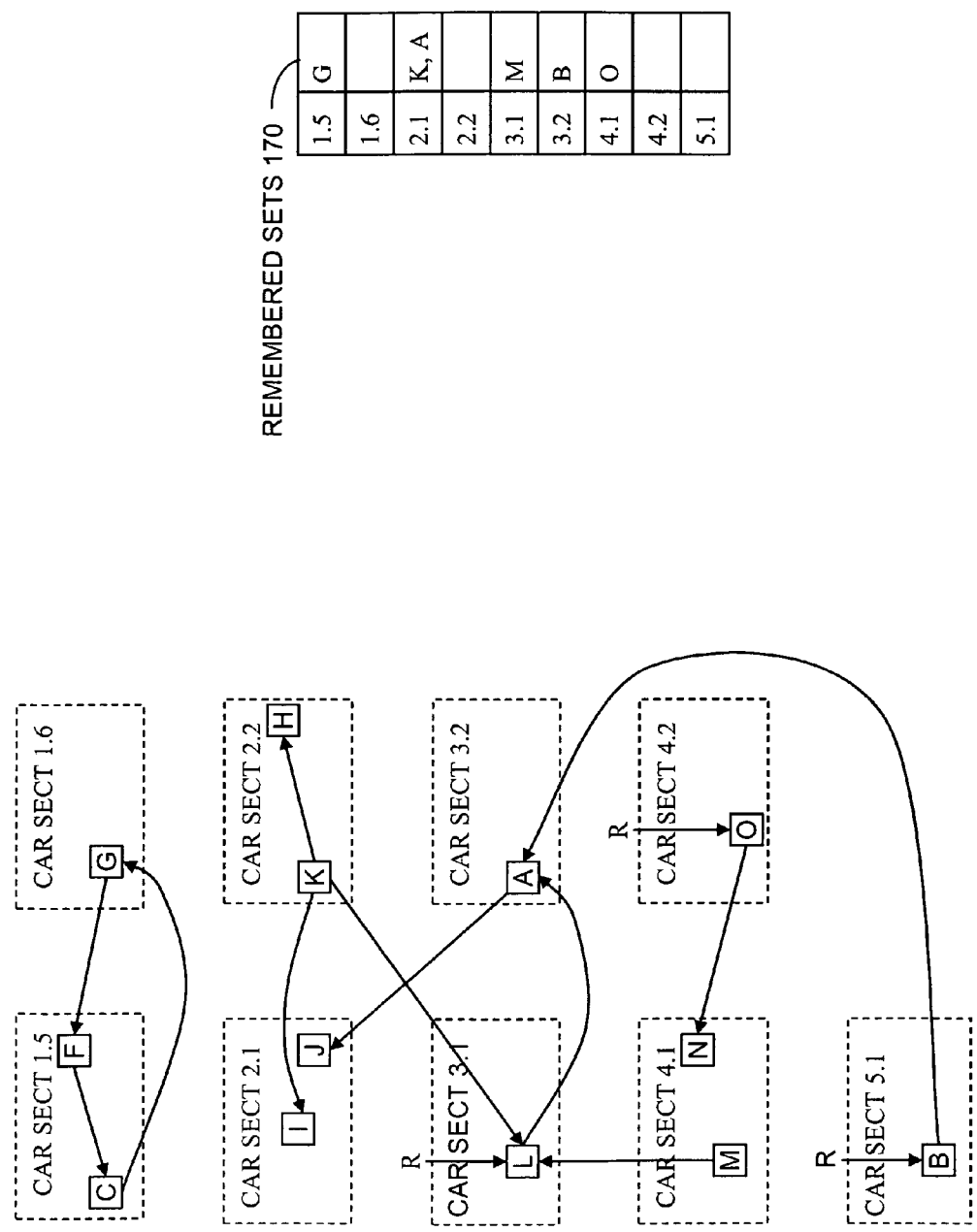
Figure 12F:
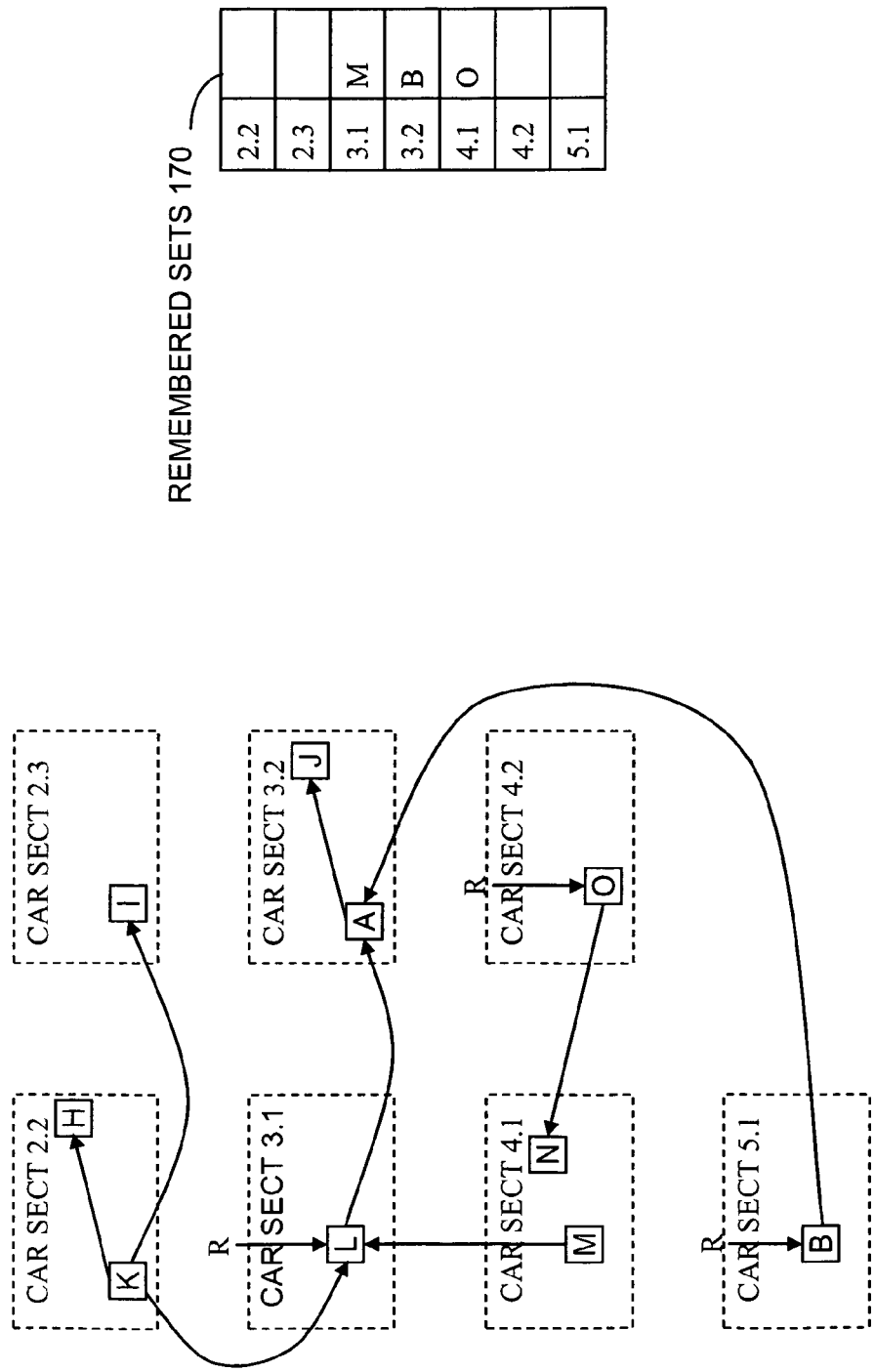
Figure 12G:
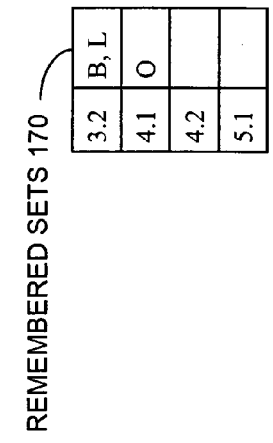
Figure 12G:
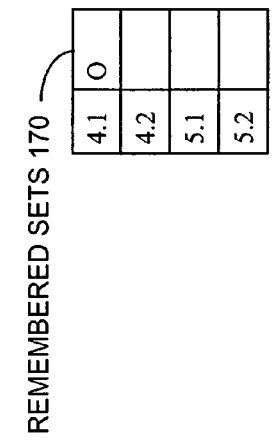
Figure 12G:
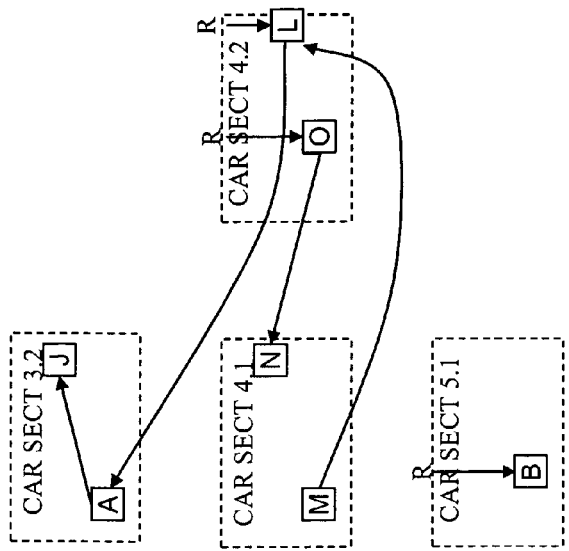
Figure 12H:
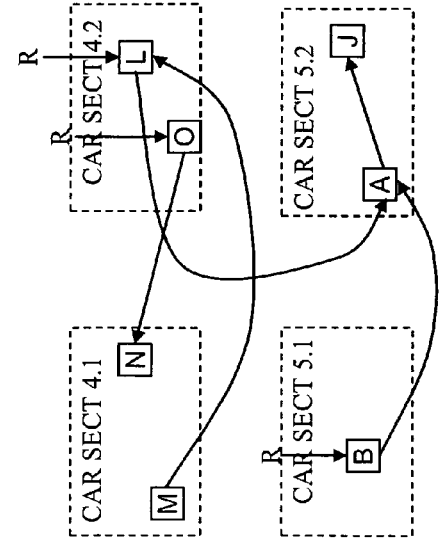
Figure 12I:
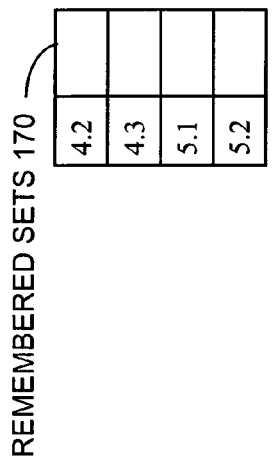
Figure 12I:
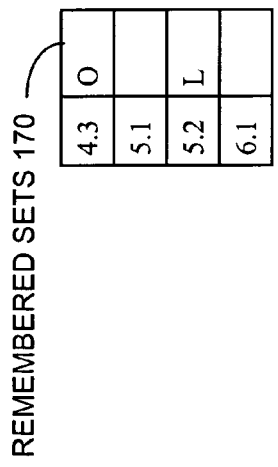
Figure 12I:
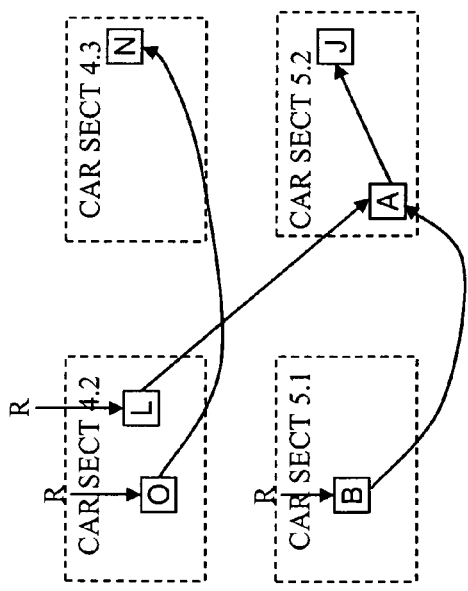
Figure 12J:
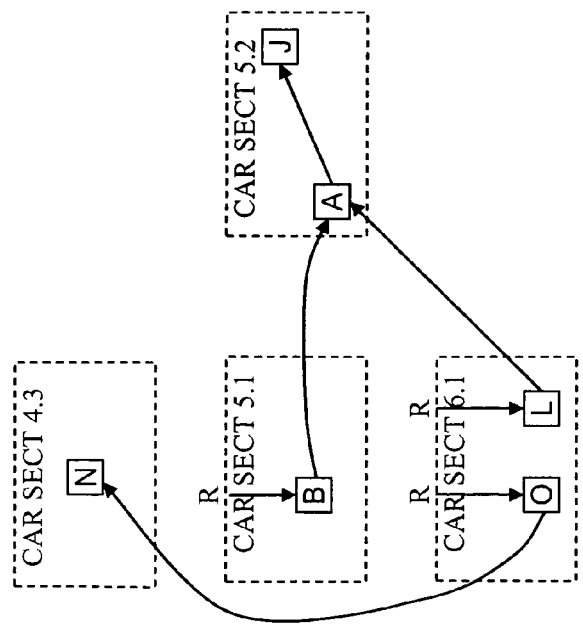

Although the present invention's applicability is not limited to garbage collectors that implement the train algorithm, such collectors can benefit from its teachings. Also, although the details of its operation differ form those that FIGS. 9–11 illustrate, it can be implemented in a collector whose overall operational sequence is essentially the one that FIG. 8 depicts.

Figure 13A:
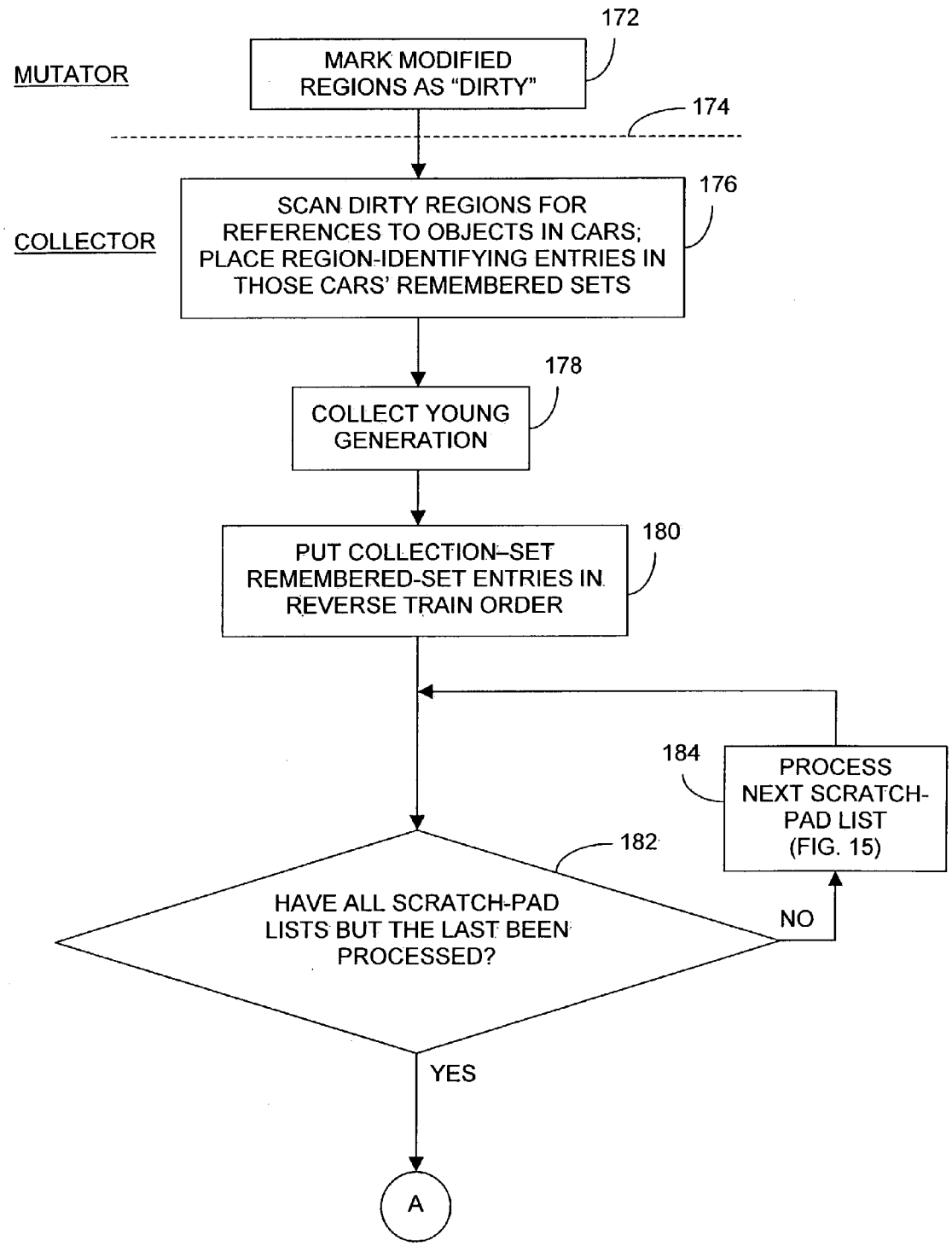
FIGS. 13A and 13B together constitute a flow chart similar to FIG. 8 but incorporating certain optimizations.
Figure 13B:
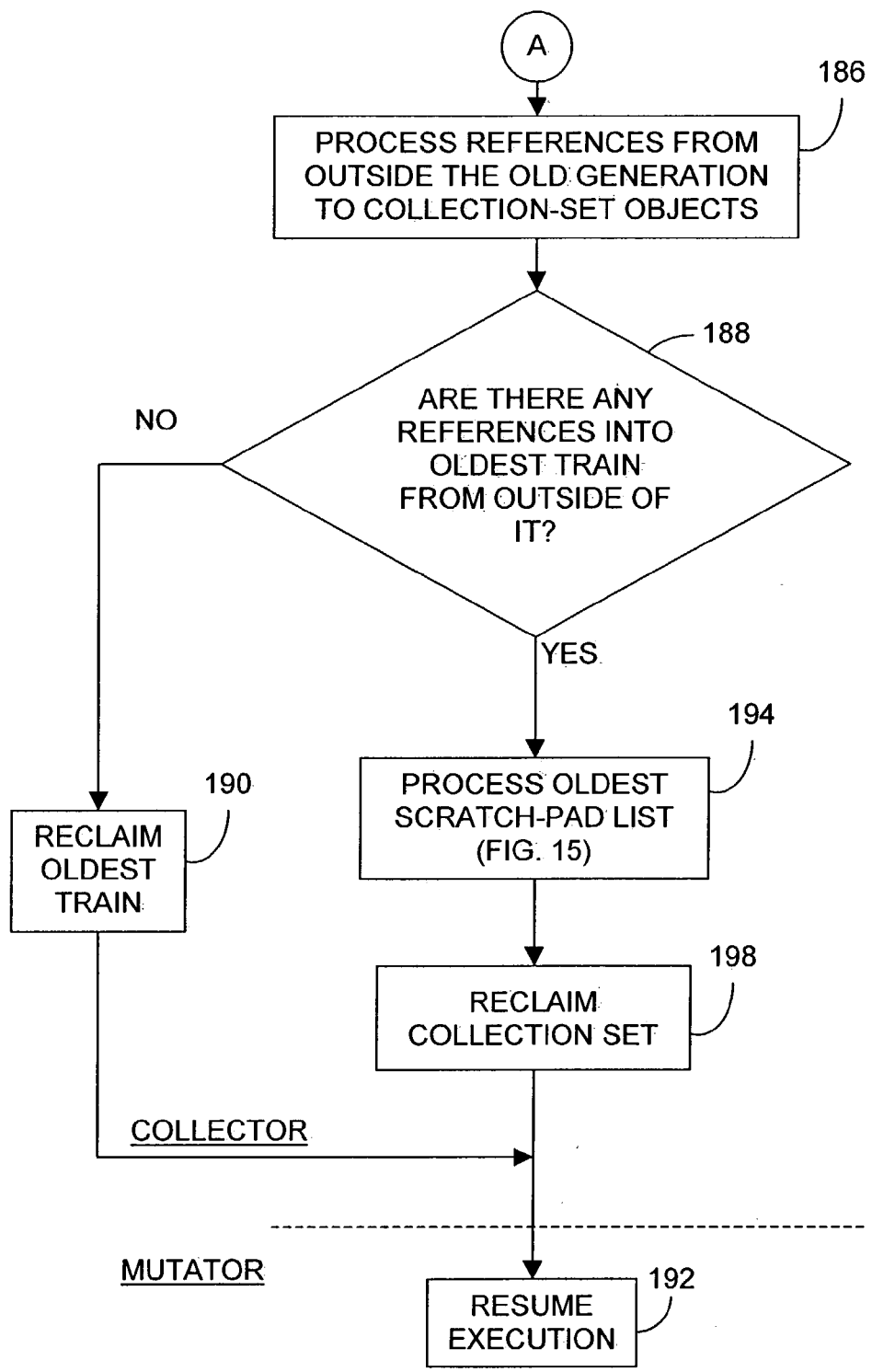

But it will instead be exemplified below in a collector whose operational sequence is the one that FIGS. 13A and 13B (together, "FIG. 13") depict. Although the FIG. 13 sequence implements the train algorithm, it admits of the possibility of more than one collection-set car in a given collection increment, whereas it was tacitly assumed in connection with FIG. 8 that only a single car section is collected in any given collection increment. Also, the FIG. 13 sequence incorporates certain optimizations that the FIG. 8 sequence does not.

Figure 1:
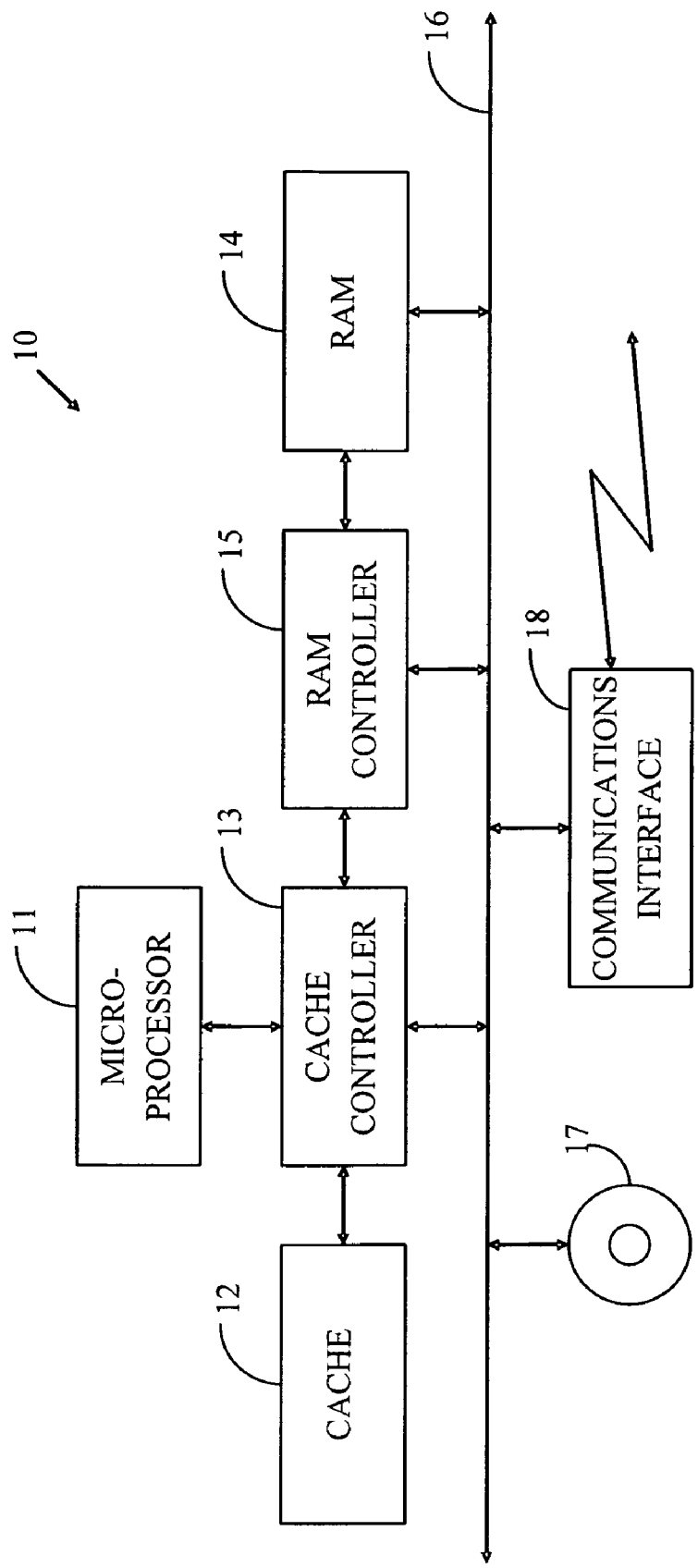
FIG. 1, discussed above, is a block diagram of a computer system in which the present invention's teachings can be practiced.
Figure 2:
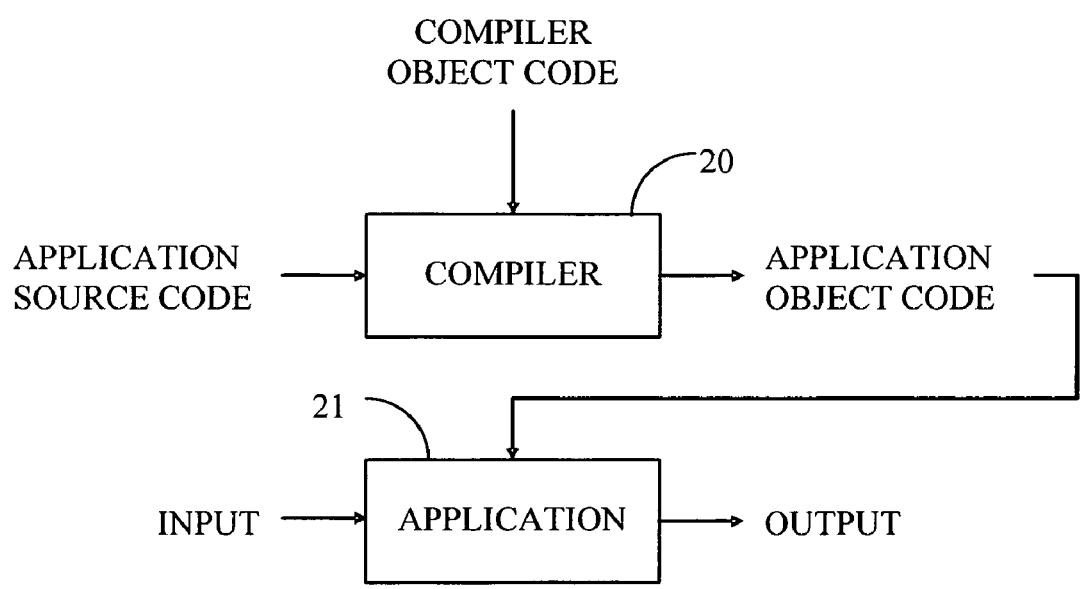
FIG. 2 is, discussed above, is a block diagram that illustrates a compiler's basic functions.
Figure 3:
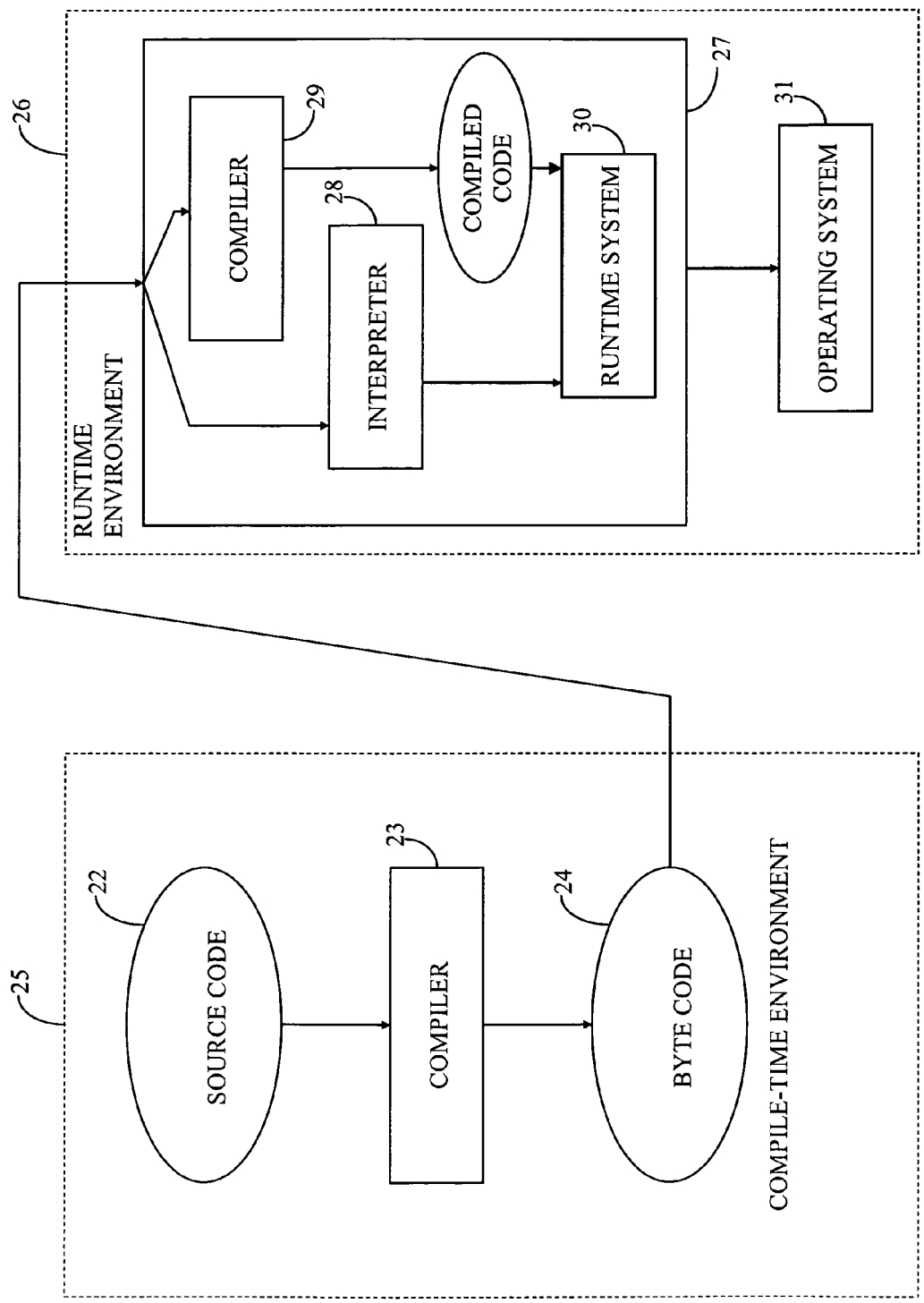
FIG. 3, discussed above, is a block diagram that illustrates a more-complicated compiler/interpreter organization.
Figure 4:
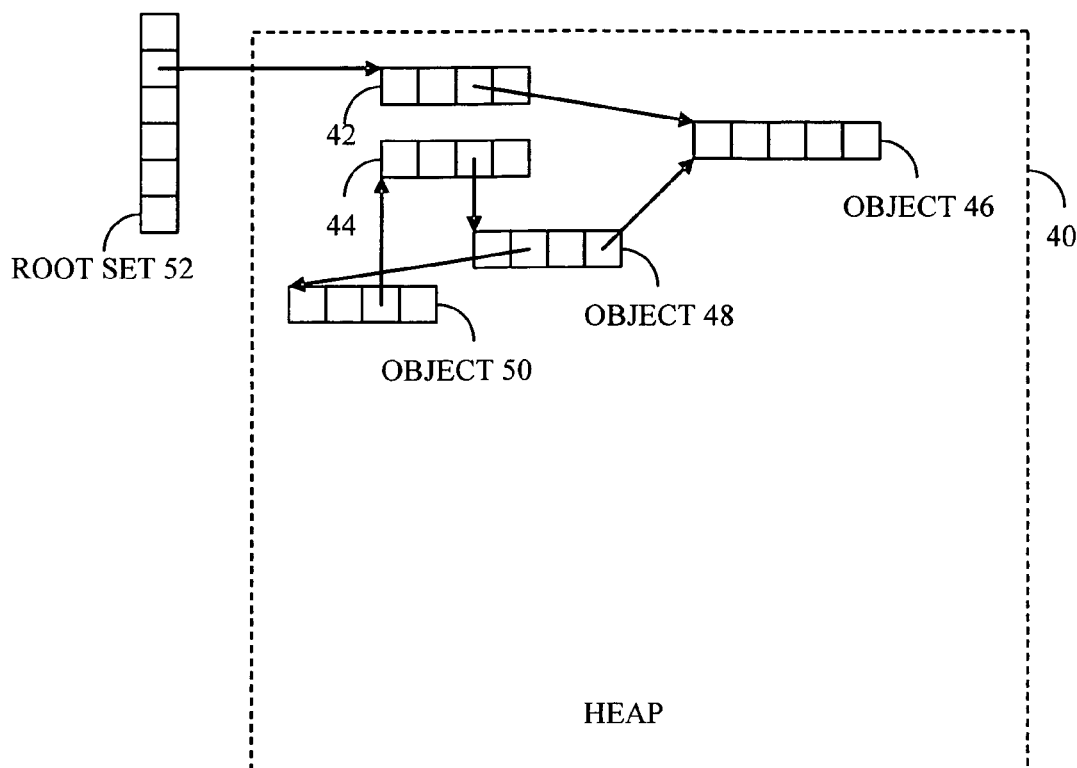
FIG. 4, discussed above, is a diagram that illustrates a basic garbage-collection mechanism.
Figure 5:
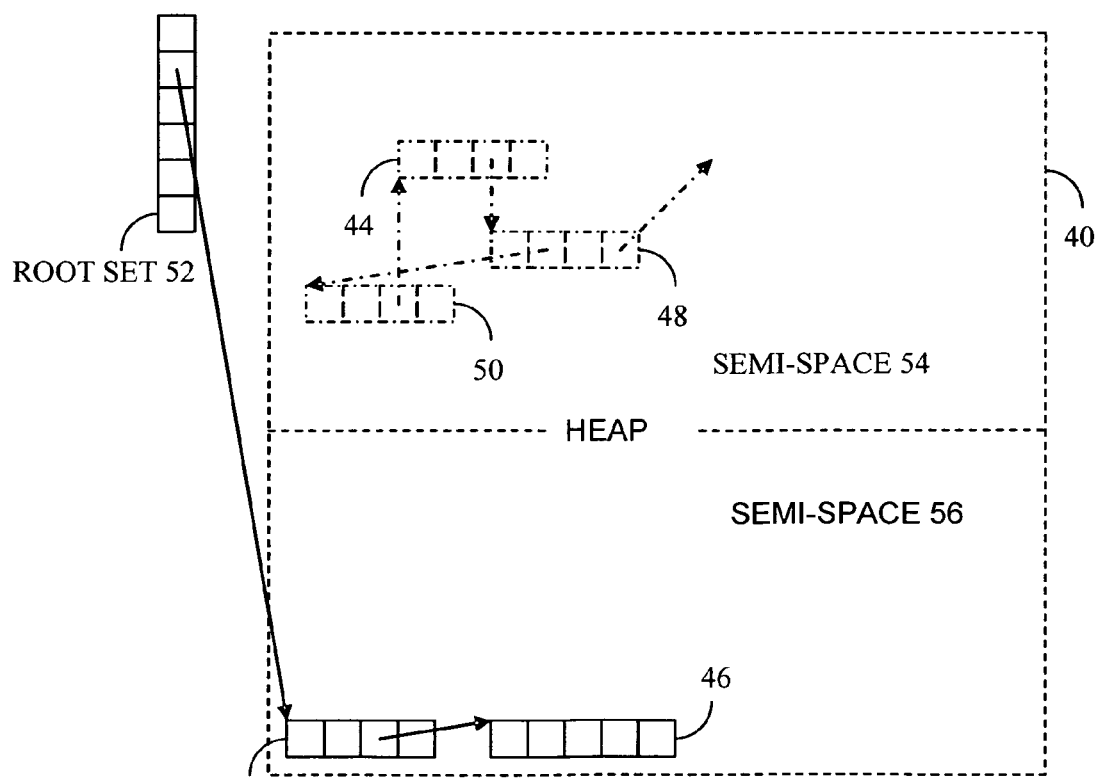
FIG. 5, discussed above, is a similar diagram illustrating that garbage-collection approach's relocation operation.
Figure 6:
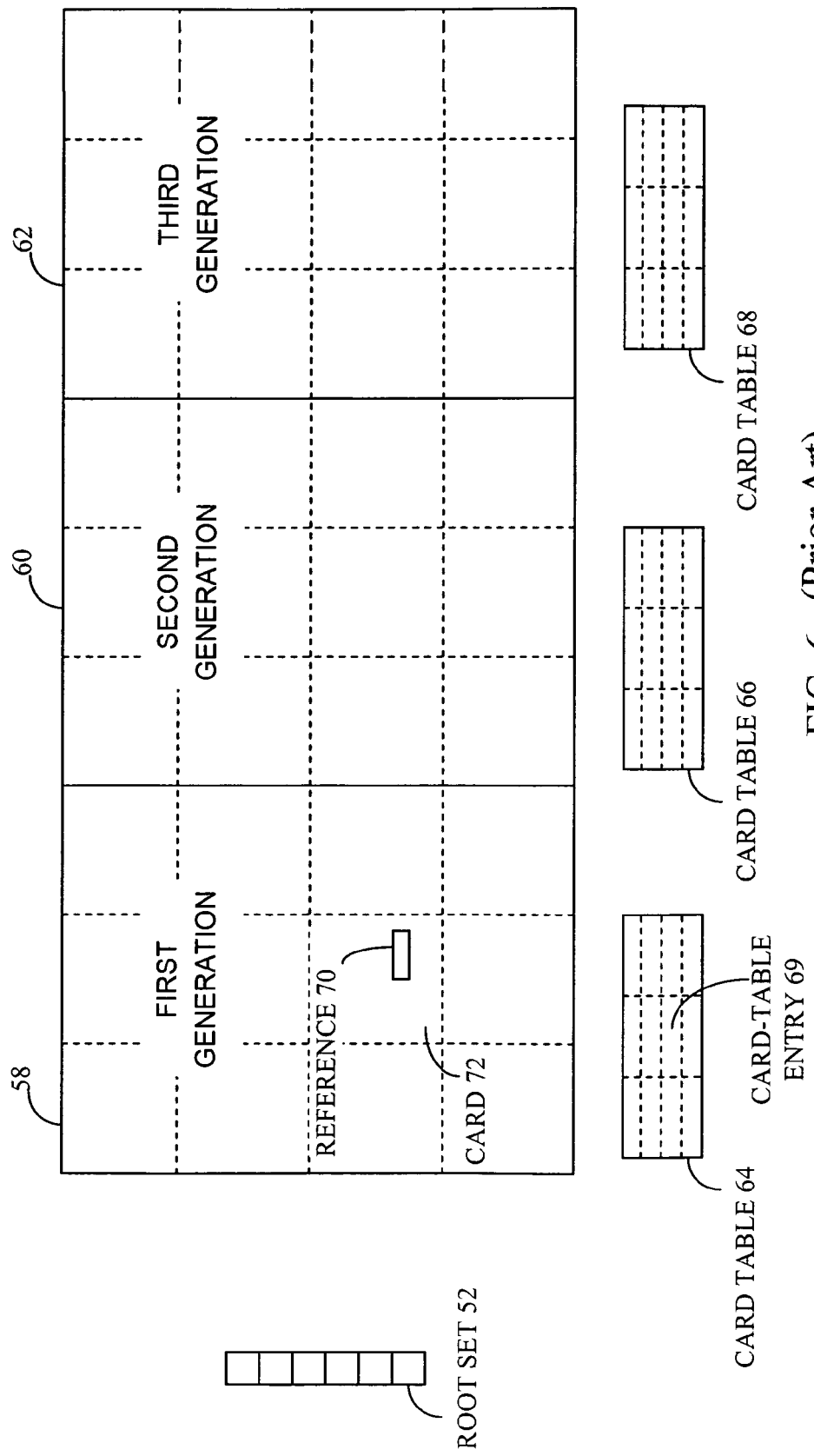
FIG. 6, discussed above, is a diagram that illustrates a garbage-collected heap's organization into generations.
Figure 7:
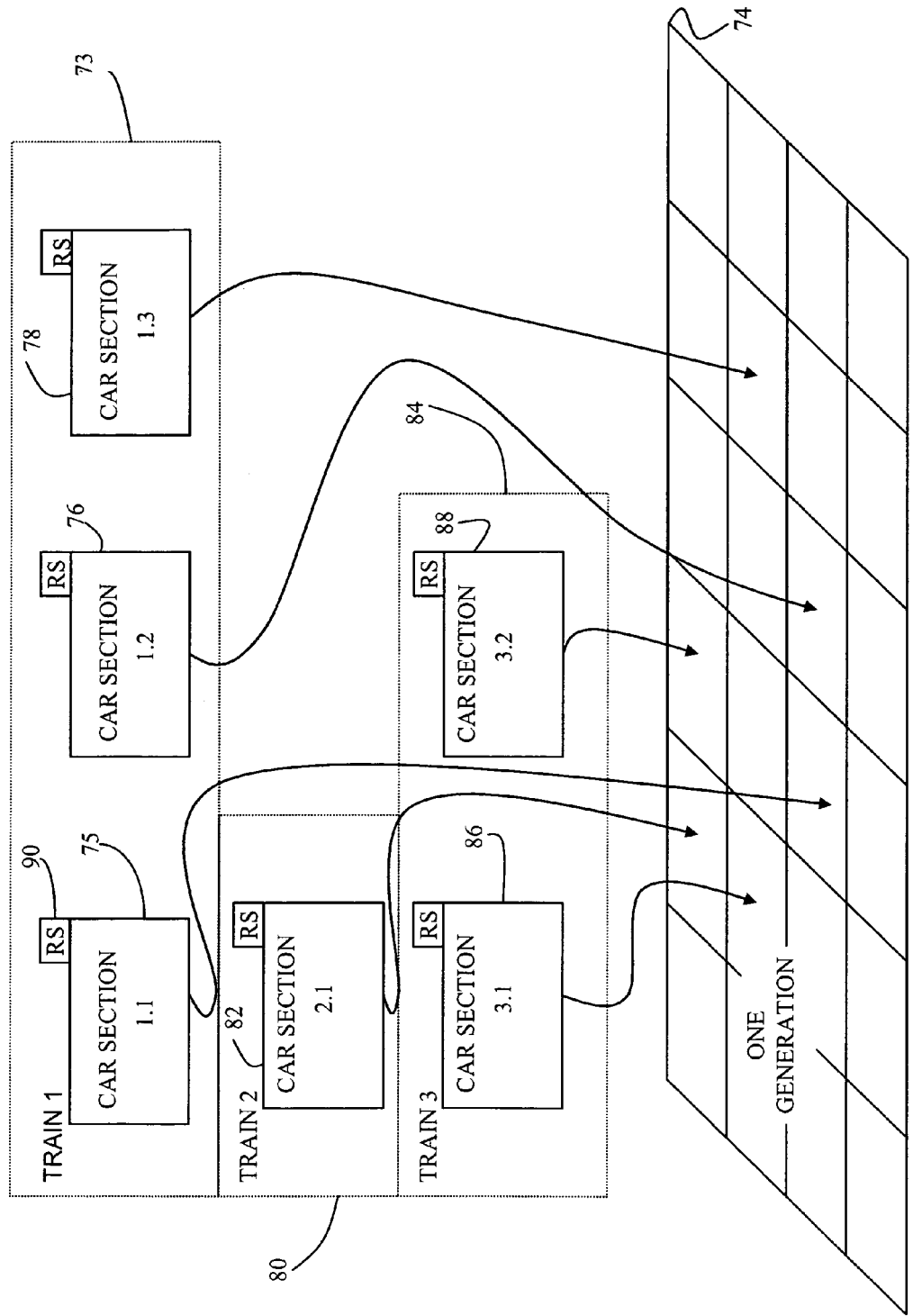
FIG. 7, discussed above, is a diagram that illustrates a generation organization employed for the train algorithm.
Figure 8A:
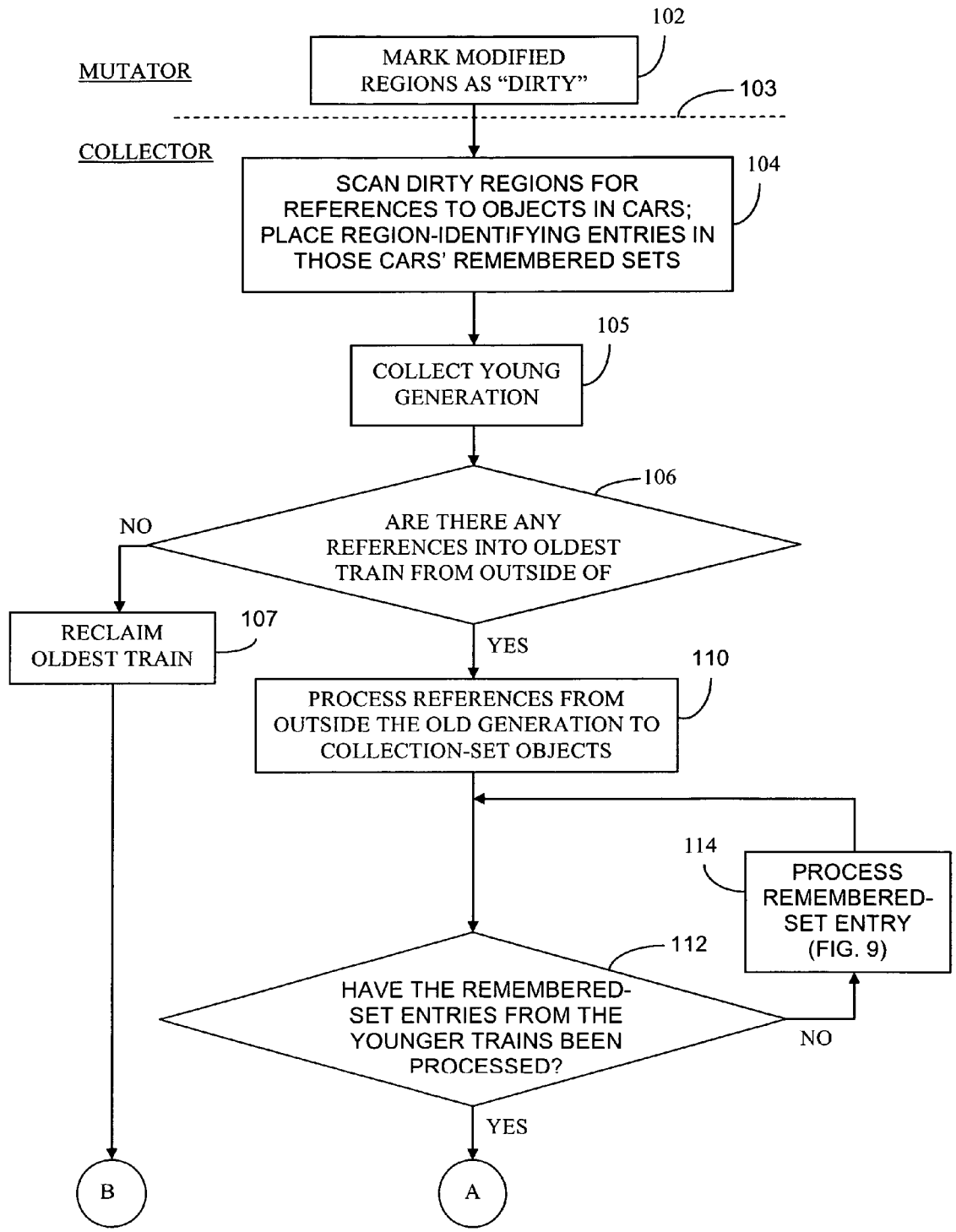
FIGS. 8A and 8B, discussed above, together constitute a flow chart that illustrates a garbage-collection interval that includes old-generation collection.
Figure 8B:
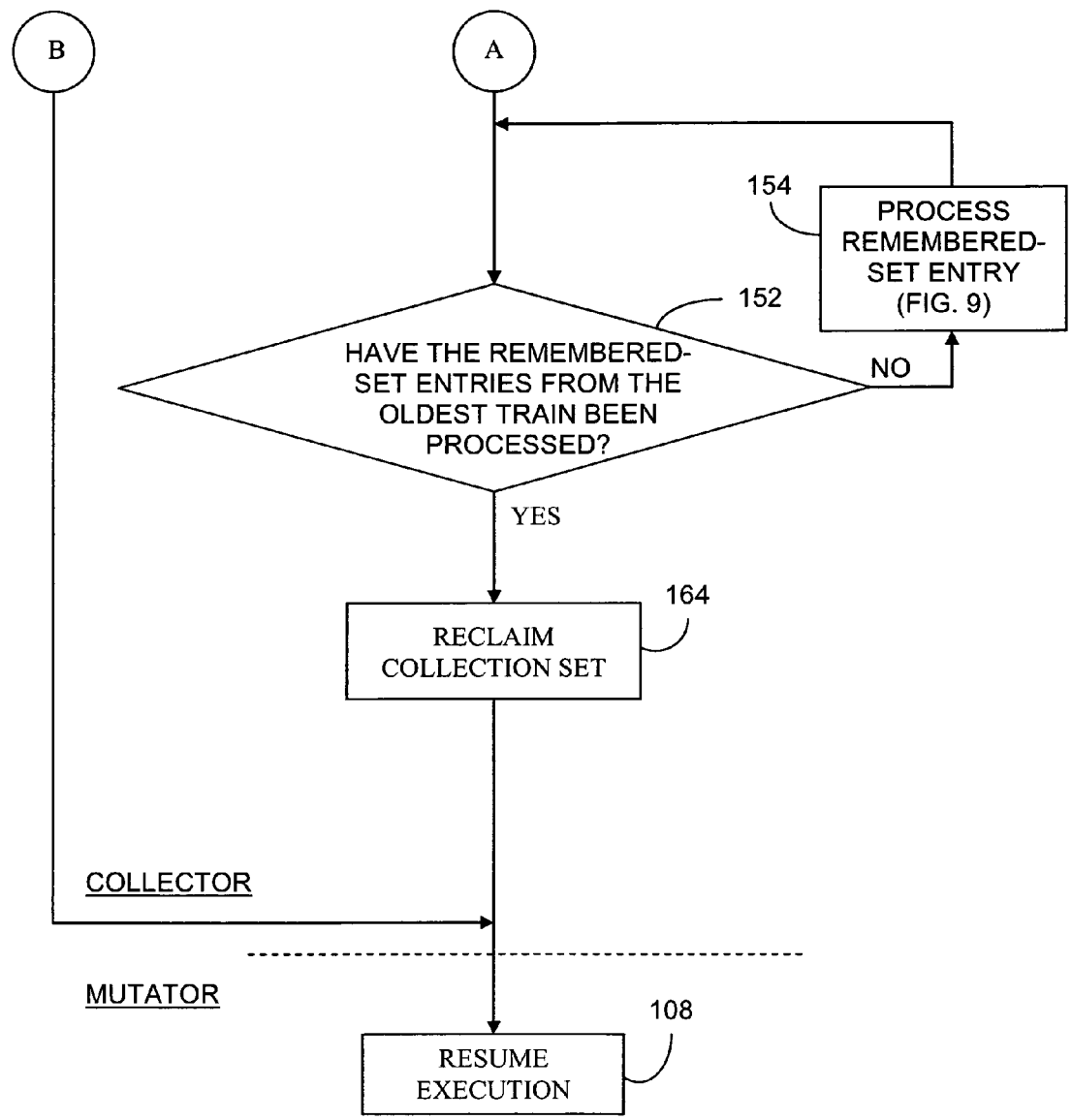

Blocks 172, 176, and 178 represent operations that correspond to those that FIG. 8's blocks 102, 106, and 108 do, and dashed line 174 represents the passage of control from the mutator to the collector, as FIG. 8's dashed line 104 does. For the sake of efficiency, though, the collection operation of FIG. 13 includes a step represented by block 180. In this step, the collector (1) reads the remembered set of each car in the collection set to determine the location of each reference into the collection set from a car outside of it, (2) places the address of each reference thereby found into a scratch-pad list associated with the train that contains that reference, and (3) places the scratch-pad lists in reverse-train order. As blocks 182 and 184 indicate, it then processes all scratch-pad lists but the one associated with the oldest train. After the discussion of the illustrated embodiment's overall operational sequence, we will return to the step of block 184, to which the present invention's teachings are applied.

Before the collector processes references in the oldest train's scratch-pad list, the collector evacuates any objects referred to from outside the old generation, as block 186 indicates. To identify such objects, the collector scans the root set. In some generational collectors, it may also have to scan other generations for references into the collection set. For the sake of example, though, we have assumed the particularly common scheme in which a generation's collection in a given interval is always preceded by complete collection of every (in this case, only one) younger generation in the same interval. If, in addition, the collector's promotion policy is to promote all surviving younger-generation objects into older generations, it is necessary only to scan older generations, of which there are none in the example; i.e., some embodiments may not require that the young generation be scanned in the block-186 operation.

For those that do, though, the scanning may actually involve inspecting each surviving object in the young generation, or the collector may expedite the process by using card-table entries. Regardless of which approach it uses, the collector immediately evacuates into another train any collection-set object to which it thereby finds an external reference. The typical policy is to place the evacuated object into the youngest such train. As before, the collector does not attempt to evacuate an object that has already been evacuated, and, when it does evacuate an object to a train, it evacuates to the same train each collection-set object to which a reference in the thus-evacuated object refers. In any case, the collector updates the reference to the evacuated object.

When the inter-generational references into the generation have thus been processed, the garbage collector determines whether there are any references into the oldest train from outside that train. If there are none, the entire train can be reclaimed, as blocks 188 and 190 indicate.

As block 192 indicates, the collector interval typically ends when a train has thus been collected. If the oldest train cannot be collected in this manner, though, the collector proceeds, as block 194 indicates, to evacuate any collection-set objects referred to by references whose locations the oldest train's scratch-pad list includes. It removes them to is younger cars in the oldest train, again updating references, avoiding duplicate evacuations, and evacuating any collection-set objects to which the evacuated objects refer. When this process has been completed, the collection set can be reclaimed, as block 198 indicates, since no remaining object is referred to from outside the collection set: any remaining collection-set object is unreachable. The collector then relinquishes control to the mutator.

Although the present invention is applicable to copying collection generally, the particular application to which it is employed in the illustrated embodiment is the scratch-pad-list processing that blocks 184 and 194 represent. The flow chart of FIG. 14 depicts an example routine for performing such processing in accordance with the present invention's teachings, and FIG. 15 depicts a collection set 210 whose remembered sets have been divided among scratch-pad lists, such as list 211 associated with a respective train 212.

Now, remembered-set entries may identify the exact locations where references to collection-set objects have been observed. But they may instead be identifiers of larger regions; i.e., without telling the exact locations of references to remembered-set objects, they may indicate that at least one reference to a collection-set object has been observed in each of the regions they represent. Even when the latter type of remembered-set entry is being used, the entries in the scratch-pad list can be of either type; in filling the scratch-pad lists, the collector may, for instance, scan large regions identified by respective remembered-set entries, find the exact locations, if any, that still contain references to collection-set objects, and place entries representing those exact locations into the scratch-pad lists.

For the sake of example, though, a scratch-pad entry such as entry 213 will be taken to designate a possibly multiple-reference region such as region 214 in one of the cars that belong to the train 212 with which the scratch-pad list 211 is associated. Also for the sake of example, the illustrated embodiment is arranged for use in a multi-thread environment in which, say, four threads T1, T2, T3, and T4 will perform evacuation work. In a manner presently to be described, that is, each will process scratch-pad entries to identify collection-set objects, such as object 215, that are referred to by external references such as reference 216 in train 212, and each will copy those objects to further cars, such as cars 212.2 and 212.3, that belong to train 212.

Figure 14:
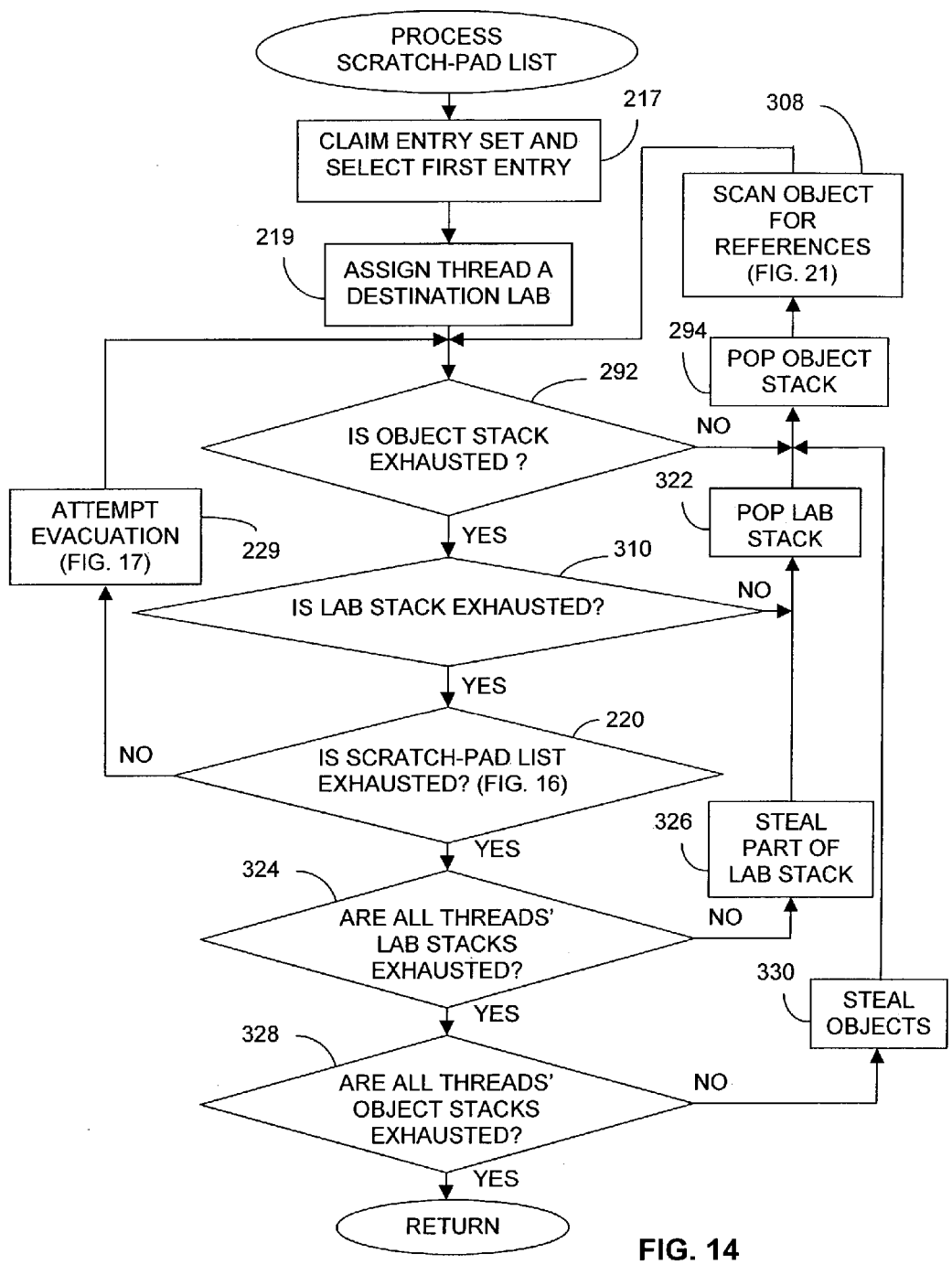
FIG. 14 is a flow chart of a routine for employing the present invention's teachings to process scratch-pad-list entries.
Figure 15:
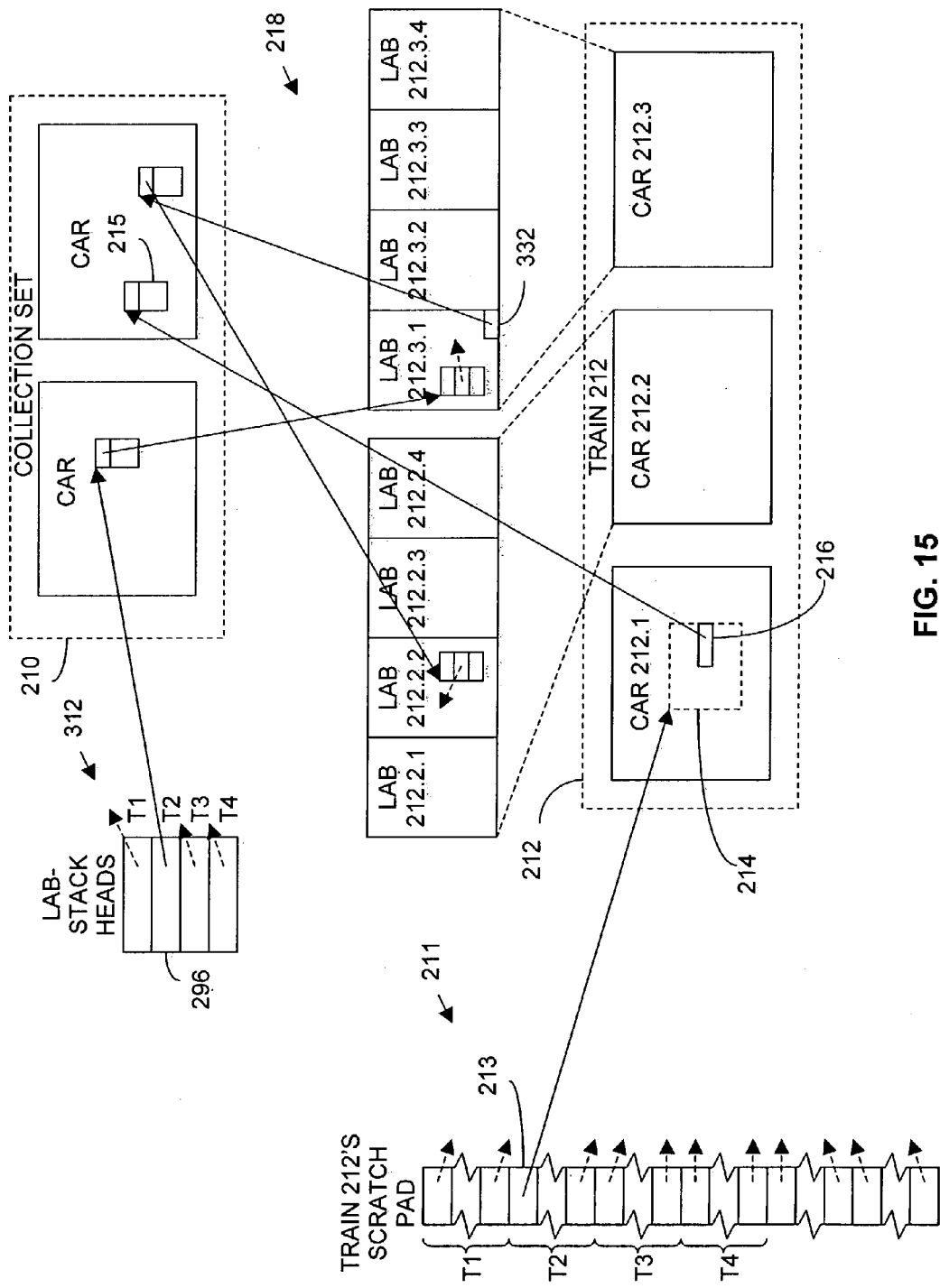
FIG. 15 is a block diagram that illustrates a portion of the memory organization employed by that routine.

As FIG. 14's block 217 indicates, each thread is initially assigned a set of the entries in FIG. 15's scratch-pad list 211. Further entry sets may initially remain unassigned so that threads that finish processing their initial entry sets before others do can have more entries on which to work. To facilitate cooperation among threads, the cars such as cars 212.2 and 212.3 to which the threads will be evacuated are divided into smaller segments referred to here as local-allocation buffers ("LABs") 218. I prefer to align LAB boundaries with those of cache lines or virtual-memory pages, since that tends to enhance performance. Threads will claim respective LABs for their exclusive use, and a LAB thus claimed will receive only objects evacuated by the thread that has claimed it.

As FIG. 14's block 219 indicates, another initial operation that a thread performs when it is processing a train's scratch-pad list is to claim one of the train's LABs as that thread's initial destination LAB, i.e., as the portion of memory into which it will copy the first objects that it evacuates. With the destination LAB thus assigned, the collector thread reaches a test represented by FIG. 14's block 220 after performing a number of steps, to be described below, in which it determines whether it may need to evacuate descendants, i.e., collection-set objects transitively reachable through references in objects that the thread has already evacuated. Initially, of course, there are no descendants; the thread has not yet performed an evacuation.

Figure 16:
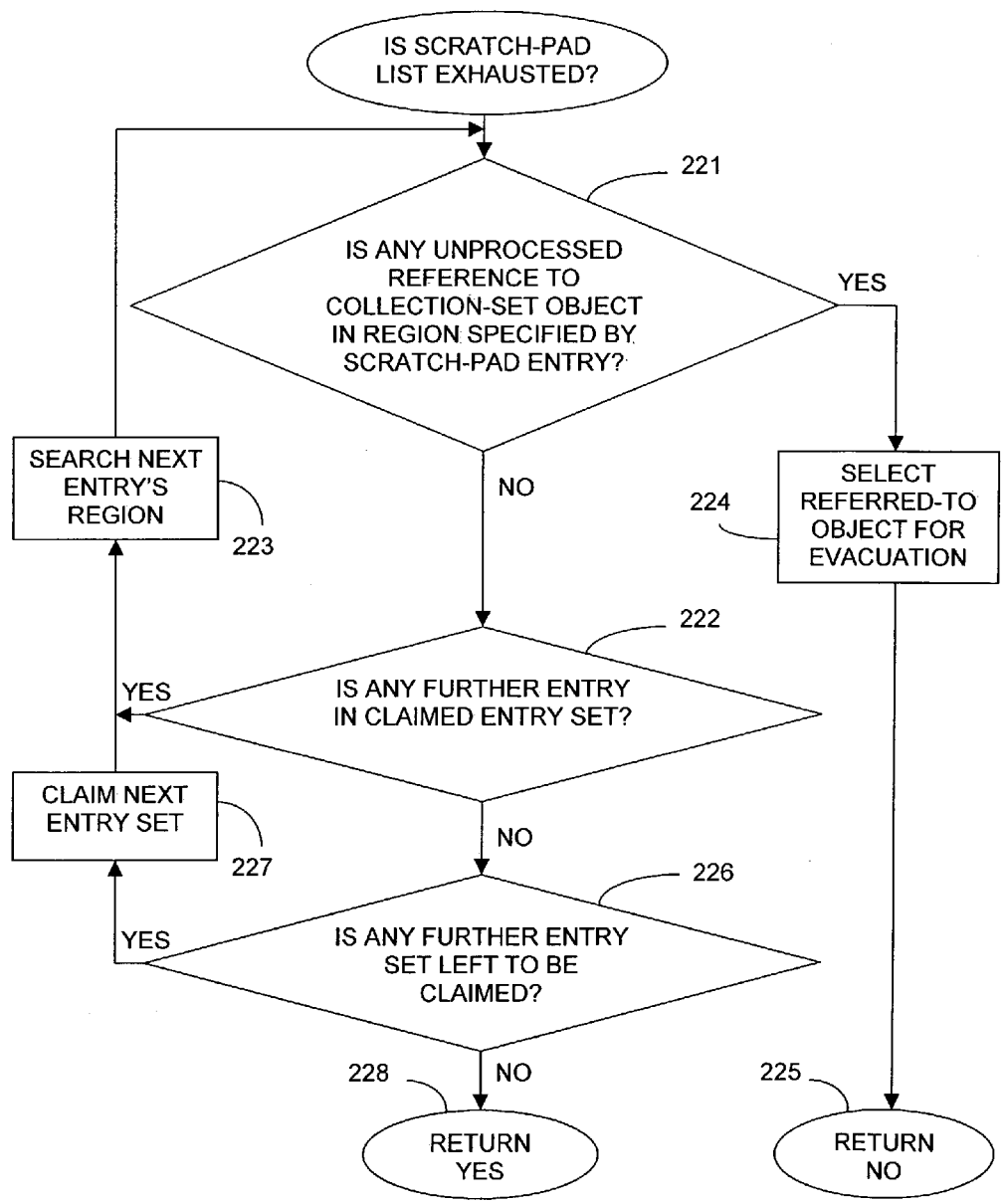
FIG. 16 is a flowchart illustrating a routine for determining whether the scratch-pad list has been exhausted.

The test of block 220 determines whether there are any further entries in the scratch-pad list. FIG. 16 depicts this test in more detail. As FIG. 16's block 221 indicates, the collector thread determines whether any references to collection-set objects remain in the region specified by the entry currently being processed. If the thread is just beginning the operation, no entry is being processed yet, so this test produces a negative result. As blocks 222 and 223 indicate, the thread therefore determines whether there are any entries in the entry set that it has claimed, and, if so, selects the next (in this case, first) entry. If the region thereby identified does have a reference to a collection-set object, the thread chooses that collection-set object for evacuation, as block 224 indicates, and, as block 225 indicates, the result of FIG. 14's block-220 test is negative: the scratch-pad list has not been exhausted. If FIG. 16's block-222 test instead determines that no further entries remain in the entry set assigned to the thread, the thread determines whether any further sets remain, as block 226 indicates. If any does, it selects one, as block 227 indicates. As block 228 indicates, though, the FIG. 16 routine—and therefore FIG. 14's block-220 test—produce an affirmative result when no entry sets remain to be claimed.

Figure 17:
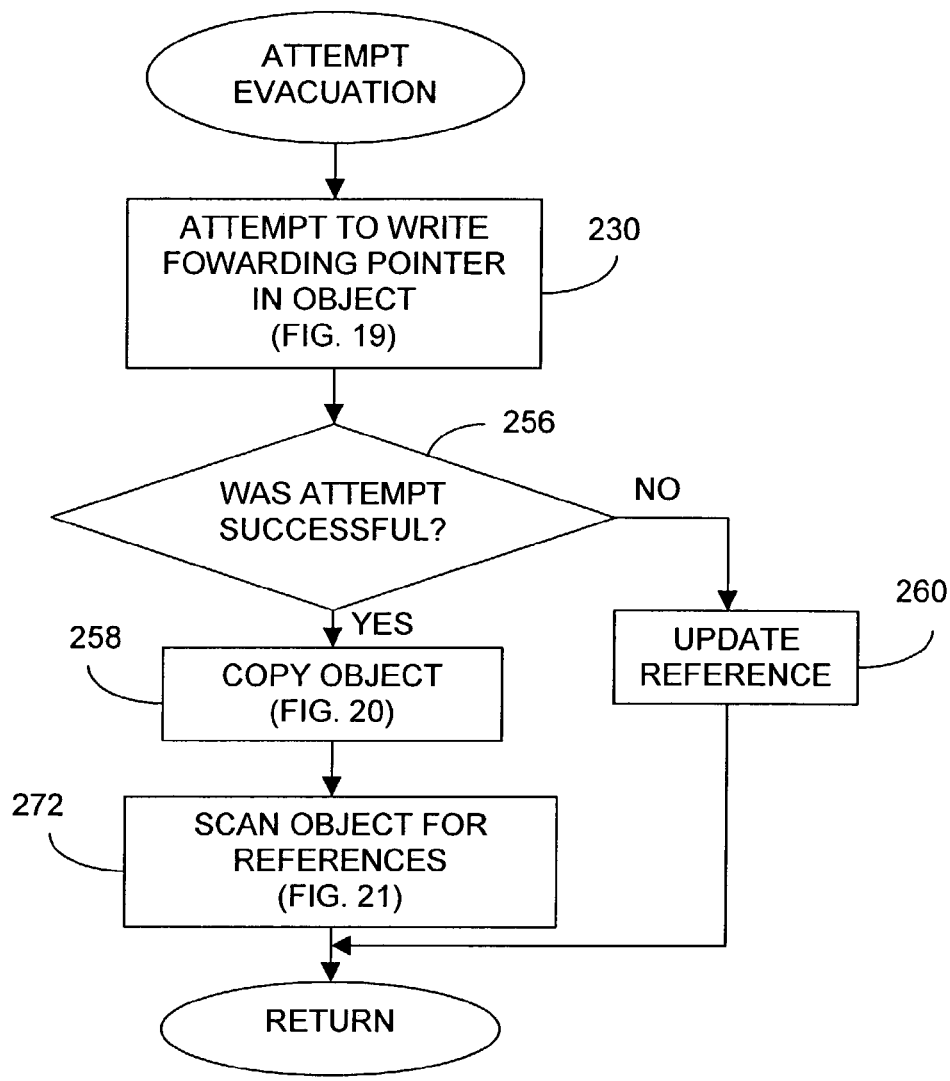
FIG. 17 is a flowchart illustrating a routine for attempting to evacuate an object from the collection set.

If the result of FIG. 14's block-220 test is initially negative, i.e., if the thread has found a collection-set object referred to by a reference whose location a scratch-pad-list entry identifies, the thread attempts to evacuate that object, as FIG. 14's block 229 indicates. FIG. 17 depicts the evacuation-attempt operation in more detail. As block 230 indicates, that operation begins with an attempt to write a forwarding pointer into the object.

Figure 18:
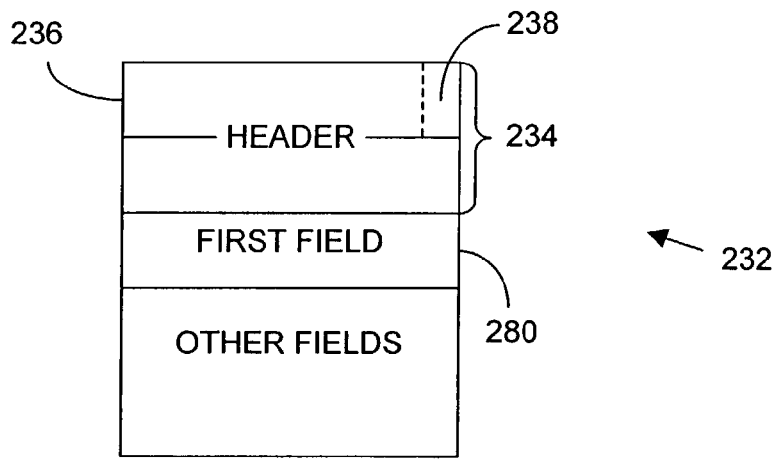
FIG. 18 is a block diagram that illustrates memory space occupied by a typical object.

The way in which the collector attempts this will depend on the particular object format that the mutator employs, but the format set forth in FIG. 18 is typical. The memory space 232 allocated to the object begins with a header 234, and the header's first word 236 contains an identifier of the class of which the object is an instance. That identifier may take the form of a pointer to a data structure associated with that class.

In the illustrated embodiment, field 236 is also the field in which the collector attempts to place the forwarding pointer, which specifies the location to which the object is being evacuated. But a collector thread should place a forwarding pointer in the objects only if that thread or another thread has not already evacuated the object. The thread therefore needs to know whether field 236's contents are the class pointer or instead, because the object has already been evacuated, a forwarding pointer.

To distinguish between the two, the collector relies on the fact that objects, including the data structure to which the object's class identifier points, are so aligned that the least-significant bit or bits of their addresses are zeros, as are the locations to which the collector evacuates objects. Since the collector already knows that their addresses' least-significant bits are zeros, it does not have to rely on those bits in field 236 to find the intended location. So it can instead interpret them as an indication of whether the field's contents are a class pointer or a forwarding pointer. Specifically, a thread that is writing a forwarding pointer gives a non-zero value to that least-significant bit or bits to distinguish the forwarding pointer from the class identifier. For the sake of simplicity, we will assume that it is the least-significant bit 238 this is thus used as an evacuation flag.

Figure 19:
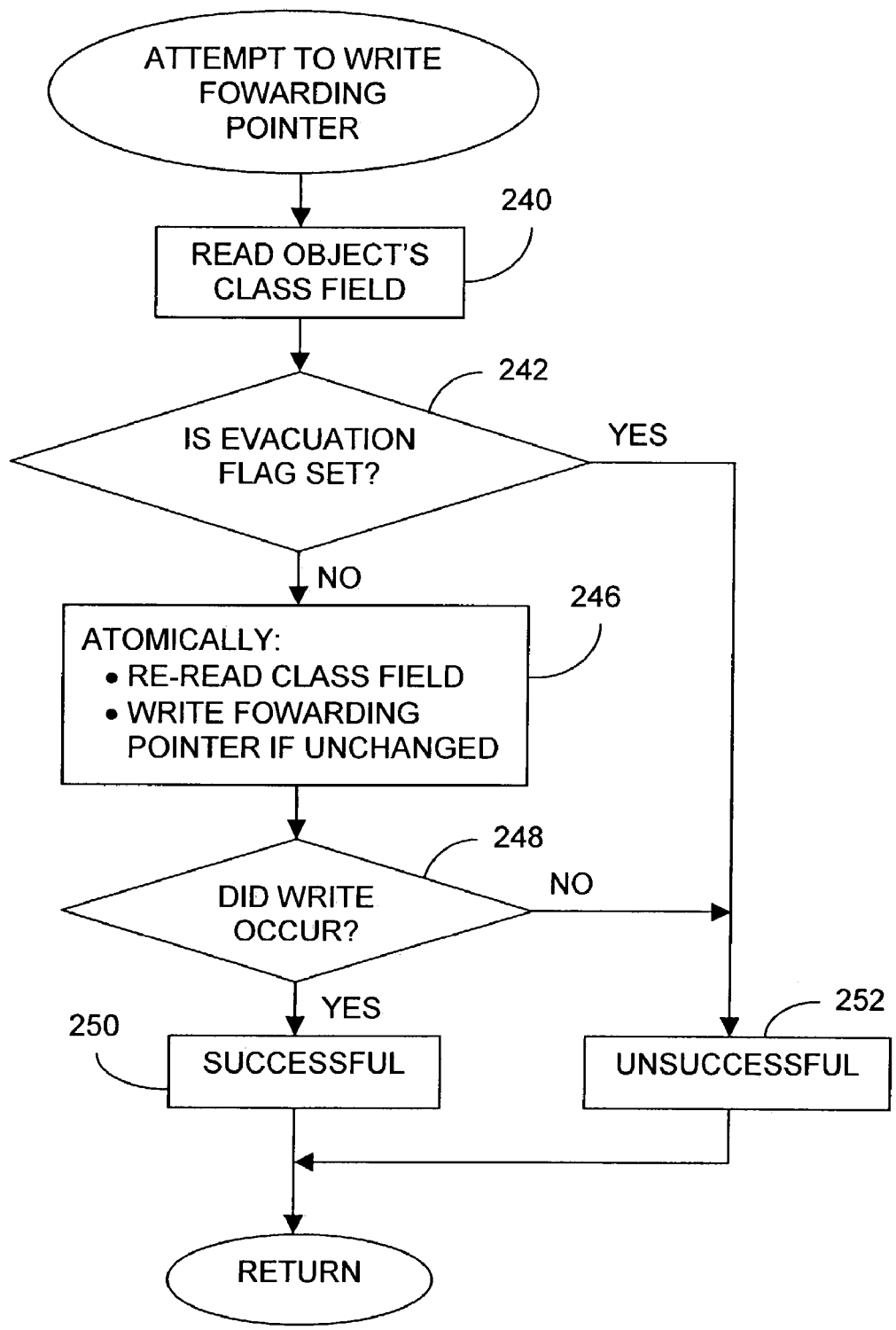
FIG. 19 is a flowchart that illustrates a routine for writing a forwarding pointer into the portion of collection-set space that has been evacuated by an object.

As FIG. 19's block 240 indicates, therefore, the collector thread's first step in attempting to write a forwarding pointer is to read the object's class field. It then tests the evacuation flag, as block 242 indicates. If the evacuation flag has not been set, the collector thread performs an operation, represented by block 246, whose purpose is to place into the object's class field (field 236 in FIG. 18) a forwarding pointer with a set evacuation flag.

Between the steps represented by FIG. 19's blocks 240 and 246, though, another thread could have written a forwarding pointer in the object to claim it for processing. To avoid claiming an object already claimed by another collector thread, the thread therefore performs block 246's pointer-installation operation as an atomic compare-and-swap operation. That is, it atomically (1) reads field 236 again, (2) compares that field's contents with those that it read in the block-240 step, and (3) writes the forwarding pointer into that field only if the two read operations' results were the same. As blocks 248, 250, and 252 indicate, the FIG. 19 forwarding-pointer-installation attempt will be considered successful only if the read operations' results were the same and the thread therefore placed a forwarding pointer into the object's first field.

The forwarding pointer specifies an unoccupied location in the LAB that the thread currently is using as its destination LAB. As FIG. 17's blocks 256 and 258 indicate, the collector copies the object into its destination LAB only if the attempt to place a forwarding pointer into the object's collection-set location was successful. Otherwise, as block 260 indicates, it uses the forwarding pointer that was already in that location to update the reference that triggered the evacuation attempt.

Figure 20:
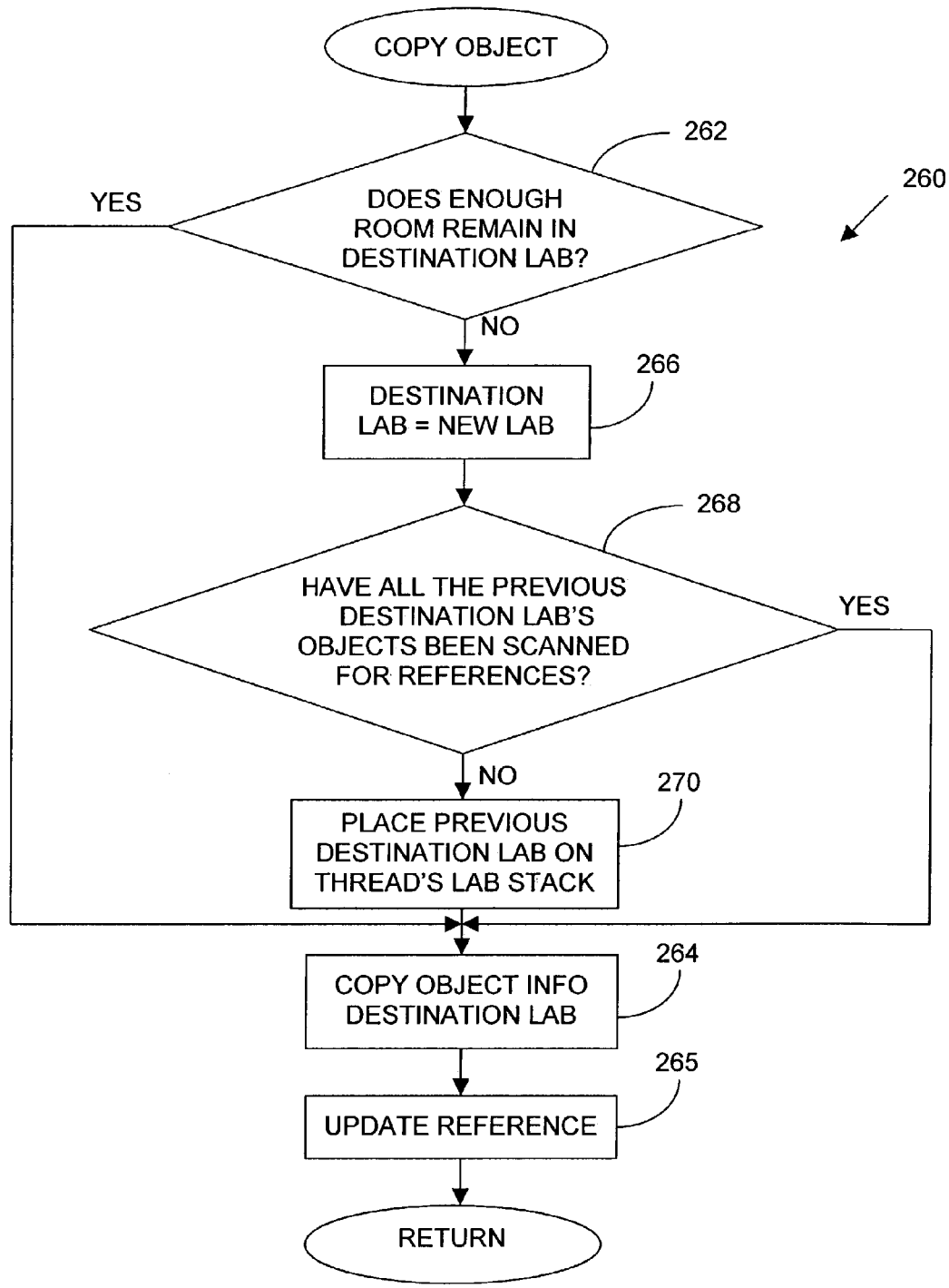
FIG. 20 is a flowchart that illustrates a routine for copying an object from the collection set to another car in the generation.

FIG. 20 sets forth in more detail the object-copying operation that FIG. 17's block 258 represents. Ordinarily, enough room remains in the thread's destination LAB for the object to be copied into it. As blocks 262, 264, and 265 indicate, the object is simply copied in that case, and the reference is updated to point to the new object location. If not enough room remains, though, the thread allocates another LAB (or, in the case of an exceptionally large object, a plurality of contiguous LABs) in a car that belongs to the same train. Block 266 represents allocating the new LAB and adopting it as the destination LAB, into which the object is copied.

In some embodiments, such as the one illustrated, the allocation and copying are accompanied by steps that facilitate other threads' "stealing" one or more whole LABs that still have any objects that have not been completely processed. Specifically, a thread in the illustrated embodiment may place the previous destination LAB on a stack of LABs available for stealing. To decide whether to do so, the collector thread determines, in a manner that will be described presently, whether all of the previous destination LAB's objects have been scanned for references. Block 268 represents making that determination. If not all of the LAB's objects have been completely scanned, the thread places the LAB on a last-in, first-out stack associated with that thread, as block 270 indicates. Exemplary mechanisms for implementing that stack will be described in due course.

With the object now copied into the destination LAB, the collector thread scans it for references, as FIG. 17's block 272 indicates. The object-scanning operation that block 272 represents is depicted in more detail in FIG. 21, in which block 274 represents determining whether the object contains any unscanned references. The locations of any references within an object are typically identified by consulting a reference map reachable through the class pointer in the object's header. The reference is considered "unscanned" if it refers to a collection-set object that has not been evacuated. As FIG. 21 indicates, the collector has no reference-scanning work to do if the object contains no unscanned references.

If it does contain an unscanned reference, the collector thread will need to process that reference. In doing so, it may find a further collection-set object that needs to be scanned. The collector is performing a depth-first search, so that descendant object will be scanned for references before any further references in the current object are scanned. The thread will therefore need to remember to come back to the current object if it has more than one unscanned reference. As blocks 276 and 278 indicate, the collector therefore determines whether the object contains more than one reference. If it does, the collector pushes the object onto a stack of objects that may have unscanned references.

Because of this need to remember all of the objects that need to be revisited, depth-first searches can be memory-intensive. But the technique employed by the illustrated embodiment avoids that drawback. It does so by taking advantage of the collection-set space from which the object was evacuated. Specifically, it adds the location from which the object was evacuated to a linked list of locations from which it has evacuated other objects that similarly need to be revisited.

The mechanism for doing this can be appreciated by referring back to FIG. 18. In addition to its header 234, an evacuated object that the collector has left only incompletely scanned has at least two further, reference-sized fields; if there had not been at least two references, the collector would have scanned it completely, and there would have been no need to push the object onto the unscanned-object stack. The collector employs one of these fields—say, the first non-header field 280—to contain a pointer to the location from which the object previously pushed onto the stack was evacuated. That pointer's address may specify the address of the previously evacuated space's field corresponding to field 236 or field 280, for example. So pushing onto the unscanned-object stack the object that previously occupied memory space 232 involves reading a pointer from a list-head location associated with the thread, placing it into the next-object field 280, and placing into the list head a pointer to space 232.

The operation of writing the next-object pointer may be implemented as an atomic compare-and-swap operation; as will be described below, some embodiments may permit other threads to steal from the object stack in such a manner as to necessitate this. As will become apparent, though, this will not be necessary in most implementations.

Figure 21:
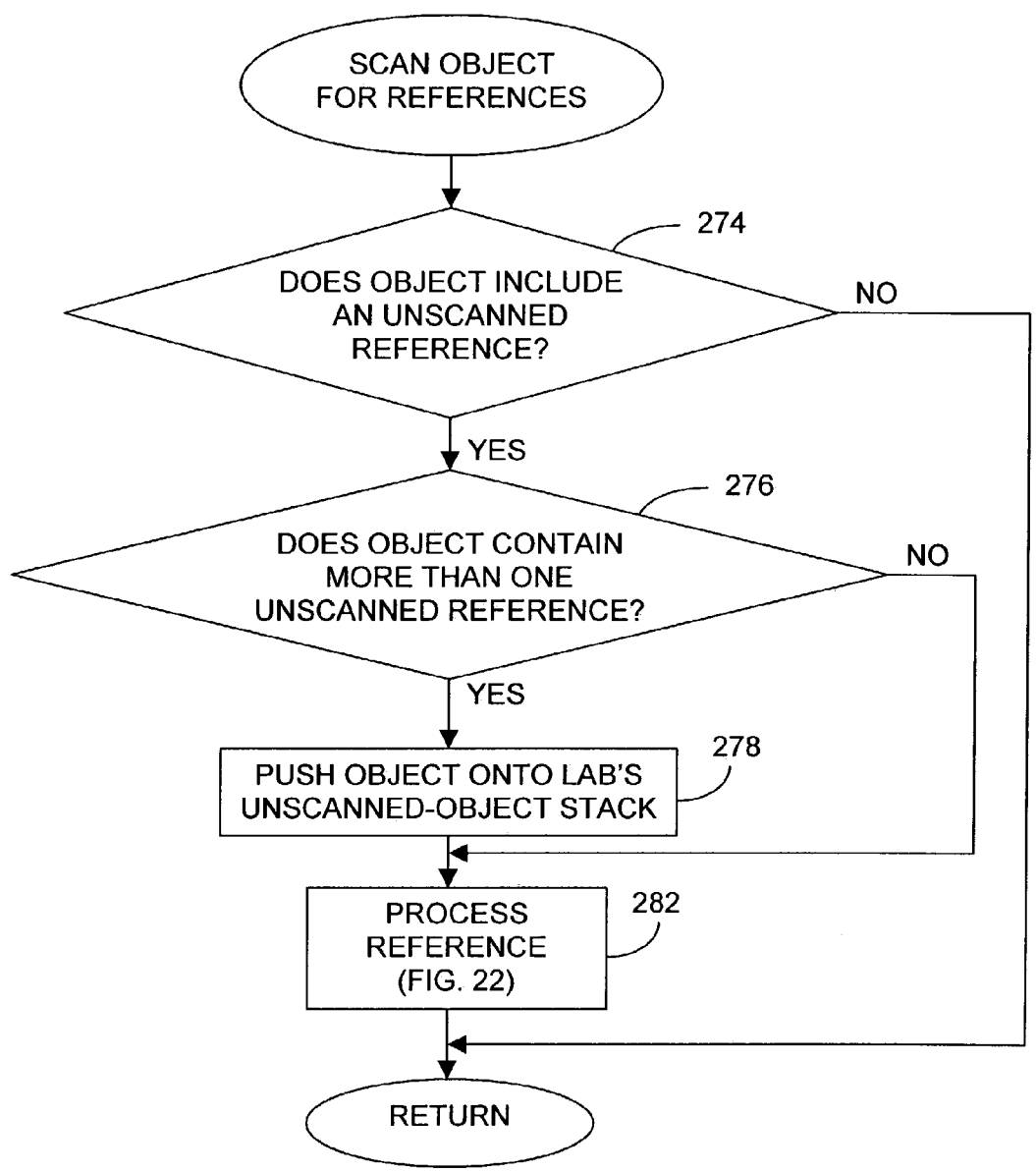
FIG. 21 is a routine employed to scan an object for references.
Figure 22:
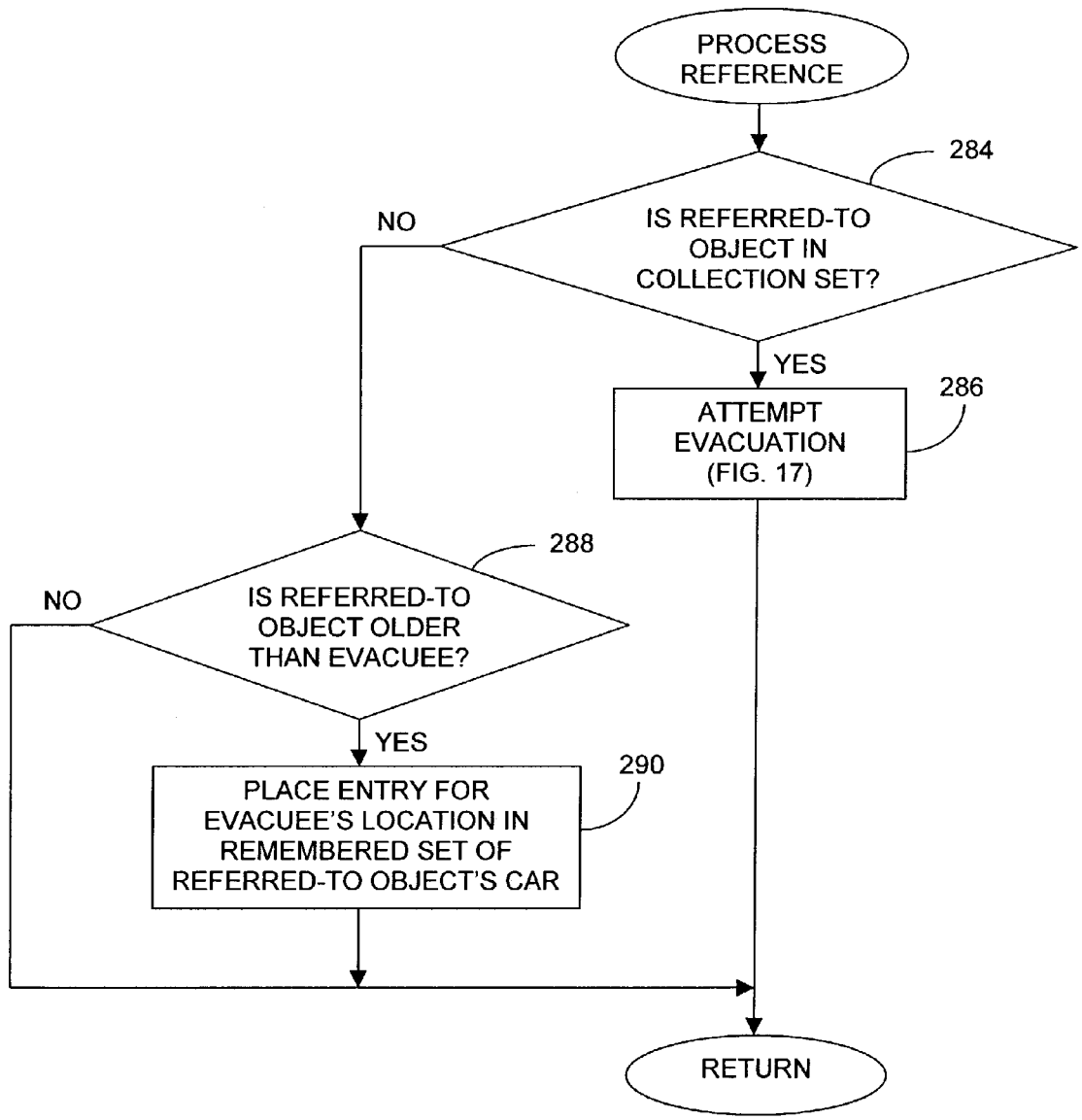
FIG. 22 is a flowchart of a reference-processing routine.

With the object pushed onto the unscanned-object stack, the collector thread proceeds to the step represented by FIG. 21's block 282, in which it performs a reference-processing operation depicted in FIG. 22. As that drawing's block 284 indicates, the collector thread first determines whether the object referred to by the reference is in the collection set. If it is, the collector attempts its evacuation in the above-described manner, as block 286 indicates.

If it is not, then it does not need to be evacuated. But the reference is itself in an evacuated object, and the evacuation may have made the evacuated object "younger" than the object to which the reference refers. If it was previously "older," the remembered set of the referred-to object's car may not have an entry specifying that reference's location. In such a situation, the collector makes an appropriate remembered-set update, as blocks 286 and 288 indicate.

Once FIG. 22's reference-processing operation has been completed, so has FIG. 21's operation of scanning the object for references, and so has the evacuation-attempt operation of FIG. 17, which FIG. 14's block 229 represents. From the above-described recursive nature of FIG. 17's evacuation-attempt mechanism, it will be apparent that a single execution of FIG. 14's step 229 can potentially result not only in evacuation of a plurality collection-set objects but also in a list of evacuated collection-set objects whose references remain to be processed. So, before the collector thread returns to the scratch-pad list to find a further entry to process, it checks to see whether any such unprocessed references remain in the objects already evacuated.

As FIG. 14's block 292 indicates, the thread checks its unscanned-object list head to determine whether the object stack has been exhausted. A valid pointer indicates that it has not, while, say, a NULL value indicates that it has. If that stack has not been exhausted, the thread pops it, as block 294 indicates.

Figure 23:
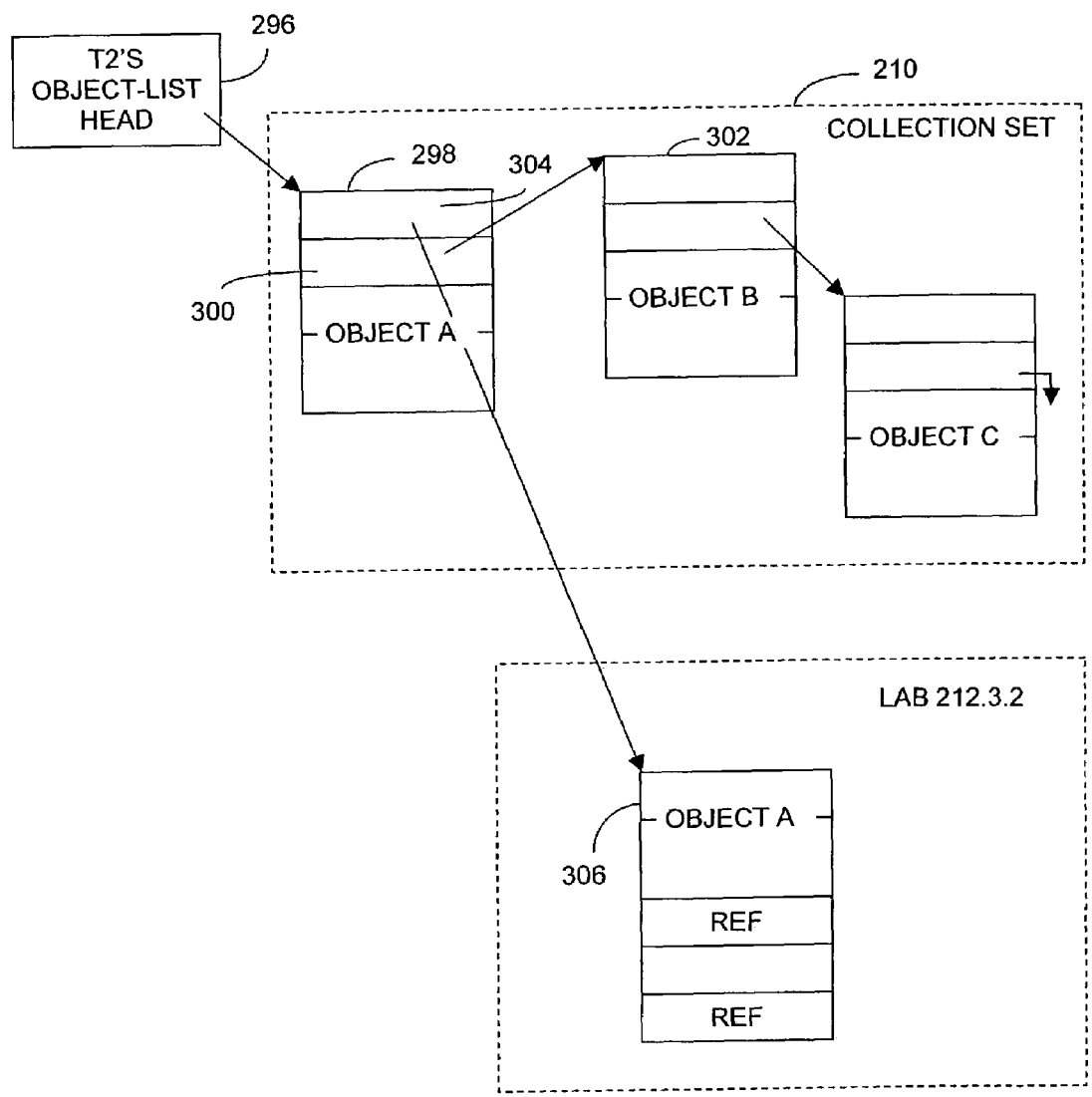
FIG. 23 is a memory-space diagram that illustrates the placement of links in collection-set locations from which objects containing unprocessed references have been evacuated.

The popping operation can be understood by reference to FIG. 23. Thread T2's object-list head 296 points to a region 298 in the collection set from which the top object on the stack was evacuated to LAB 212.3.2. The collector thread reads the value in that region's field 300, which points to a region 302 representing the next object on the stack, and it places that value in the list head 296 so that it now points to region 302 rather than to region 298. The stealing techniques used by some embodiments will make it necessary for this list-head writing to be performed by an atomic compare-and-swap operation, but ordinary write operations will be adequate in most embodiments.

The collector then reads the popped object's forwarding pointer 304 to find the location 306 in LAB 212.3.2 to which the object was copied, and it processes that object's unprocessed references in the manner described above. Since only objects that have at least two references can be placed on the stack, the collection-set region 298 from which the object was evacuated will have enough room not only for a forwarding pointer and a next-object pointer to be used for maintaining the stack but also (as the drawings do not show) for an index to indicate which of the evacuated object's references is the next to be processed. To this end, the reference-processing operation depicted in FIG. 22 can additionally include an index-updating step before the block-284 step. More typically, though, the way in which the thread determines whether a reference has been processed will be to determine whether the object to which it points is in the collection set and contains an evacuation flag.

Having located the evacuated object, the collector thread proceeds to scan its references, as FIG. 14's block 308 indicates. As can be appreciated from FIG. 21, the object-scanning operation represented by FIG. 14's block 308 is also recursive and may result in evacuation of a number of objects, some of which may be added to the thread's object stack. Eventually, though, that step is completed, and the collector thread returns to block 292's determination of whether any objects remain on the current LAB's unscanned-object stack. At some point, the result of that test will be that no further objects remain on the object stack, so the collector thread proceeds to the step represented by block 310. In that step it determines whether any LABs remain on the LAB stack used by the thread to keep track of which LABs contain evacuated objects that have not yet been processed.

Figure 24:
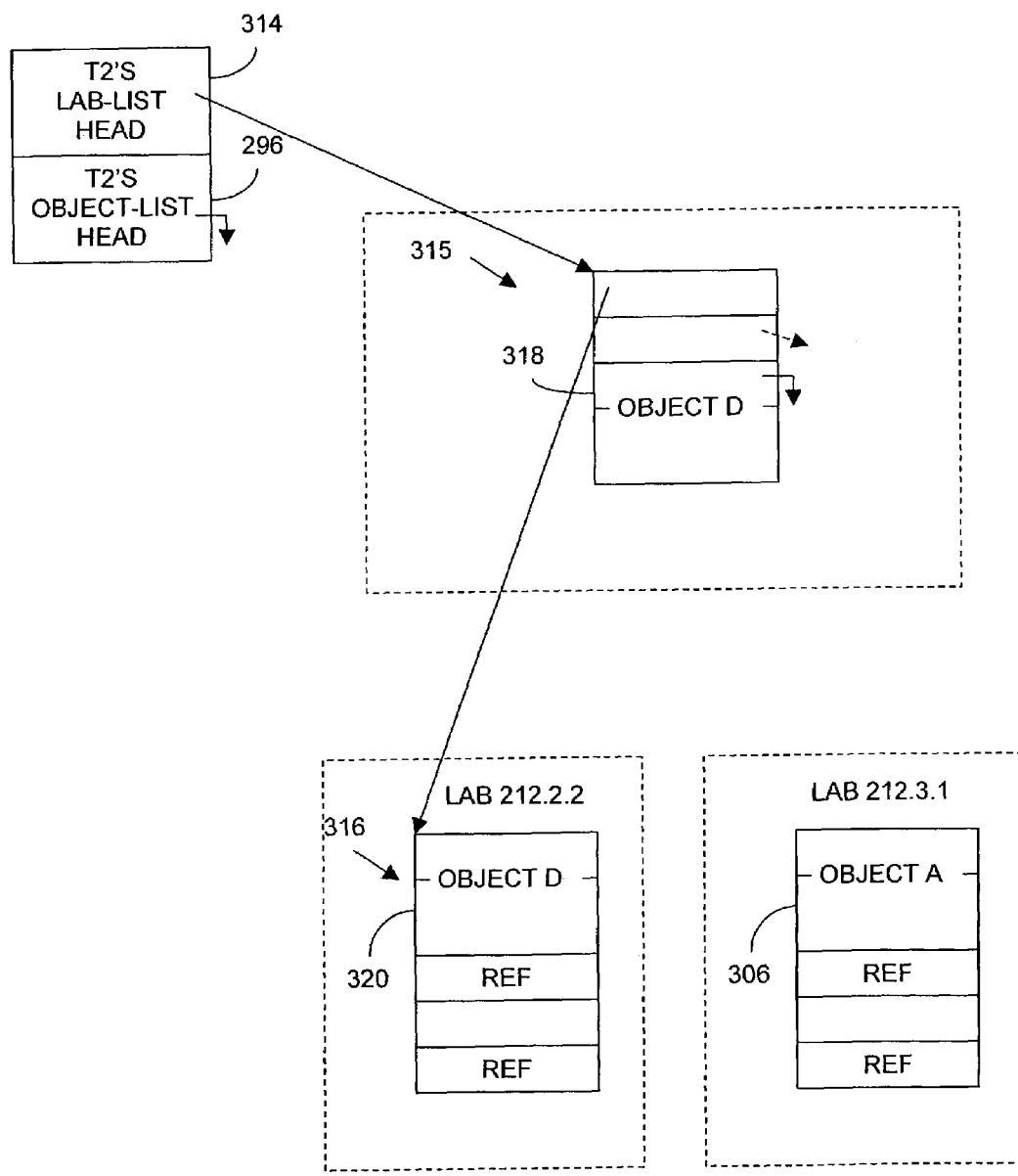
FIG. 24 is a memory-space diagram that illustrates one type of LAB-list linking employed by one embodiment of the invention.

Among the ways in which a LAB stack can be popped is one that can be appreciated by reference to FIG. 24. The LAB-list head represented by that drawing's block 314 identifies LAB 212.2.2 as thread T2's top LAB-stack entry by pointing to a location 315 from which an object 316 in that LAB was evacuated. That object is the top object in an unscanned-object stack associated with LAB 212.2.2. In the step represented by FIG. 20's block 270, the thread pushed that LAB onto the stack by (1) placing the contents of the thread's LAB-list head 314 into a next-LAB field 318 of the evacuated-object space 315 to which the thread's object-list head pointed, (2) placing the object-list head 296's contents into the LAB-list head 314 and thereby placing the LAB now containing the top object-list object 316 onto the top of the LAB list, and (3) placing a NULL value in the object-list head 296 to indicate that the thread has not yet placed into the unscanned-object list any objects that the new LAB contains. We assume that no previous LAB had already been in the LAB list and that the value that ended up in the evacuated region 315's next-LAB field 318 was therefore NULL.

Note that this approach to pushing a LAB onto the list additionally has the effect of dividing the thread's linked list of objects into sublists associated with respective LABs. The next-LAB field of one object in each sublist (in the illustrated embodiment, the last object added to that sublist) links that object to the corresponding object in the sublist associated with the next LAB list. Note also that the illustrated embodiment's placement of a NULL value into the object-list head each time a new sublist is started will have the effect of marking the end of that sublist.

To pop LAB 212.2.2 from the LAB stack, the thread first adopts that LAB's unscanned-object list as its own by placing its LAB-list head 314's contents into its object-list head 296. The actual popping is then done by placing the next-LAB field 318's contents into the thread's LAB-list head 314. Again, atomic operations will be needed for pushing and popping in embodiments that permit certain types of stealing, but, as will be seen, stealing can be implemented without necessitating such operations.

In FIG. 14, block 322 represents this operation of popping the LAB stack, which is followed, as block 294 indicates, by popping the object stack that the thread has thereby acquired.

This popping of LAB-stack items and resultant object-stack items continues until the thread exhausts both its object stack and its LAB stack, at which point the resultant affirmative outcome of the block-310 test returns the thread to processing a further scratch-pad-list entry. Ultimately, though, the scratch-pad list is exhausted, too: the block-220 test's outcome is affirmative.

But the fact that no entries remain in the train's scratch-pad list does not necessarily mean that all of that train's references into the collection set have been processed; other threads may still be working and, indeed, may have piled up large LAB stacks. It will therefore be beneficial if a collector thread that has finished its own work can take on is some of the other threads' work. It is to facilitate such an operation that the illustrated embodiment has broken a thread's object stack into LAB-based groups.

As FIG. 14's block 324 indicates, a thread that has run out of its own work checks the other threads' LAB stacks for LABs to "steal" as reference sources. For the sake of example, we will assume that the approach normally taken is for the stealing thread to steal the entire LAB stack. Although this approach may not initially appear workable, it actually is in many cases; a thread that has amassed a large list of work tends to be producing many further tasks for itself. In any event, an approach that a stealing thread may take for this purpose is to employ an atomic-swap operation to place a NULL value in the owner thread's LAB-list head and place the atomic swap operation's results in its own LAB-list head. (It is when the collector implements such whole-stack stealing that the owner needs atomic operations for pushing and popping.)

Instead of stealing the entire LAB list, a stealer may instead steal, say, only a single LAB. Another approach is to steal only the LAB stack's terminal part that begins some predetermined number of LABs into the LAB stack. Also, although this will not be typical, the stealers in some embodiments may steal only a portion of the objects in a single LAB in the LAB stack.

If an initial attempt at stealing from one thread is unsuccessful, the thread attempting to steal will typically try to steal from other threads. This will continue until the thread attempting to steal is successful or determines that no more LABs remain. The particular way in which a thread determines whether any LABs are available for stealing is not critical. One possible approach is to employ a common activity counter, which all of the threads increment and decrement. The counter's initial count equals the number of threads. This means that all threads are occupied. When a thread reaches a point at which it will attempt to steal, it decrements the counter, and it increments the counter when it finds a "victim" thread, one that apparently has tasks to be stolen. If an attempted steal from that victim is unsuccessful, or if the thread otherwise needs to steal again, it decrements the counter. This continues until the counter reaches zero; a counter value of zero means that all threads are trying to steal but have found no potential victims. At that point, the threads conclude that the current parallel operation is over.

Such an approach is simple, but it does not lend itself to use in embodiments in which the threads are executed in parallel by different processors implementing a collector that is operating concurrently with the mutator. In such embodiments, a thread that has failed in an attempt to steal may, for example, register itself with another thread and thereby ask that the other thread signal it when the other thread places a LAB on its LAB list. After thus registering, the stealing thread would suspend itself. If the suspended thread does not get signaled in some predetermined amount of time, say, it may conclude that no more LABs are left to be processed.

Other criteria for concluding that all threads' LAB stacks are exhausted may be used instead. Independently of what criteria the thread uses, it may in some embodiments simply end processing when it reaches such a conclusion. In the illustrated embodiment, though, the thread instead attempts to steal from the other threads' unscanned-object lists, as blocks 328 and 330 indicate. Although in some embodiments a stealer thread may attempt to steal the entire list, such attempts will not be made in most embodiments. Instead, the stealer will attempt to steal only the list's terminal part that begins some pre-determined number of objects into the list. If stealing is thus limited, the owner thread can perform its stack-pushing operation without using an atomic operation.

Although stealing has been described so far as directed to the stack entries, this is not the only possible approach. If stealing is instead restricted to references in stack entries, i.e., if the stack entries themselves cannot be stolen, the owner will not need atomic operations for either pushing or popping. A stealing thread would simply attempt to claim an object referred to by a reference in one of the stack entries, and, if the referred-to object is already evacuated, proceed to other references in the same or another stack object.

It is apparent from the description so far that the memory cost of keeping track of unscanned objects is negligible: in the example described above the collection-set space itself supports maintenance of all the required lists. But the present invention can be employed to keep that cost low even if the collector does not use that space for all lists. Since—at least in the case of embodiments that use the per-train scratch-pad lists—there will be relatively few LAB-list entries at any one time, those lists can be supported in separate memory structures without the collector's suffering a significant memory cost.

Also, although the examples given so far maximize memory-space savings by writing over an object's reference or other data, the range of this technique's application is not so limited. Particularly in systems intended for concurrent collection, the object format may be so designed as to have separate fields that are dedicated to maintaining the collector's next-unscanned-object and/or next-unscanned-LAB lists; that is, such fields would not be used for references or other object data, so writing them would not obliterate any normal object contents. Another approach, which might recommend itself in the context of a concurrent collector, at least if it performs collection incrementally, is to allocate a memory region proportional in size to the collection set and write the next-object and/or next-LAB pointers in corresponding locations in that region so that the concurrently operating mutator can read intact object fields from the collection set.

It should also be noted that stealing by means of from-space-supported memory lists can be implemented without maintaining more than one list level. That is, FIG. 20's object-copying operation could be performed without the steps of blocks 268 and 270, and the steps represented by FIG. 14's blocks 310, 322, 324, and 326 could be eliminated.

Another approach is to maintain separate list levels but implement the LAB-stack maintenance in a different way. For example, space in each to-space LAB can be used to maintain a next-LAB pointer for the LAB stack. Preferably, the next-LAB pointer would identify the location in the collection set from which the first object in the next LAB's object stack was evacuated, as FIG. 15's pointer 332 illustrates. Although this approach does require room in the LAB, the amount of space required is negligible in comparison with the LAB's total size, and, in any event, the locations used for such pointers can be reclaimed for object storage as soon as the LAB is popped from the LAB stack.

Also, although most implementations will employ a stack-type organization as described above to maintain the list of work to be done, that organization is not necessary; the space from which objects were evacuated can be used to implement other topologies, such as a balanced tree. Each object whose references had not been completely scanned would be a node on the tree, and objects that are not leaf nodes could have two descendant nodes: one field of the evacuated space could identify the "left" node and another the "right" node. Of course, the feasibility of this approach will depend on the particular system's object format and on the other uses to which the evacuated space is put. In principle, though, that topology as well as others, such as the trie topology can be employed.

So the present invention can be implemented in a wide-range of embodiments. It therefore constitutes a significant advance in the art.

What is claimed is:

1. A computer-implemented method operating in the memory of a computer system, for executing in a plurality of execution threads a copying garbage collector that collects by evacuating to a to-space from a from-space at least any objects in the from-space that are reachable from the to-space and reclaiming the from-space for re-use, a method comprising:
   A) maintaining for each thread at least one linked list, associated with that thread, of evacuated objects containing references to potentially unevacuated objects by writing, in locations in the from-space from which that thread has evacuated objects that contained such references, links to other such locations;
   B) for each thread, processing objects in the list associated therewith by:
      i) scanning those objects for references to objects in the from-space that have not been evacuated;
      ii) if such a reference exists in an object in that list, evacuating the object to which that reference refers; and
      iii) if no such reference exists in a given object in that list, removing the given object from that list; and
   C) employing at least one of the threads to:
      i) scan for references to objects in the from-space that have not been evacuated at least one object in the list associated with another of the threads; and
      ii) if such a reference exists, evacuating the object to which that reference refers.

2. A method as defined in claim 1 wherein each thread processes in a last-in, first-out order the objects in the list associated therewith.

3. A method as defined in claim 2 further including employing at least one of the threads to remove at least one object from the list associated with another of the threads and process the object thereby transferred.

4. A method as defined in claim 1 wherein:
   A) the to-space is divided into local-allocation buffers;
   B) each of the threads claims for itself a sequence at least one of the local-allocation buffers and places objects that it evacuates in the local-allocation buffer which that thread has claimed most recently;
   C) at least one of the threads maintains a LAB list consisting of at least one local-allocation buffer that was claimed thereby before the local-allocation buffer claimed thereby most recently and contains at least one object in the linked list associated therewith; and
   D) at least one thread removes at least one local-allocation buffer from another thread's LAB list by transferring to its own linked list the objects on the other thread's linked list that are contained in the at least one removed local-allocation buffer.

5. A method as defined in claim 4 wherein:
   A) each execution thread whose list includes objects that are not all located in the same local-allocation buffer maintains a plurality of sublists of which each is associated that thread's list and with a respective local-allocation buffer; and
   B) each sublist consists of the objects in the list associated therewith that are located in the local-allocation buffer associated therewith.

6. A method as defined in claim 5 wherein the sublists associated with a given list are linked to other sublists associated therewith by links written in from-space locations from which those sublists' objects were evacuated.

7. A method as defined in claim 5 wherein the sublists of each list are linked to other sublists thereof by links written in the local-allocation buffers associated therewith.

8. A method as defined in claim 1 further including employing at least one of the threads to remove at least one object from the list associated with another of the threads and process the object thereby transferred.

9. A computer-implemented method for executing in the memory of a computer system in a plurality of threads of execution a copying garbage collector that collects by evacuating potentially reachable objects from a from-space to a to-space and reclaiming the from-space for re-use, a method comprising:
  A) dividing the to-space into local-allocation buffers;
  B) employing at least one of the threads to:
    i) maintain a LAB list associated therewith in which is listed at least one said local-allocation buffer into which that thread has evacuated at least one object that contains a reference to an object in the from-space that has not been evacuated by that thread therefrom; and
    ii) continue to evacuate objects from the from-space to the to-space so long as a local-allocation buffer remains in the LAB list associated therewith; and
  C) employing at least one other thread to remove at least one local-allocation buffer from the LAB list associated with another said thread and to evacuate from the from-space objects that are referred to by references located in at least one said local-allocation buffer thereby removed.

10. A method as defined in claim 9 wherein each said thread that removes a local-allocation buffer from any said LAB list not associated therewith does so only if no local-allocation buffer that was placed by that thread in any said LAB list associated therewith contains a reference to a from-space object that has not been evacuated.

11. A method as defined in claim 10 wherein each said thread that removes a local-allocation buffer from any said LAB list not associated therewith does so only if no object evacuated by that thread contains a reference to a from-space object that has not been evacuated.

12. A method as defined in claim 9 wherein the method further includes employing each thread to:
  A) claim for itself at least one of the local-allocation buffers and place into the local-allocation buffer which that thread has claimed most recently the objects which that thread evacuates; and
  B) recursively:
    i) scan objects in the local-allocation buffer most recently claimed thereby for references to objects in the from-space that have not already been evacuated;
    ii) while such references remain in the local-allocation buffer most recently claimed thereby, evacuate objects referred to by those references into the same claimed local-allocation buffer while enough space remains therein; and
    iii) thereafter evacuate objects from the from-space into the next local-allocation buffer claimed thereby.

13. A method as defined in claim 12 wherein each thread places the local-allocation buffer most recently claimed thereby into the LAB list associated therewith if that local-allocation buffer becomes full but still contains references to from-space objects that have not been evacuated.

14. A method as defined in claim 12 wherein, if no reference to a from-space object not previously evacuated remains in the local-allocation buffer claimed most recently by a given one of the threads but at least one local-allocation buffer that was placed by that thread in the LAB list associated therewith contains such a reference, that thread evacuates the object referred to by that reference.

15. A method as defined in claim 14 wherein, when more than one local-allocation buffer that was placed by a given one of the threads in the LAB list associated therewith contains a reference to a from-space object not previously evacuated when no such reference remains in the local-allocation buffer claimed most recently thereby, the object next evacuated by that thread is one referred to by a reference in the last local-allocation buffer placed on that LAB list.

16. A computer system containing instructions executable thereby to implement in a plurality of execution threads a copying garbage collector that collects by evacuating to a to-space from a from-space at least any objects in the from-space that are reachable from the to-space and reclaiming the from-space for re-use, wherein:
  A) each thread maintains at least one linked list, associated therewith, of evacuated objects containing references to potentially unevacuated objects by writing, in locations in the from-space from which that thread has evacuated objects that contained such references, links to other such locations;
  B) each thread processes objects in the list associated therewith by:
    i) scanning those objects for references to objects in the from-space that have not been evacuated;
    ii) if such a reference exists in an object in that list, evacuating the object to which that reference refers; and
    iii) if no such reference exists in a given object in that list, removing the given object from that list; and
  C) at least one of the threads:
    i) scans for references to objects in the from-space that have not been evacuated at least one object in the list associated with another of the threads; and
    ii) if such a reference exists, evacuates the object to which that reference refers.

17. A computer system as defined in claim 16 wherein each thread processes in a last-in, first-out order the objects in the list associated therewith.

18. A computer system as defined in claim 17 wherein at least one of the threads removes at least one object from the list associated with another of the threads and processes the object thereby transferred.

19. A computer system as defined in claim 16 wherein:
  A) the to-space is divided into local-allocation buffers;
  B) each of the threads claims for itself a sequence at least one of the local-allocation buffers and places objects which that thread evacuates in the local-allocation buffer which that thread has claimed most recently;
  C) at least one of the threads maintains a LAB list consisting of at least one local-allocation buffer that was claimed thereby before the local-allocation buffer claimed thereby most recently and contains at least one object in the linked list associated therewith; and
  D) at least one thread removes at least one local-allocation buffer from another thread's LAB list by transferring to its own linked list the objects on the other thread's linked list that are contained in the at least one removed local-allocation buffer.

20. A computer system as defined in claim 19 wherein:
  A) each execution thread whose list includes objects that are not all located in the same local-allocation buffer maintains a plurality of sublists of which each is associated that thread's list and with a-respective local-allocation buffer; and
  B) each sublist consists of the objects in the list associated therewith that are located in the local-allocation buffer associated therewith.

21. A computer system as defined in claim 20 wherein the sublists associated with a given list are linked to other sublists associated therewith by links written in from-space locations from which those sublists' objects were evacuated.

22. A computer system as defined in claim 20 wherein the sublists of each list are linked to other sublists thereof by links written in the local-allocation buffers associated therewith.

23. A computer system as defined in claim 16 further including employing at least one of the threads to remove at least one object from the list associated with another of the threads and process the object thereby transferred.

24. A computer system containing instructions executable thereby to implement in a plurality of execution threads a copying garbage collector that collects by evacuating potentially reachable objects from a from-space to a to-space and reclaiming the from-space for re-use, wherein:
   A) the to-space is divided into local-allocation buffers;
   B) at least one of the threads:
      i) maintains a LAB list associated therewith in which is listed at least one said local-allocation buffer into which that thread has evacuated at least one object that contains a reference to an object in the from-space that has not been evacuated by that thread therefrom; and
      ii) continues to evacuate objects from the from-space to the to-space so long as a local-allocation buffer remains in the LAB list associated therewith; and
   C) at least one other said thread removes at least one local-allocation buffer from the LAB list associated with another thread and evacuates from the from-space objects that are referred to by references located in at least one said local-allocation buffer thereby removed.

25. A computer system as defined in claim 24 wherein each said thread that removes a local-allocation buffer from any said LAB list not associated therewith does so only if no local-allocation buffer that was placed by that thread in any said LAB list associated therewith contains a reference to a from-space object that has not been evacuated.

26. A computer system as defined in claim 25 wherein each said thread that removes a local-allocation buffer from any said LAB list not associated therewith does so only if no object evacuated by that thread contains a reference to a from-space object that has not been evacuated.

27. A computer system as defined in claim 24 wherein the method further includes employing each thread to:
   A) claim for itself at least one of the local-allocation buffers and place into the local-allocation buffer which that thread has claimed most recently the objects which that thread evacuates; and
   B) recursively:
      i) scan objects in the local-allocation buffer most recently claimed thereby for references to objects in the from-space that have not already been evacuated;
      ii) while such references remain in the local-allocation buffer most recently claimed thereby, evacuate objects referred to by those references into the same claimed local-allocation buffer while enough space remains therein; and
      iii) thereafter evacuate objects from the from-space into the next local-allocation buffer claimed thereby.

28. A computer system as defined in claim 27 wherein each thread places the local-allocation buffer most recently claimed thereby into the LAB list associated therewith if that local-allocation buffer becomes full but still contains references to from-space objects that have not been evacuated.

29. A computer system as defined in claim 27 wherein, if no reference to a from-space object not previously evacuated remains in the local-allocation buffer claimed most recently by a given one of the threads but at least one local-allocation buffer that was placed by that thread in the LAB list associated therewith contains such a reference, that thread evacuates the object referred to by that reference.

30. A computer system as defined in claim 29 wherein, when more than one local-allocation buffer that was placed by a given one of the threads in the LAB list associated therewith contains a reference to a from-space object not previously evacuated when no such reference remains in the local-allocation buffer claimed most recently thereby, the object next evacuated by that thread is one referred to by a reference in the last local-allocation buffer placed on that LAB list.

31. A storage medium containing instructions executable by a computer system to implement in a plurality of execution threads a copying garbage collector that collects by evacuating to a to-space from a from-space at least any objects in the from-space that are reachable from the to-space and reclaiming the from-space for re-use, wherein:
   A) each thread maintains at least one linked list, associated therewith, of evacuated objects containing references to potentially unevacuated objects by writing, in locations in the from-space from which that thread has evacuated objects that contained such references, links to other such locations;
   B) each thread processes objects in the list associated therewith by:
      i) scanning those objects for references to objects in the from-space that have not been evacuated;
      ii) if such a reference exists in an object in that list, evacuating the object to which that refernce refers; and
      iii) if no such reference exists in a given object in that list, removing the given object from that list; and
   C) at least one of the threads:
      i) scans for references to objects in the from-space that have not been evacuated at least one object in the list associated with another of the threads; and
      ii) if such a reference exists, evacuates the object to which that reference refers.

32. A storage medium as defined in claim 31 wherein each thread processes in a last-in, first-out order the objects in the list associated therewith.

33. A storage medium as defined in claim 32 wherein at least one of the threads removes at least one object from the list associated with another of the threads and processes the object thereby transferred.

34. A storage medium as defined in claim 31 wherein:
   A) the to-space is divided into local-allocation buffers;
   B) each of the threads claims for itself a sequence at least one of the local-allocation buffers and places objects which that thread evacuates in the local-allocation buffer which that thread has claimed most recently;
   C) at least one of the threads maintains a LAB list consisting of at least one local-allocation buffer that was claimed thereby before the local-allocation buffer claimed thereby most recently and contains at least one object in the linked list associated therewith; and
   D) at least one thread removes at least one local-allocation buffer from another thread's LAB list by transferring to its own linked list the objects on the other thread's linked list that are contained in the at least one removed local-allocation buffer.

35. A storage medium as defined in claim 34 wherein:
   A) each execution thread whose list includes objects that are not all located in the same local-allocation buffer maintains a plurality of sublists of which each is associated that thread's list and with a respective local-allocation buffer; and B) each sublist consists of the objects in the list associated therewith that are located in the local-allocation buffer associated therewith.

36. A storage medium as defined in claim 35 wherein the sublists associated with a given list are linked to other sublists associated therewith by links written in from-space locations from which those sublists' objects were evacuated.

37. A storage medium as defined in claim 35 wherein the sublists of each list are linked to other sublists thereof by links written in the local-allocation buffers associated therewith.

38. A storage medium as defined in claim 31 further including employing at least one of the threads to remove at least one object from the list associated with another of the threads and process the object thereby transferred.

39. A storage medium containing instructions executable by a computer system to implement in a plurality of execution threads a copying garbage collector that collects by evacuating potentially reachable objects from a from-space to a to-space and reclaiming the from-space for re-use, wherein:
A) the to-space is divided into local-allocation buffers;
B) at least one of the threads:
  i) maintains a LAB list associated therewith in which is listed at least one said local-allocation buffer into which that thread has evacuated at least one object that contains a reference to an object in the from-space that has not been evacuated by that thread therefrom; and
  ii) continues to evacuate objects from the from-space to the to-space so long as a local-allocation buffer remains in the LAB list associated therewith; and
C) at least one other said thread removes at least one local-allocation buffer from the LAB list associated with another thread and evacuates from the from-space objects that are referred to by references located in at least one said local-allocation buffer thereby removed.

40. A storage medium as defined in claim 39 wherein each said thread that removes a local-allocation buffer from any said LAB list not associated therewith does so only if no local-allocation buffer that was placed by that thread in any said LAB list associated therewith contains a reference to a from-space object that has not been evacuated.

41. A storage medium as defined in claim 40 wherein each said thread that removes a local-allocation buffer from any said LAB list not associated therewith does so only if no object evacuated by that thread contains a reference to a from-space object that has not been evacuated.

42. A storage medium as defined in claim 39 wherein the method further includes employing each thread to:
A) claim for itself at least one of the local-allocation buffers and place into the local-allocation buffer that which that thread has claimed most recently the objects which that thread evacuates; and
B) recursively:
  i) scan objects in the local-allocation buffer most recently claimed thereby for references to objects in the from-space that have not already been evacuated;
  ii) while such references remain in the local-allocation buffer most recently claimed thereby, evacuate objects referred to by those references into the same claimed local-allocation buffer while enough space remains therein; and
  iii) thereafter evacuate objects from the from-space into the next local-allocation buffer claimed thereby.

43. A storage medium as defined in claim 42 wherein each thread places the local-allocation buffer most recently claimed thereby into the LAB list associated therewith if that local-allocation buffer becomes full but still contains references to from-space objects that have not been evacuated.

44. A storage medium as defined in claim 42 wherein, if no reference to a from-space object not previously evacuated remains in the local-allocation buffer claimed most recently by a given one of the threads but at least one local-allocation buffer that was placed by that thread in the LAB list associated therewith contains such a reference, that thread evacuates the object referred to by that reference.

45. A storage medium as defined in claim 44 wherein, when more than one local-allocation buffer that was placed by a given one of the threads in the LAB list associated therewith contains a reference to a from-space object not previously evacuated when no such reference remains in the local-allocation buffer claimed most recently thereby, the object next evacuated by that thread is one referred to by a reference in the last local-allocation buffer placed on that LAB list.

46. A computer-implemented copying garbage collector, implemented in the memory of a computer system in a plurality of execution threads, that collects by evacuating to a to-space from a from-space at least any objects in the from-space that are reachable from the to-space and reclaiming the from-space for re-use and that includes:
A) means for maintaining for each thread at least one linked list, associated with that thread, of evacuated objects containing references to potentially unevacuated objects by writing, in locations in the from-space from which that thread has evacuated objects that contained such references, links to other such locations;
B) means for, for each thread, processing objects in the list associated therewith by:
  i) scanning those objects for references to objects in the from-space that have not been evacuated;
  ii) if such a reference exists in an object in that list, evacuating the object to which it refers; and
  iii) if no such reference exists in a given object in that list, removing the given object from that list; and
C) means for employing at least one of the threads to:
  i) scan for references to objects in the from-space that have not been evacuated at least one object in the list associated with another of the threads; and
  ii) if such a reference exists, evacuating the object to which it refers.

47. A computer-implemented copying garbage collector, implemented in the memory of a computer system in a plurality of execution threads, that collects by evacuating to a to-space from a from-space at least any objects in the from-space that are reachable from the to-space and reclaiming the from-space for re-use and that includes:
A) means for dividing the to-space into local-allocation buffers;
B) means for employing at least one of the threads to:
  i) maintain a LAB list associated therewith in which is listed at least one said local-allocation buffer into which that thread has evacuated at least one object that contains a reference to an object in the from-space that has not been evacuated by that thread therefrom; and
  ii) continue to evacuate objects from the from-space to the to-space so long as a local-allocation buffer remains in the LAB list associated therewith; and C) means for employing at least one other thread to remove at least one local-allocation buffer from the LAB list associated with another said thread and to evacuate from the from-space objects that are referred to by references located in at least one said local-allocation buffer thereby removed.

* * * * *